US006052205A

United States Patent [19]
Matsuura

[11] Patent Number: 6,052,205
[45] Date of Patent: Apr. 18, 2000

[54] IMAGE DATA ENCODING/DECODING METHOD AND APPARATUS CONFIGURED TO COMPRESS BOTH NATURAL GRAY SCALE IMAGES AND BINARY IMAGES

[75] Inventor: Nekka Matsuura, Tokyo-to, Japan

[73] Assignee: Ricoh Company, Ltd., Tokyo, Japan

[21] Appl. No.: 09/024,708

[22] Filed: Feb. 17, 1998

[30] Foreign Application Priority Data

Feb. 14, 1997 [JP] Japan .................................. 9-030609

[51] Int. Cl.$^7$ ...................................................... H04N 1/41
[52] U.S. Cl. ........................... 358/426; 358/433; 382/232
[58] Field of Search .................... 358/426, 429, 358/430, 432, 433; 382/232, 237, 239, 240, 244, 248

[56] References Cited

U.S. PATENT DOCUMENTS 5,644,406 7/1997 Harrington et al. ..................... 358/433
5,881,176 3/1999 Keith et al. .............................. 382/248

*Primary Examiner*—Kimberly A. Williams
*Attorney, Agent, or Firm*—Oblon, Spivak, McClelland, Maier & Neustadt, P.C.

[57] ABSTRACT

Image data encoding/decoding method and apparatus uses a first data divider for dividing image data into—by n-pixel blocks, two data encoders for encoding an—by n-pixel block into a first data block including frequency data elements and into a second data block including an image density, locations of pixels, and a flag, respectively. A first image type determiner is also included for determining a number of different image density values included in the— by n-pixel block, as is a first data selector for selecting the first data block when the first image type determiner determines that the—by n-pixel block includes a number of different image density values different from a first predetermined value and the second data block when the first image type determiner determines that the—by n-pixel block includes a first predetermined number of the different image density values. Two data decoders are included for decoding the first data block into a block substantially similar to the block previously divided by the first data divider and the second data block into a block substantially similar to the block previously divided by the first data divider, respectively. A second image type determiner is used for determining the flag. A second data selector selects the block obtained by decoding the first data block when the flag is different from a second predetermined value and the block obtained by decoding the second data block when the flag is equal to the second predetermined value.

64 Claims, 43 Drawing Sheets

FIG. 4a

| a | b |
|---|---|
| c | d |

FIG. 4b

| M | $L_a$ AND $L_b$ |
|---|---|
| $L_c$ AND $L_d$ | F |

FIG. 4c

| LL = $\dfrac{(a+b)/2+(c+d)/2}{2}$ | HL = $\dfrac{(a+b)+(c+d)}{2}$ |
|---|---|
| LH = $\dfrac{(a+b)}{2} - \dfrac{(c+d)}{2}$ | HH = $(a-b)-(c-d)$ |

FIG. 5

| DECIMAL VALUE | SIGN BIT | BINARY NOTATION |
|---|---|---|
| 1 | 0 | 00000001 |
| -6 | 1 | 00000110 |
| 255 | 0 | 11111111 |
| -255 | 1 | 11111111 |

FIG. 6a

| IMAGE DENSITY M | $L_a$ AND $L_b$ |
|---|---|
| $L_c$ AND $L_d$ | F = 511 |

FIG. 6b

| LOCATION INFORMATION FOR a AND b | a | b |
|---|---|---|
| HL = 000000000 | 0 | 0 |
| 010000000 | 0 | M |
| 100000000 | M | 0 |
| 110000000 | M | M |

| LOCATION INFORMATION FOR c AND d | a | b |
|---|---|---|
| LH = 000000000 | 0 | 0 |
| 010000000 | 0 | M |
| 100000000 | M | 0 |
| 110000000 | M | M |

FIG. 16

| DECIMAL VALUE | BINARY VALUE |
|---|---|
| 1 | ABSOLUTE VALUE =    0 0 0 0 0 0 0 1<br>ADDING SIGN BIT                              0<br>ENCODED VALUE A =  0 0 0 0 0 0 0 1 0<br>ENCODED VALUE B =  0 0 0 0 0 0 0 1 1 |
| −6 | ABSOLUTE VALUE =    0 0 0 0 0 1 1 0<br>ADDING SIGN BIT                              1<br>ENCODED VALUE A =  0 0 0 0 0 1 1 1 0<br>ENCODED VALUE B =  0 0 0 0 0 1 0 0 1 |
| 255 | ABSOLUTE VALUE =    1 1 1 1 1 1 1 1<br>ADDING SIGN BIT         0<br>ENCODED VALUE A =  1 0 1 1 1 1 1 1 1<br>ENCODED VALUE B =  1 1 1 0 0 0 0 0 0 |
| −255 | ABSOLUTE VALUE =    1 1 1 1 1 1 1 1<br>ADDING SIGN BIT         1<br>ENCODED VALUE A =  1 1 1 1 1 1 1 1 1<br>ENCODED VALUE B =  1 0 0 0 0 0 0 0 0 |

FIG. 19a

| IMAGE DENSITY M | $L_a$ AND $L_b$ |
|---|---|
| $L_c$ AND $L_d$ | F = 511 |

FIG. 19b

| DECIMAL VALUE | ENCODED VALUE A | ENCODED VALUE B |
|---|---|---|
| 0 | 0 0 0 0 0 0 0 0 | 0 0 0 0 0 0 0 0 |
| −255 | 1 1 1 1 1 1 1 1 | 1 0 0 0 0 0 0 0 |
| −127 | 0 1 1 1 1 1 1 1 | 0 1 0 0 0 0 0 0 |
| 128 | 1 0 0 0 0 0 0 0 | 1 1 0 0 0 0 0 0 |

FIG. 19c

| $L_a$ AND $L_b$ | a | b | $L_c$ AND $L_d$ | c | d |
|---|---|---|---|---|---|
| HL = 0 | 0 | 0 | LH = 0 | 0 | 0 |
| −127 | 0 | M | −127 | 0 | M |
| −255 | M | 0 | −255 | M | 0 |
| 128 | M | M | 128 | M | M |

FIG. 20a

| IMAGE DENSITY X | IMAGE DENSITY Y |
|---|---|
| LOCATION (0 – 15) | F = 511 |

FIG. 20b

| LOCATION | a | b | c | d |
|---|---|---|---|---|
| 0  | y | y | y | y |
| 1  | y | y | y | x |
| 2  | y | y | x | y |
| 3  | y | y | x | x |
| 4  | y | x | y | y |
| 5  | y | x | y | x |
| 6  | y | x | x | y |
| 7  | y | x | x | x |
| 8  | x | y | y | y |
| 9  | x | y | y | x |
| 10 | x | y | x | y |
| 11 | x | y | x | x |
| 12 | x | x | y | y |
| 13 | x | x | y | x |
| 14 | x | x | x | y |
| 15 | x | x | x | x |

| 255 | 255 |
|---|---|
| 255 | 0 |

| 255 | 0 |
|---|---|
| 0 | 0 |

| 0 | 0 |
|---|---|
| 0 | 0 |

| 0 | 0 |
|---|---|
| 0 | 255 |

| 0 | 255 |
|---|---|
| 255 | 255 |

| 255 | 3 |
|---|---|
| 2 | 511 |

| 255 | 2 |
|---|---|
| 0 | 511 |

| 0 | 0 |
|---|---|
| 0 | 511 |

| 255 | 0 |
|---|---|
| 1 | 511 |

| 255 | 1 |
|---|---|
| 3 | 511 |

| 255 | 3 |
|---|---|
| 2 | 511 |

| 255 | 2 |
|---|---|
| 0 | 511 |

| 255 | 0 |
|---|---|
| 0 | 0 |

| 255 | 0 |
|---|---|
| 1 | 511 |

| 255 | 1 |
|---|---|
| 3 | 511 |

FIG.32a

| | 1ST | | 2ND | | 3RD | | 4TH | | 5TH | |
|---|---|---|---|---|---|---|---|---|---|---|
| | 0 | 0 | 0 | 128 | 128 | 128 | 128 | 128 | 128 | 128 |
| | 0 | 128 | 128 | 128 | 128 | 255 | 255 | 255 | 255 | 128 |

FIG.32b

| | 1ST | | 2ND | | 3RD | | 4TH | | 5TH | |
|---|---|---|---|---|---|---|---|---|---|---|
| | 128 | 0 | 128 | 1 | 159 | −63 | 191 | 0 | 159 | 63 |
| | 1 | 511 | 3 | 511 | −63 | 127 | −127 | 0 | −63 | −127 |

FIG.32c

| | 1ST | | 2ND | | 3RD | | 4TH | | 5TH | |
|---|---|---|---|---|---|---|---|---|---|---|
| | 128 | 0 | 128 | 1 | 159 | −63 | 128 | 3 | 128 | 3 |
| | 1 | 511 | 3 | 511 | −63 | 127 | 0 | 511 | 1 | 511 |

FIG.33a

| | 1ST | | | 2ND | | | 3RD | | | 4TH | | | 5TH | |
|---|---|---|---|---|---|---|---|---|---|---|---|---|---|---|
| | 0 | 0 | | 0 | 128 | | 128 | 128 | | 128 | 128 | | 128 | 128 |
| | 0 | 128 | | 128 | 128 | | 128 | 255 | | 255 | 255 | | 255 | 128 |

FIG.33b

| | 1ST | | | 2ND | | | 3RD | | | 4TH | | | 5TH | |
|---|---|---|---|---|---|---|---|---|---|---|---|---|---|---|
| | 128 | 0 | | 128 | 1 | | 159 | −63 | | 191 | 0 | | 159 | 63 |
| | 1 | 511 | | 3 | 511 | | −63 | 127 | | −127 | 0 | | −63 | −127 |

FIG.33c

| | 1ST | | | 2ND | | | 3RD | | | 4TH | | | 5TH | |
|---|---|---|---|---|---|---|---|---|---|---|---|---|---|---|
| | 128 | 0 | | 128 | 1 | | 159 | −63 | | 128 | 3 | | 128 | 3 |
| | 1 | 511 | | 3 | 511 | | −63 | 127 | | 0 | 511 | | 1 | 511 |

FIG.33d

| | 1ST | | | 2ND | | | 3RD | | | 4TH | | | 5TH | |
|---|---|---|---|---|---|---|---|---|---|---|---|---|---|---|
| | 128 | 0 | | 128 | 1 | | 128 | 3 | | 128 | 3 | | 128 | 3 |
| | 1 | 511 | | 3 | 511 | | 2 | −511 | | 0 | −511 | | 1 | −511 |

FIG. 36a

| 1ST | | | 2ND | | | 3RD | | | 4TH | |
|---|---|---|---|---|---|---|---|---|---|---|
| 16 | 16 | | 18 | 24 | | 30 | 30 | | 32 | 34 |
| 15 | 17 | | 20 | 22 | | 30 | 32 | | 34 | 36 |

FIG. 36b

| 1ST | | | 2ND | | | 3RD | | | 4TH | |
|---|---|---|---|---|---|---|---|---|---|---|
| 16 | 1 | | 21 | −4 | | 30 | 32 | | 34 | −2 |
| 0 | 2 | | 0 | −4 | | 14 | 511 | | −2 | 0 |

FIG. 36c

| 1ST | | | 2ND | | | 3RD | | | 4TH | |
|---|---|---|---|---|---|---|---|---|---|---|
| 16 | −1 | | 21 | −4 | | 30 | −1 | | 34 | −2 |
| 0 | 2 | | 0 | −4 | | −1 | 2 | | −2 | 0 |

```
P00 = 0 ⟶ a = M
    = 1 ⟶ a = 0
P01 = 0 ⟶ b = M
    = 1 ⟶ b = 0
P10 = 0 ⟶ c = M
    = 1 ⟶ c = 0
P11 = 0 ⟶ d = M
    = 1 ⟶ d = 0
```

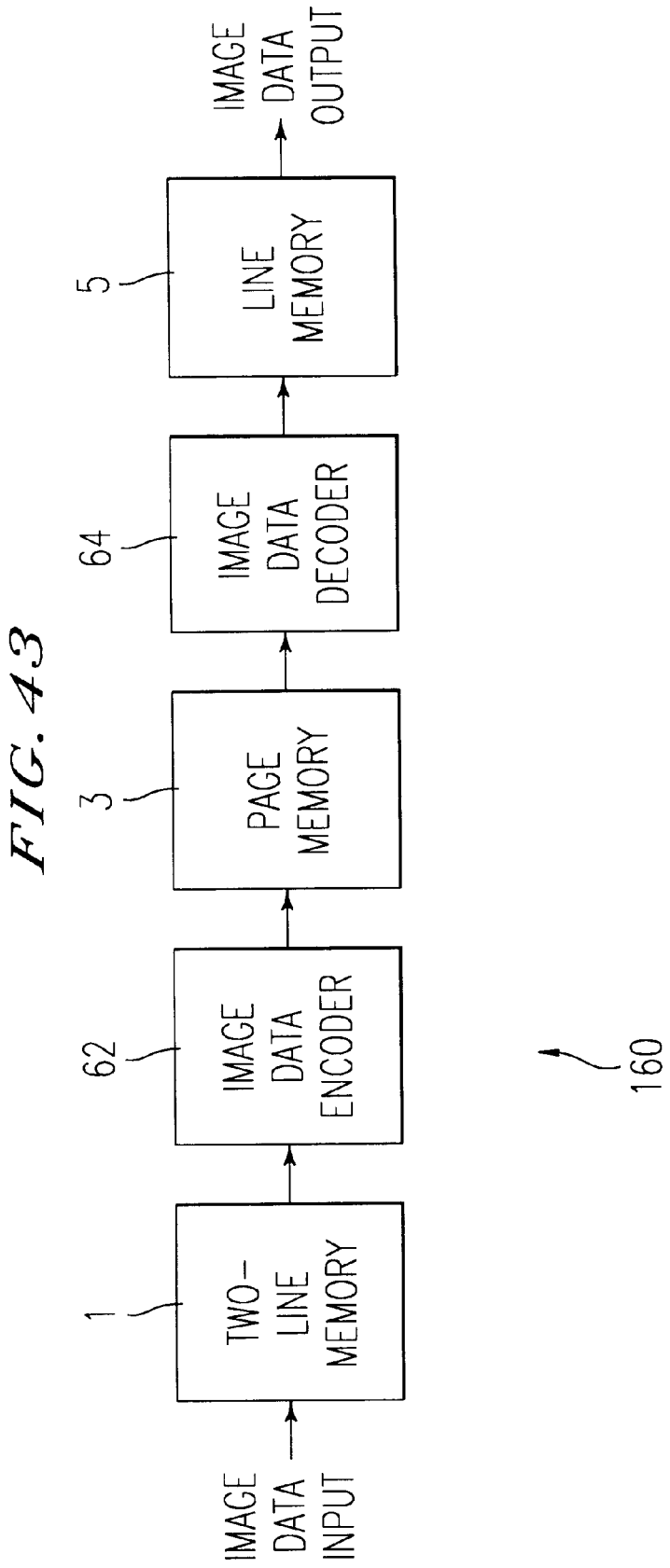

FIG. 46a

| 24 | 28 |
|---|---|
| 26 | 30 |

→ | LL = 27 | HL = −4 | LH = −2 | HH = 0 |

| P00 = 0 | P01 = 0 |
|---|---|
| P10 = 0 | P11 = 0 |

| F = 0 |

FIG. 46b

| 20 | 20 |
|---|---|
| 20 | 0 |

→ | LL = 20 | HL = 0 | LH = 0 | HH = 0 |

| P00 = 1 | P01 = 1 |
|---|---|
| P10 = 1 | P11 = 0 |

| F = 1 |

FIG. 47a
| 0 | 0 | 0 | 255 | 255 | 0 | 0 | 0 |
|---|---|---|---|---|---|---|---|
| 255 | 255 | 255 | 255 | 255 | 255 | 255 | 255 |
FIG. 47b
1ST
| 0 | 0 |
|---|---|
| 1 | 1 |
2ND
| 0 | 1 |
|---|---|
| 1 | 1 |
3RD
| 1 | 0 |
|---|---|
| 1 | 1 |
4TH
| 0 | 0 |
|---|---|
| 1 | 1 |
FIG. 48a
1ST
| 0 | 0 | 1 | 1 |
|---|---|---|---|
| 1 | 0 | 1 | 1 |
3RD
2ND
| 0 | 1 | 1 | 1 |
|---|---|---|---|
| 0 | 0 | 1 | 1 |
4TH
FIG. 48b
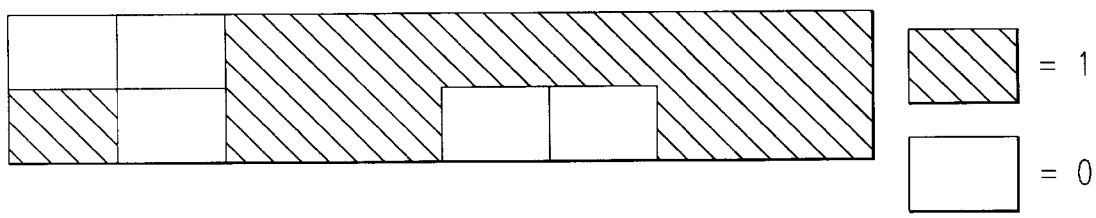
▨ = 1     ☐ = 0
FIG. 49a
| | 1ST | | 2ND | | 3RD | | 4TH | |
|---|---|---|---|---|---|---|---|---|
| | 0 | 0 | 0 | 1 | 1 | 0 | 0 | 0 |
| | 1 | 1 | 1 | 1 | 1 | 1 | 1 | 1 |
FIG. 49b
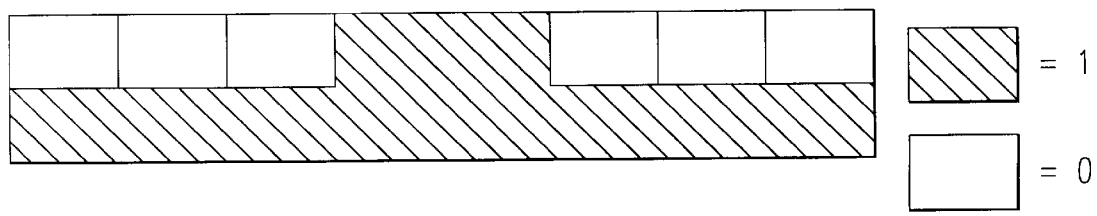
▨ = 1     ☐ = 0

FIG. 50
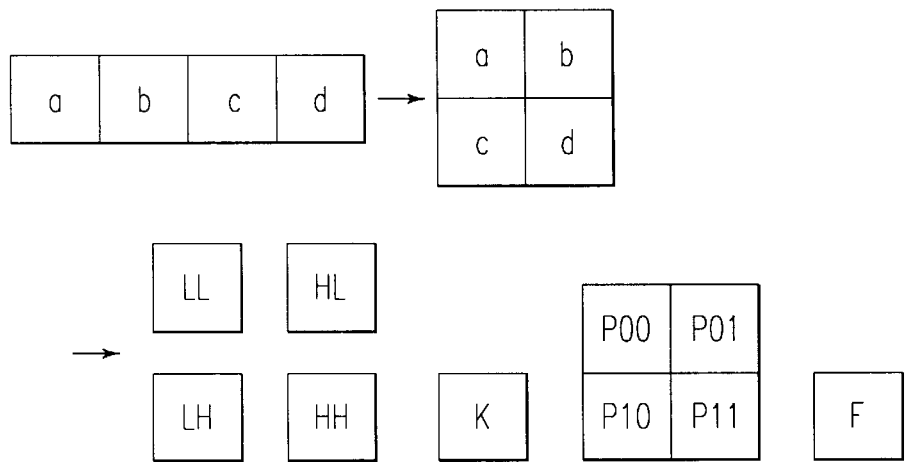
FIG. 51a
| 1ST | | | | 2ND | | | |
|---|---|---|---|---|---|---|---|
| 0 | 0 | 0 | 255 | 255 | 0 | 0 | 0 |
| 255 | 255 | 255 | 255 | 255 | 255 | 255 | 255 |
| 3RD | | | | 4TH | | | |
FIG. 51b
| 1ST | | | | 2ND | | | |
|---|---|---|---|---|---|---|---|
| 0 | 0 | 0 | 1 | 1 | 0 | 0 | 0 |
| 1 | 1 | 1 | 1 | 1 | 1 | 1 | 1 |
| 3RD | | | | 4TH | | | |
FIG. 51c
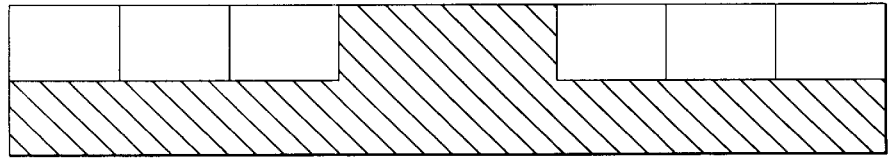
 = 1
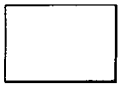 = 0

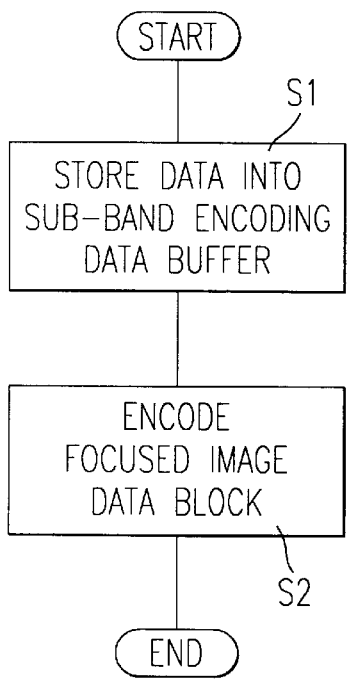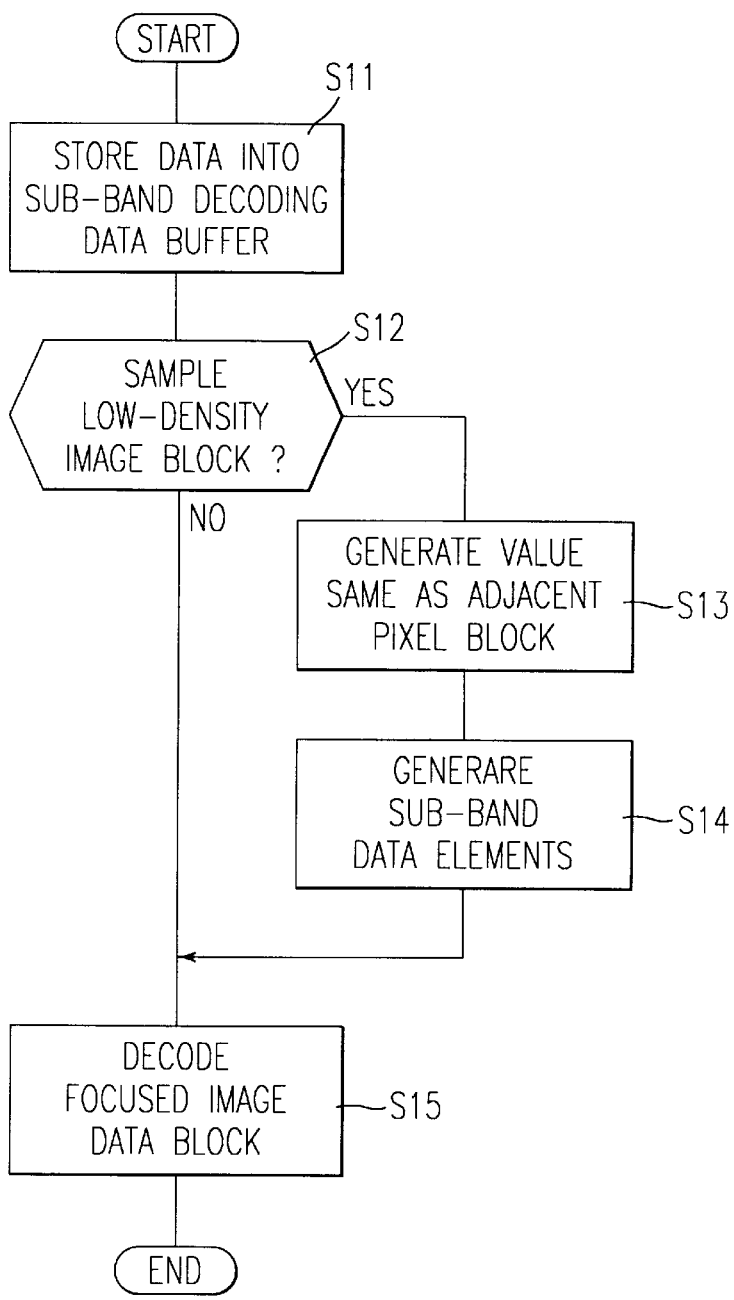
FIG. 52
FIG. 53

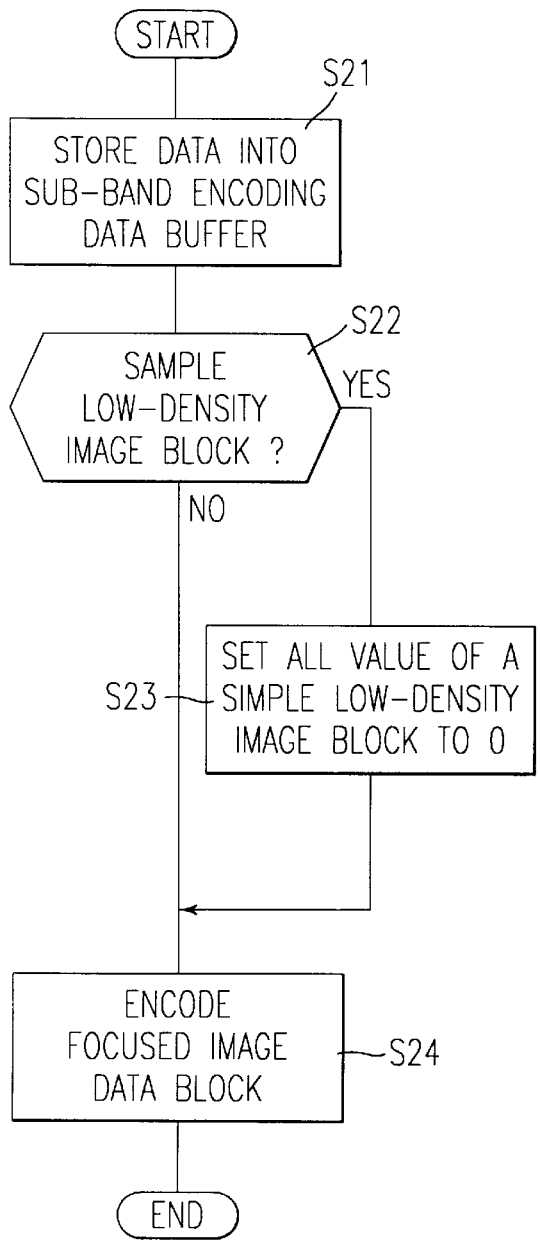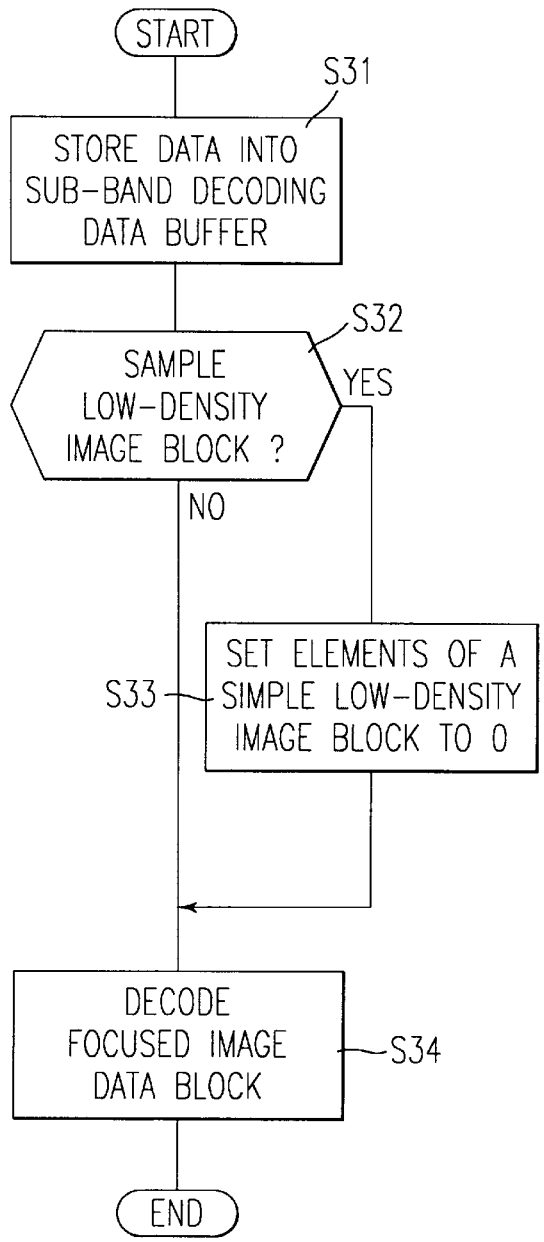

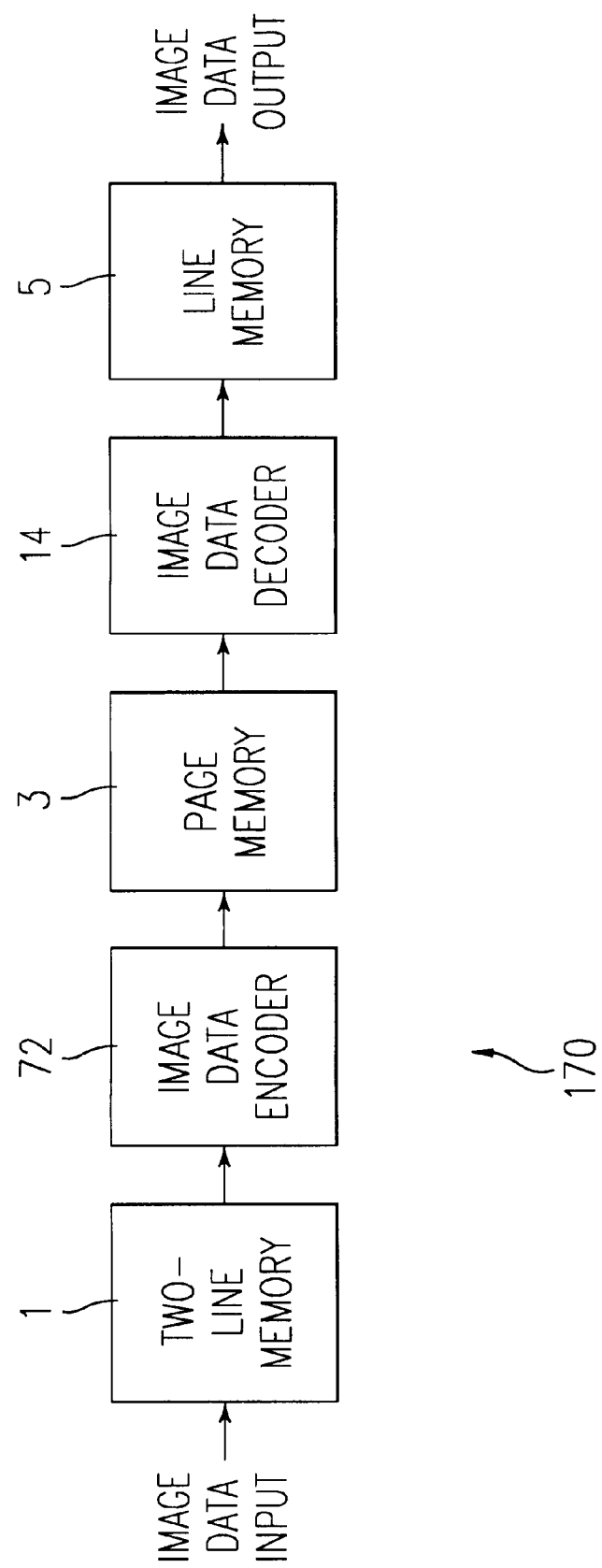

IMAGE DATA ENCODING/DECODING METHOD AND APPARATUS CONFIGURED TO COMPRESS BOTH NATURAL GRAY SCALE IMAGES AND BINARY IMAGES

BACKGROUND OF THE INVENTION

1. Field of the Invention

The present invention relates to an image data encoding/decoding method and apparatus, and more particularly to an image data encoding/decoding method and apparatus which are capable of efficiently performing compression for natural gray scale images and binary images.

2. Discussion of the Background

Various image processing apparatuses, such as printers, digital copying machines, facsimile machines, scanners, image filing systems, digital cameras, digital video recorders, CD-ROM players, and so forth, have been using image data encoding/decoding apparatuses. One type of the image data encoding/decoding apparatuses is based on a frequency data conversion method by which data are converted according to frequency magnitude. Several techniques are known as the frequency data conversion method. For example, a DCT (discrete cosine transform) and a Harr Wavelet conversion method, performing image data conversion by dividing data into a plurality of data blocks according to magnitude of frequency in horizontal and vertical directions, are significant as being capable of compressing an image of a natural gray scale in an efficient manner. As another example, Japanese Patent Application Laid Open No. 2-222386 discloses a technique which extracts edge blocks from image data before performing the DCT and provides a relatively large amount of data to the edge blocks.

However, as recognized by the present inventor, the above-mentioned image data compression methods have a drawback in that compression efficiency for a simple binary image, such as a computer graphic, text, and so forth, is relatively low. Accordingly, a printer, for example, implementing one of the above-mentioned image data compression methods, and which is used in an environment where images of computer graphics and text are mostly required, does not produce images in a superior compression efficiency.

Therefore, at present, there is no image data encoding/decoding apparatus capable of efficiently performing compression for both a natural gray scale and computer graphics and text image(s).

SUMMARY OF THE INVENTION

Accordingly, an object of the present invention is to provide a novel image encoding/decoding method and apparatus capable of performing compression for both an image of natural gray scale and an image of computer graphics and text.

To achieve the above-mentioned object and other objects, a novel image data encoding/decoding apparatus includes a first data divider for dividing input image data into m- by n-pixel blocks, where each of m and n is an integral multiple of 2, a first data encoder for encoding, according to frequency included in the input image data, each of the m- by n-pixel blocks into a first data block including a plurality of frequency data elements, a second data encoder for encoding the each of the m- by n-pixel blocks into a second data block including a plurality of elements representing an image density characterizing the m- by n-pixel block, locations of pixels having the image density, and a flag data element for specifying an image type, a first image type determiner for determining whether a number of different image density values, which pertain to pixels included in each of the m- by n-pixel blocks, is equal to a first predetermined value, and a first data selector for selecting the first data block from the first data encoder when the first image type determiner determines that the number of the different image density values of the m- by n-pixel block is different from the first predetermined value and the second data block from the second data encoder when the first image type determiner determines that the number of the different image density values of the m- by n-pixel block is equal to the first predetermined value.

To achieve the above-mentioned object and other objects, another image data encoding/decoding apparatus includes a first data divider for dividing input image data into by n-pixel blocks, where each of m and n is an integral multiple of 2, a first data encoder for encoding, according to frequency included in the input image data, each of the m- by n-pixel blocks into a first data block including a plurality of frequency data elements, a second data encoder for encoding the each of the m- by n-pixel blocks into a second data block including a plurality of elements representing an image density characterizing the m- by n-pixel block, locations of pixels having the image density, and a flag data element for specifying an image type, a first image type determiner for determining whether a number of different image density values, which pertain to pixels included in each of the m- by n-pixel blocks, is equal to a first predetermined value, a first data selector for selecting the first data block from the first data encoder when the first image type determiner determines that the number of the different image density values of the m- by n-pixel block is different from the first predetermined value and the second data block from the second data encoder when the first image type determiner determines that the number of the different image density values of the m- by n-pixel block is equal to the first predetermined value, a first data decoder for decoding the first data block into another m- by n-pixel block which is substantially similar to the m- by n-pixel block previously divided by the first data divider, a second data decoder for decoding the second data block into another m- by n-pixel block which is substantially similar to the m- by n-pixel block previously divided by the second data divider, a second image type determiner for determining whether the flag data element is equal to a second predetermined value, and a second data selector for selecting the m- by n-pixel block from the first data decoder when the second image type determiner determines that the flag data element is different from the second predetermined value and the m- by n-pixel block from the second data decoder when the second image type determiner determines that the flag data element is equal to the second predetermined value.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 4(a)–4(c) illustrate conversion of a 2- by 2-pixel block into a density-based-data block and a Wavelet data block by the data encoder of FIG. 2 and the data decoder of FIG. 3, respectively.

FIG. 5 illustrates a method of adding a sign bit to a data element included in the density-based-data and Wavelet data blocks;

FIGS. 6(a) and 6(b) illustrate an example of the density-based-data block and a method of assigning location information;

FIG. 16 explains a method of adding a sign bit to a data element in a third modified procedure of the image data encoding/decoding apparatus shown in FIG. 1;

FIGS. 19(a) to 19(c) illustrate an example of the density-based-data block and a way of assigning location information with respect to the third modified procedure of the apparatus of the first embodiment shown in FIG. 1;

FIGS. 20(a) and 20(b) illustrate an example of the density-based-data block and a method of assigning location information with respect to a fourth modified procedure of the apparatus of the first embodiment shown in FIG. 1;

FIGS. 32(a)–32(c) illustrate an operation and advantageous features of the fourth embodiment shown in FIG. 29;

FIGS. 33(a)–33(d) explain a sixth modified procedure of the apparatus of the first embodiment shown in FIG. 1 and its advantage;

FIGS. 36(a)–36(c) explain an operation and advantageous features of the image data encoding/decoding procedure by the fifth embodiment shown in FIG. 34;

FIGS. 43–45 illustrate a seventh embodiment of the image data encoding/decoding apparatus shown in FIG. 1 and its data encoder and decoder, respectively;

FIGS. 46(a) and 46(b) illustrate a procedure of the seventh embodiment shown in FIG. 43;

FIGS. 47(a)–49(b) explain a method of arranging a better data correlation to improve compression efficiency;

FIGS. 50–51(c) explain another method of arranging a better data correlation to improve compression efficiency;

FIGS. 52–55 illustrate flowcharts for explaining data encoding/decoding procedures of the image data encoding/decoding apparatus 160, using an overlapping method;

FIGS. 56 and 57 illustrate an eighth embodiment of the image data encoding/decoding apparatus shown in FIG. 1 and its data encoder.

DESCRIPTION OF THE PREFERRED EMBODIMENTS

Figure 1:
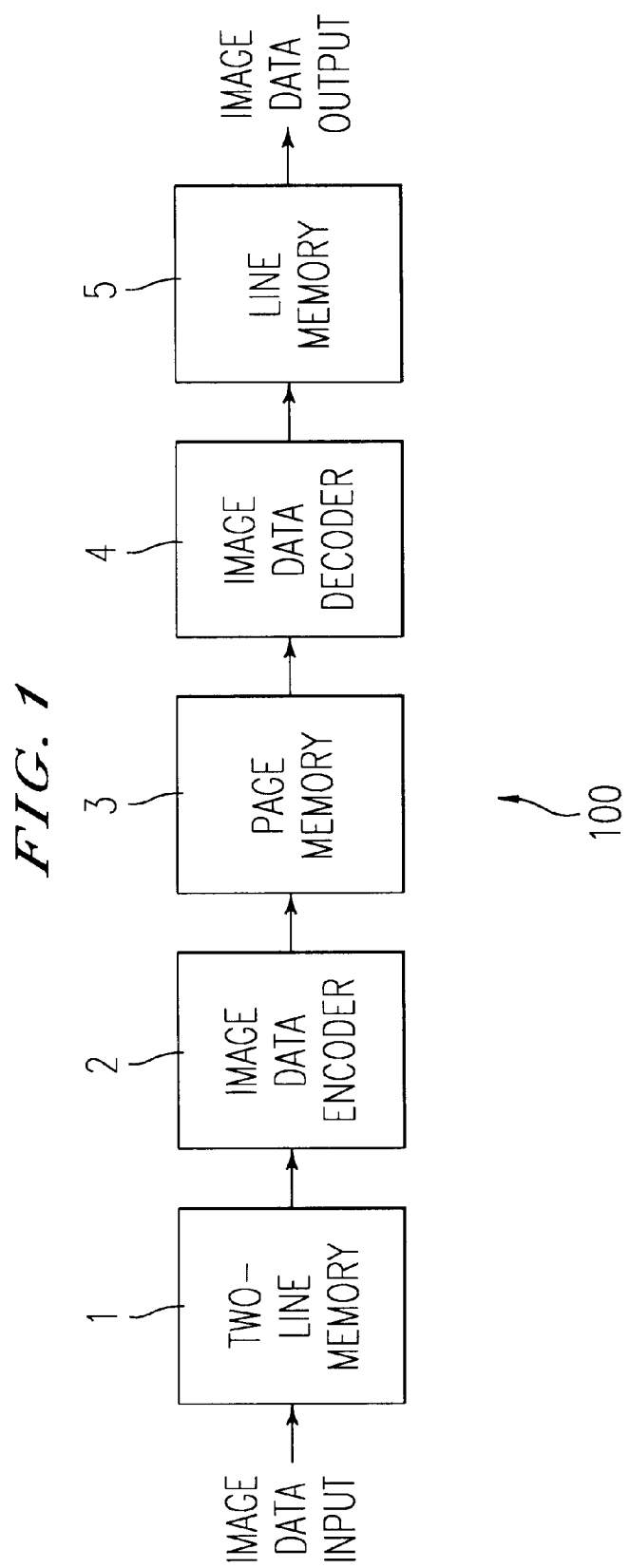
FIG. 1 illustrates a block diagram of a first embodiment of an image data encoding/decoding apparatus of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a block diagram of an image data encoding/decoding apparatus 100 as a first embodiment of the present invention.

A structure of the image data encoding/decoding apparatus 100 will now be explained with reference to FIGS. 1–6. The image data encoding/decoding apparatus 100 shown in FIG. 1 includes a two-line memory 1, an image data encoder 2, a page memory 3, a data decoder 4, and a line memory 5. The two-line memory which includes two line buffers, each capable of storing an amount of data for a full one line in the main scanning direction. Upon receiving image data sent from an external apparatus, e.g., a host computer, the two-line memory stores the data and sends the data to the image data encoding/decoding apparatus 100 each time when the two lines thereof are fully occupied with the image data. The line memory 5 temporarily stores data, line by line, and outputs data immediately after it is fully occupied with the data from the image data decoder 4.

More particularly, in the image data encoding/decoding apparatus 100, the image data passes through the data encoder 2 and undergoes a data encoding and compression operation through which the image data are encoded and compressed. The compressed image data are sent to the page memory 3 and stored therein.

Upon request, the compressed image data stored in the page memory 3 are transferred to the data decoder 4 and reconverted back into the form of the image data through a data decoding and decompression operation in which the compressed image data are encoded and decompressed. The decompressed image data are sent to the line memory 5 for temporarily storing and outputting the decompressed image data to another data processing operator which is performed by a main apparatus in which the image data encoding/decoding apparatus 100 is installed.

Figure 2:
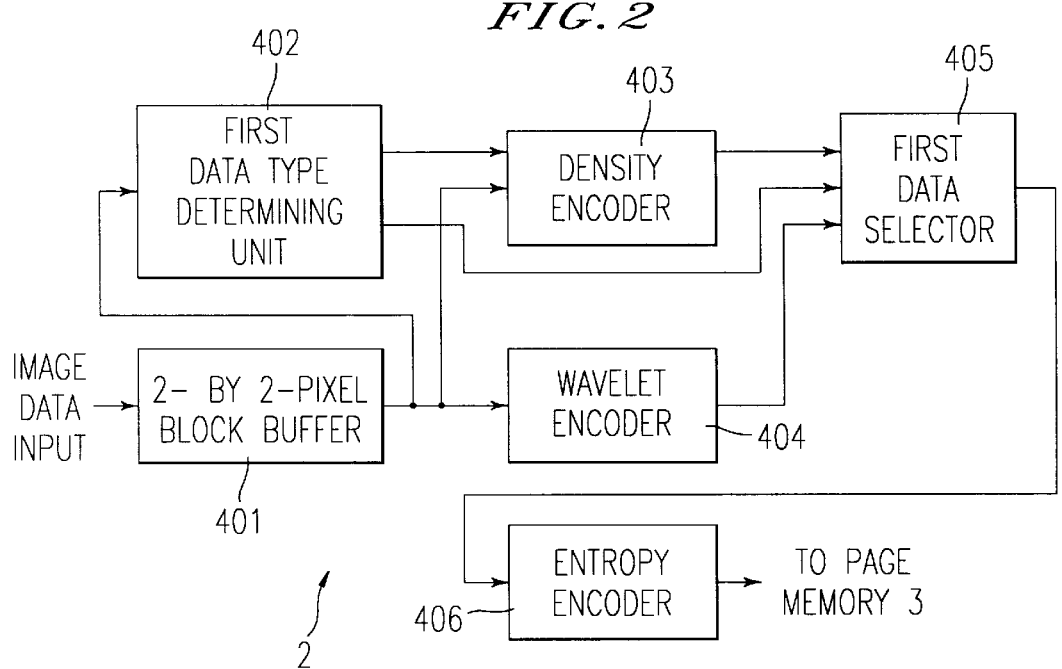
FIGS. 2 and 3 illustrate block diagrams of a data encoder and a data decoder included in the first embodiment of the image data encoding/decoding apparatus shown in FIG. 1.
Figure 3:
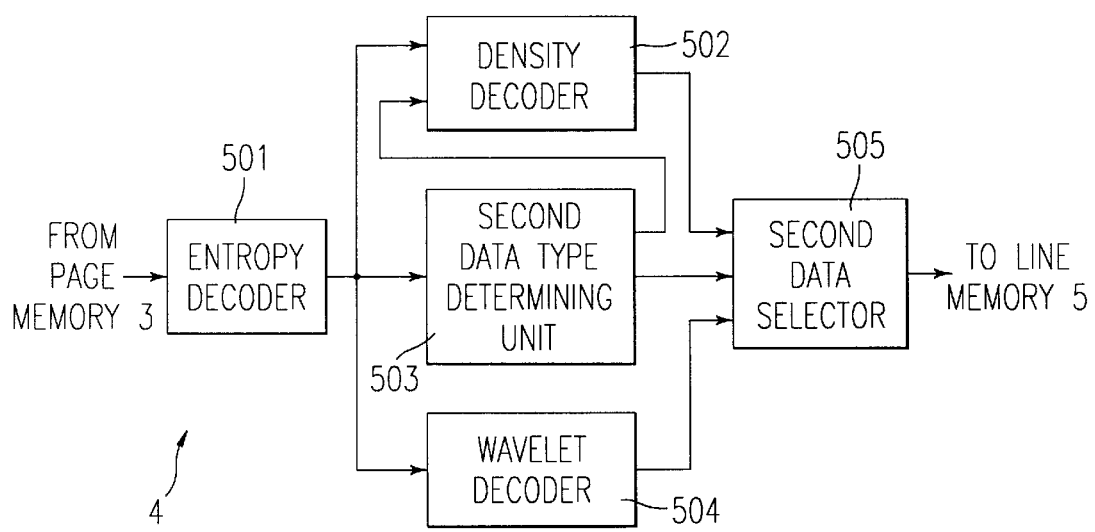

The data encoder 2 and the data decoder 4 are now explained with respect to block diagrams shown in FIGS. 2 and 3, respectively. The data encoder 2 of FIG. 2 includes a 2- by 2-pixel block buffer 401, a first image type determining unit 402, a density encoder 403, a Wavelet encoder 404, a first data selector 405, and an entropy encoding unit 406. The data decoder 4 of FIG. 3 includes an entropy decoder 501, a density decoder 502, a second image type determining unit 503, a Wavelet decoder 504, and a second data selector 505.

In FIG. 2, the image data from the two-line memory are inputted into the 2- by 2-pixel block buffer 401 and divided into a plurality of data blocks, each having a plurality of pixels.

The number of pixels are predetermined as four and are referred to as pixels a, b, c, and d, as shown in FIG. 4(a). The image data, divided into blocks, are then transferred to the first image type determining unit 402, the density encoder 403, and the Wavelet encoder 404, at the same time.

The first image type determining unit 402 determines types of image data in a region of the image data, which are included in the block-formed image data from the 2- by 2-pixel block buffer 401. The density encoder 403 receives the block-formed image data and performs a data conversion operation on the block-formed image data. During the operation by the density encoder 403, the block-formed image data, including the pixels a, b, c, and d, are converted into another block-formed image data including density information M, location information La, Lb, Lc, and Ld, and flag information F, as shown in FIG. 4(b). The density information M is a density value that represents a regional density peculiarity of the image data in a region of the image data. The location information La, Lb, Lc, and Ld represent locations of the pixels a, b, c, and d, respectively.

The Wavelet encoder 404 receives the block-formed image data from the 2- by 2-pixel block buffer 401 and performs another data conversion operation. During the operation by the Wavelet encoder 404, the block-formed image data are processed using calculations referred to as a Wavelet method, by which data of a signal are converted into values according to frequency. As a result, the density values of pixels a, b, c, and d, which define a block of the block-formed image data, are converted into a relatively low frequency data element LL and three relatively high frequency data elements HL, LH, and HH, respectively, as shown in FIG. 4 (c). These low and high frequency data elements LL, HL, LH, and HH are henceforth referred to as Wavelet data elements LL, HL, LH, and HH, respectively.

The first data selector 405 receives each of the converted image data outputted from the density encoder 403 and the Wavelet encoder 404. The first data selector 405 then selects the block-formed image data outputted from the density encoder 403 or the Wavelet encoder 404 based on a determination result provided by the first image type determining unit 402. The first data selector 405 then transmits the selected image data to the entropy encoding unit 406 for performing a data compression operation in which the selected image data are compressed. The image data are then compressed by the entropy encoding unit 406 and transmitted to the page memory 3 so as to be stored therein in a compressed image data form.

In the Wavelet encoder 404, the above-mentioned calculations referred to as the Wavelet method are performed so that the values of the Wavelet data elements LL, HL, LH, and HH are calculated using the following respective equations (1)–(4).

$$LL=\{(a+b)/2+(c+d)/2\}/2 \quad (1)$$

$$HL=\{(a-b)+(c-d)\}/2 \quad (2)$$

$$LH=\{(a+b)-(c+d)\}/2 \quad (3)$$

$$HH=(a-b)-(c-d) \quad (4)$$

When the Wavelet data elements LL, HL, LH, and HH satisfy the above equations using, for example, 8-bit positive data for representing 256-step gray-scale image pixels a, b, c, and d, values of the Wavelet data elements LL, HL, LH, and HH are in a range of 0 to 256, −256 to 256, −256 to 256, and −512 to 512, respectively. Accordingly, bit lengths required for the Wavelet data elements LL, HL and LH, and HH are 8, 9, and 10, respectively.

Upon a selection of the output from the Wavelet encoder 404, the entropy encoding unit 406 receives the Wavelet data elements and performs the data compression operation, in which each of the Wavelet data elements HL and LH is shrunk by erasing three successive data bits, including the least significant bit, and the Wavelet data element HH is shrunk by erasing five successive data bits, including the least significant bit. Thus, the block-formed image data from the Wavelet encoding unit 404 can be compressed by the entropy encoding unit 406. Upon a selection of the output from the density encoder 403, the entropy encoding unit 406 receives the density data elements and performs the data compression operation, in which each of the location information La, Lb, Lc, and Ld is shrunk by erasing three successive data bits, including the least significant bit, and the flag information F is shrunk by erasing five adjacent data bits, including the least significant bit. In this way, the block-formed image data from the density encoder 403 can be compressed by the entropy encoding unit 406. In the above two cases, the numbers of bits to be erased are examples and may be differently determined.

Accordingly, each of the Wavelet data elements HL and LH and the location information La, Lb, Lc, and Ld is compressed to a 6-bit data element and each of the Wavelet data element HH and the flag information F is compressed to a 5-bit data element. In this way, the data encoder 2 performs the data encoding and compression operation.

In the image data encoding/decoding apparatus 100, the input image data is considered to include a background density and a value thereof is preset to 0. Accordingly, when a 0-valued density is included in the input image data, it is understood as the background density. Based on the image density information including such a background density, the first image type determining unit 402 determines as to whether a type of image in a certain region of the input image data is one, such as a graphic image, a letter image, and the like, or another one, such as a photo image and the like. A type of image such as a graphic image, a letter image, and the like is hereinafter referred to as a simple low-density image.

The above-defined simple low-density image, including a graphic image, a letter image, and the like, generally contain far less image information in comparison with images such as photo images. Accordingly, the simple low-density image has different information characteristics than those of a complex image such as photo images. From this observation, and also the fact that the Wavelet method is known as a method suitable for images such as photo images, data of the simple low-density image are encoded using a method according to density values while all the data other than the data of the simple low-density image are encoded using the Wavelet method. Therefore, in the image data encoding/decoding apparatus 100, data of the simple low-density image are handled by the density encoder 403 and data other than the data of the simple low-density image are handled by the Wavelet encoding unit 404, so that image compression is efficiently performed.

A method of determining whether an image data block is the thus-defined simple low-density image, in the data encoder 2, is discussed as follows. The first image type determining unit 402 of the data encoder 2 determines whether a 2-by 2-pixel image data block includes only two different density values, the background density value which is set to 0 and an arbitrary density value M other than the value of the background density. When the 2-by 2-pixel image data block is determined to include only two different density values that are defined as above, the first image type determining unit 402 subsequently determines that the 2-by 2-pixel image data block is a simple low-density image.

In the data decoder 4, the second image type determining unit 503 determines whether the flag information F represents a predetermined value. Upon determining that the flag information F contained in the 2-by 2-pixel image data block represents a predetermined value, the second image type determining unit 503 determines that the 2-by 2-pixel image data block is a simple low-density image.

When each of the pixels a, b, c, and d consists of 8 data bits and has a value in the 0-to-255 range, the Wavelet data element HH, having 10 bits and represented by the equation of {(a−b)−(c−d)} as described above, may take a value in a range from −510 to 510. That is, the Wavelet data element HH is set to the maximum value 510 when the pixels a, b, c, and d are set to 255, 0, 0, and 255, respectively, and is set to the minimum value −510 when the pixels a, b, c, and d are set to 0, 255, 255, and 0, respectively. Accordingly, the flag information F is needed to be a value avoiding any value in the range from −510 to 510 and, therefore, set to 511.

When an image data block is determined as a simple low-density image, the first data selector 405 selects the inputs from the density encoder 403. The flag information F which is set to 511, as described above, is selected instead of the Wavelet data element HH and the density information M is selected instead of the Wavelet data element LL. Also, the first data selector 405 selects two bits from the most significant bit of each of the Wavelet data elements HL and LH to use them as the location information La, Lb, Lc, and Ld to represent the location information relative to the density information M.

In the image data encoding/decoding apparatus 100, bit assignments with respect to the Wavelet data elements are arranged in the following way. Using 8 bits, the low frequency Wavelet data element LL is represented as 8-bit binary data. Each of the high frequency Wavelet data elements HL, LH, and HH uses 9 bits, the most significant bit of which is used to specify if the value of the element is positive or negative and the remaining 8 bits of which is used to represent an absolute value of the element. The most significant bit of each of the Wavelet data elements HL, LH, and HH is set to 0 when the value of the element is positive or set to 1 when the value of the element is negative. In this way, an absolute 8-bit-weighted value in decimal notation can be expressed with a plus or minus sign in 9-bit binary notation. Examples of values 1, −6, 255, −255 are shown in FIG. 5.

As shown in FIG. 4(c), the density M is assigned to the position of the Wavelet data element LL, the location information La and Lb to the position of the Wavelet data element HL, the location information Lc and Ld to the position of the Wavelet data element LH, and the flag information F to the position of the Wavelet data element HH. FIG. 6(a) illustrates the case in that the flag information F has a value 511.

FIG. 6(b) shows exemplary 9-bit binary data which are assigned to the Wavelet data element HL to represent the location information La and Lb and to the Wavelet data element LH to represent the location information Lc and Ld and which link to values of the pixels a and b. When the 9-bit binary data representing the location information La and Lb in the place of the Wavelet data element HL is set to 100000000, it means that the pixel a has the density value M and the pixel b has the background density value which is 0. When the 9-bit binary data representing the location information Lc and Ld in the place of the Wavelet data element LH is set to 010000000, it means that the pixel a has the background density value which is 0 and the pixel b has the density value M. In this way, each of the location information La and Lb assigned to the Wavelet data element HL and the location information Lc and Ld assigned to the Wavelet data element LH can specify the density values of the pixels a and b and of the pixels c and d, respectively.

In the data encoder 2, when the image data block handled as a simple low-density image because of the value of the flag information, which is 511, is compressed, the flag information is also compressed and changed to a different value. In the data decoder 4 after the data encoder 2, the flag information which is compressed in the data encoder 2 is accordingly used. For example, when the value of the Wavelet data element HH undergoes the 5-bit cut-away data compression operation in the data encoder 2, the flag information value 511 is changed to 480, which is a result of a calculation in which 31 (=25−1) is subtracted from 511.

In the data decoder 4, the compressed 2- by 2-pixel block by the data encoder 2 is first inputted to the entropy decoder 501 and is subjected to a decompression operation. The decompressed image data block is then sent to the density decoder 502, the second image type determining unit 503, and the Wavelet decoder 504, at the same time. The second image type determining unit 503 determines whether the image data block is a simple low-density image by examining the flag information located at the position of the Wavelet data element HH. In accordance with the determination result by the second image type determining unit 503, the second data selector 505 selects the output from the density decoder 502 or the Wavelet decoder 504. Specifically, the second selector 505 selects the output from the density decoder 502 when the value of the Wavelet data element HH is equal to 480 and is determined as the flag information and the output from the Wavelet decoder 504 when the value of the Wavelet data element HH is a value other than 480 and is determined as not being the flag information.

Figure 7:
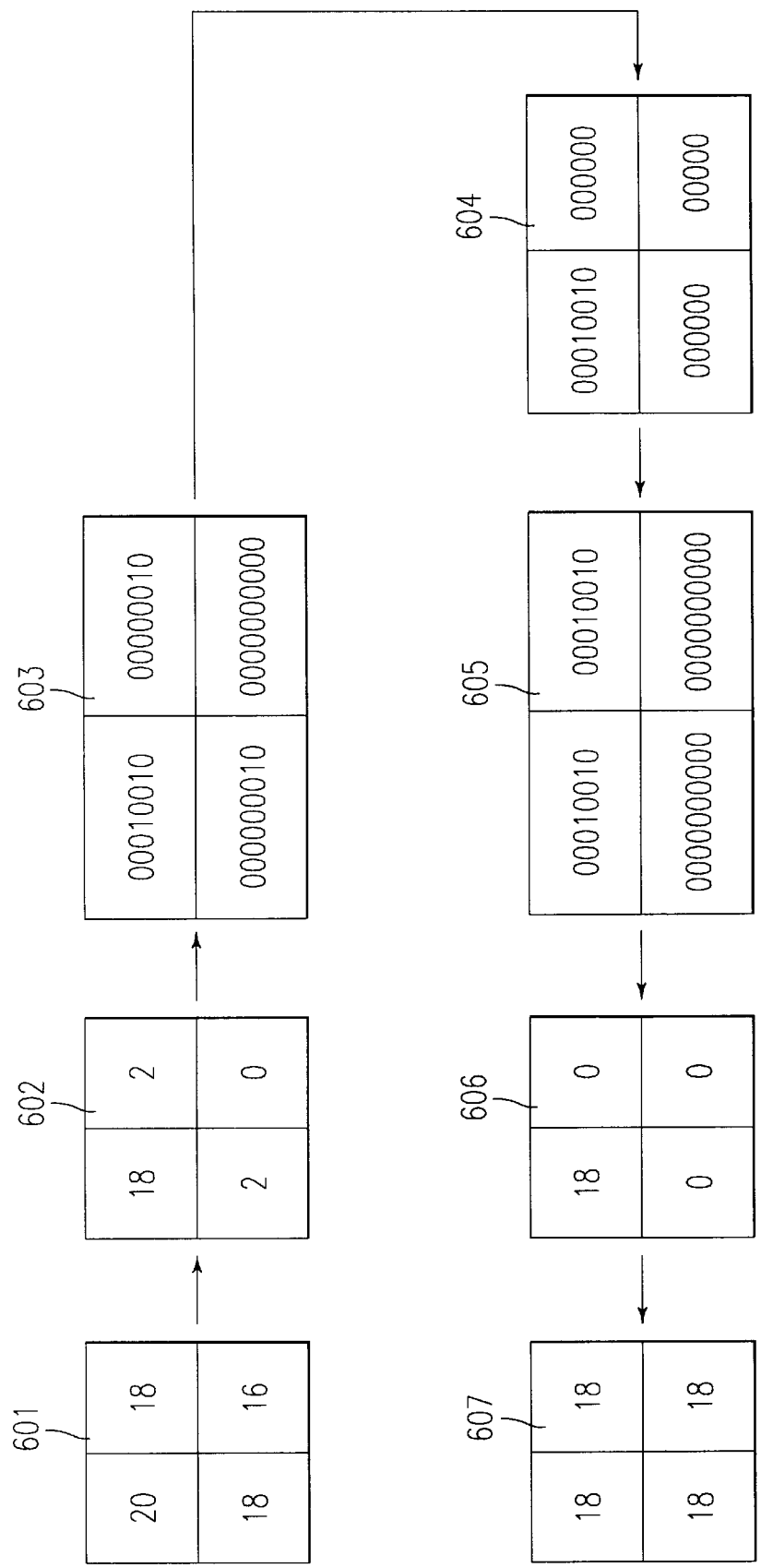
FIGS. 7 and 8 illustrate procedures of encoding/decoding blocks of an image other than a simple low-density image and a simple low-density image, respectively by the apparatus of the first embodiment shown in FIG. 1.
Figure 8:
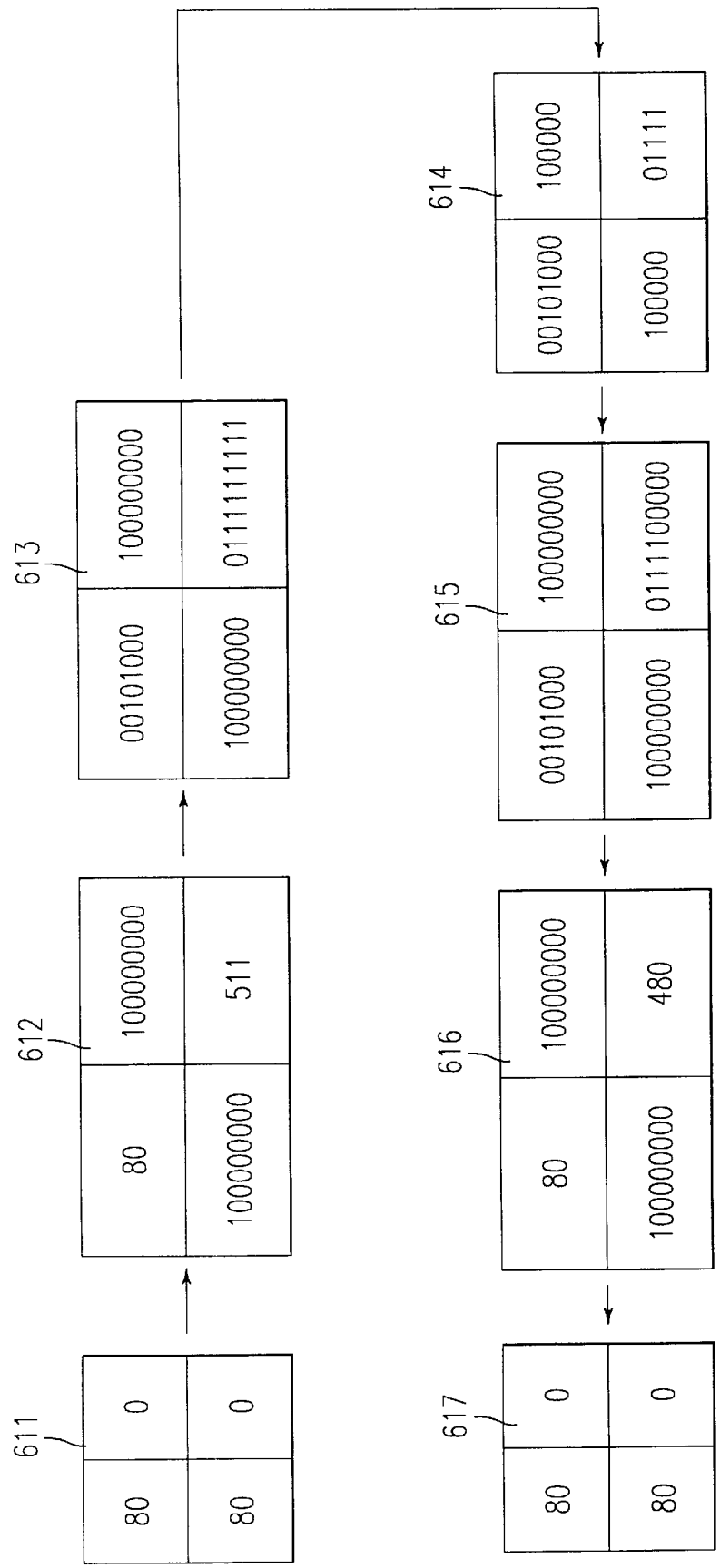

Next, a procedure of encoding and decoding image data blocks by the image data encoding/decoding apparatus 100 is explained with respect to FIGS. 7–9. FIG. 7 illustrates an encoding/decoding procedure when an image data block is other than a simple low-density image. A first image data block 601 outputted from the 2- by 2-pixel block buffer 401 is provided in FIG. 7. The pixels a, b, c, and d of the first image data block 601 have the following respective density values, for example.

a=20
b=18
c=18
d=16

The first image data block 601 includes three different values of image density. In this case, the first image data block 601 is not a simple low-density image since a simple low-density image is defined as a 2- by 2-pixel block that has only two different density values, the background density value which is set to 0 and an arbitrary density value M other than the value of the background density, as described above. Accordingly, the first image data block 601 is determined as an image other than a simple low-density image, and the first data selector 405 selects the image data block outputted from the Wavelet encoder 404.

In the Wavelet encoder 404, the first image data block 601 is converted using the Wavelet method calculations into a second image data block 602 composed of the Wavelet data elements LL, HL, LH, and HH. Decimal values of the Wavelet data elements LL, HL, LH, and HH are as follows.

LL=18
HL=2
LH=2
HH=0

The second image data block 602 is then converted into a third image data block 603 composed of the Wavelet data elements LL, HL, LH, and HH, which represent the following binary values, respectively.

LL=00010010
HL=000000010
LH=000000010
HH=0000000000

The third image data block 603 is then converted by the entropy encoder 406 into a fourth image data block 604. During the conversion, each of the Wavelet data elements HL and LH is compressed into 6-bit image data by erasing three successive bits including the least significant bit thereof. Further, the Wavelet data element HH is compressed into 5-bit image data by erasing five successive bits including the least significant bit thereof. As a result, the fourth image data block 604 includes the following Wavelet data elements LL, HL, LH, and HH in binary notation.

LL=00010010
HL=000000
LH=000000
HH=00000

In this way, the 2- by 2-pixel block is compressed. The thus-compressed image data block, i.e. the fourth image data block 604, is transferred to the data decoder 4 via the page memory 3.

In the entropy decoder 501 of the data decoder 4, the data bits that have been erased during the data compression operation by the entropy encoder 406 are regenerated, set to 0, and reattached to each of the least significant bits of the respective Wavelet data elements. Decompression of the compressed image data block can be achieved in this way.

The fourth image data block 604 is thus converted by the entropy decoder 501 into a fifth image data block 605 including the Wavelet data elements LL, HL, LH, and HH which respectively represent the following binary values.

LL=00010010
HL=000000000
LH=000000000
HH=0000000000

Then, the fifth image data block 605 is converted into a sixth image data block 606 including the Wavelet data elements LL, HL, LH, and HH which respectively represent the following decimal values.

LL=18
HL=0
LH=0
HH=0

In this case, the second image type determining unit 503 examines the value of the Wavelet data element HH and determines that the image data block, i.e. the sixth image data block 606, is an image other than a simple low-density image, because the value of the Wavelet data element HH is not equal to the flag value 480. Then, the sixth image data block 606 is converted into an output image data block 607, via the Wavelet decoder 504. Accordingly, the second data selector 505 selects the image data, i.e. the output image data block 607, outputted from the Wavelet decoder 504. The pixels a, b, c, and d of the output image data block 607 have the following respective values.

a=18
b=18
c=18
d=18

In this way, the first image data block 601, which is an image other than a simple low-density image, can be compressed by the data encoder 2 and stored in the page memory 3. Upon request, the compressed image data block can be decompressed by the data decoder 4 to the output image data 607, which is composed of the pixels a, b, c, and d similar to those of the first image data block 601.

FIG. 8 illustrates the encoding/decoding procedure when an image data block is a simple low-density image. A first image data block 611 outputted from the 2- by 2-pixel block buffer 401 is provided in FIG. 8. The pixels a, b, c, and d of the first image data block 611 have the following respective density values, for example.

a=80
b=0
c=80
d=0

The first image data block 611 is a simple low-density image because it includes only two different values, 0 which is the background density and 80 which differs from the background density. Accordingly, the first image data block 611 is determined as the simple low-density image, and the first data selector 405 selects the image data block outputted from the density encoder 403.

In the density encoder 403, the first image data block 611 is converted into a second image data block 612 which contains the following values.

LL=80 (in decimal notation)
HL=100000000 (in binary notation)
LH=100000000 (in binary notation)
HH=511 (in decimal notation)

The second image data block 612 is then converted into a third image data block 613 which includes the following values.

LL=01010000
HL=100000000
LH=100000000
HH=0111111111

The third image data block 613 is then converted into a fourth image data block 614, by erasing three successive bits including the least significant bit for the elements HL and LH and five successive bits including the least significant bit for the element HH. As a result, the fourth image data block 614 is compressed and has the following values.

LL=01010000
HL=100000
LH=100000
HH=01111

In this way, the image data, i.e. the fourth image data block 614, is compressed in the data encoder 2 when the image data block is a simple low-density image. The thus-compressed image data block, i.e. the fourth image data block 614, is stored in the page memory 3 and transferred to the data decoder 4 upon request.

In the data decoder 4, the data bits which have been erased during the data compression operation by the data encoder 2 are regenerated, set to 0, and reattached to each of the least significant bits of the respective data elements. As a result, each compressed value of the data elements is decompressed. The fourth image data block 614 is thus converted into a fifth image data block 615. The elements LL, HL, LH, and HH of the fifth image data block 615 have the following respective binary values.

LL=01010000
HL=100000000
LH=100000000
HH=0111100000

The fifth image data block 615 is then converted into a sixth image data block 616 including the elements LL, HL, LH, and HH which respectively represent the following values.

LL=80 (in decimal notation)
HL=100000000 (in binary notation)
LH=100000000 (in binary notation)
HH=480 (in decimal notation)

As the value of the data element HH is equal to 480, the second image type determining unit 503 determines that the sixth image data block 616 is a simple low-density image. At the same time, the density decoder 502 converts the sixth image data block 616 into an output image data block 617. Then, in accordance with the determination by the second image type determining unit 503, the second data selector 505 selects the output image data block 617 outputted from the density decoder 502. The pixels a, b, c, and d of the output image data block 617 have the following respective decimal values.

a=80
b=0
c=80
d=0

In this way, the first image data block 611, having only two different density values, 0 as the background density and 80 as the density value M other than the background density, can be compressed by the data encoder 2 and stored in the page memory 3. Then, upon request, the image data block which has the flag information F can be decompressed by the data decoder 4 to the output image data 617 which includes the pixels a, b, c, and d similar to those of the first image data block 611.

When images of computer graphics and letters, in particular, are converted into the above-described data form of 2- by 2-pixel blocks, they have a tendency to have only two density values. A case in which a letter image, having 0 as the background density and 80 as a density of the letter, is converted into 2- by 2-pixel blocks is examined, for example. Conversion results by the Wavelet encoder 404 and the density encoder 403 may be different.

Figure 9A:
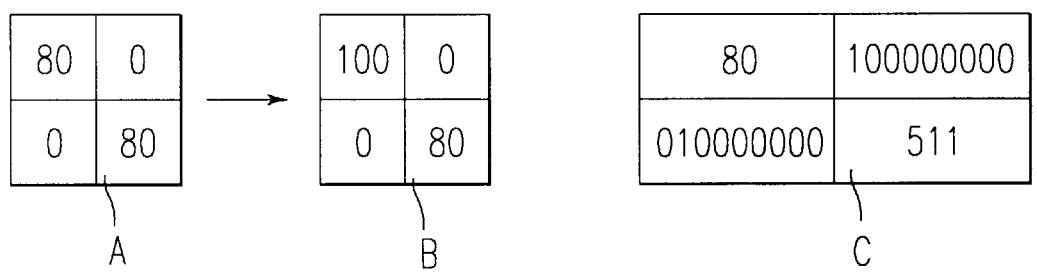
FIGS. 9(a)–9(c) explain a difference between data encoding/decoding results using density-based-data and Wavelet data conversion methods.
Figure 9B:
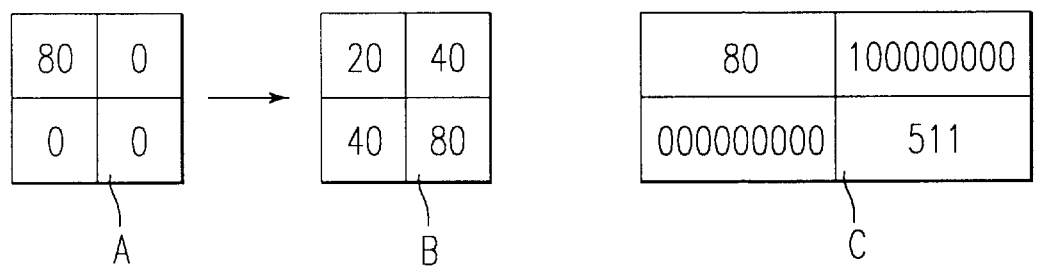
Figure 9C:
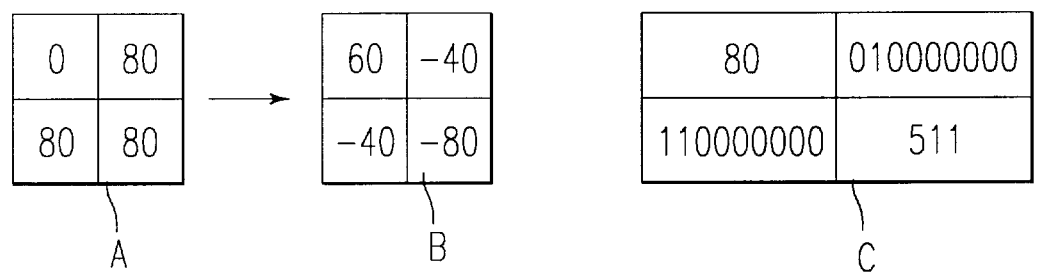

In FIGS. 9(a)–9(c), there are shown three exemplary ways, among various possible ones, for a 2- by 2-pixel block around a border between the letter and the background in the letter image to have the density values 0 and 80 at each pixel location. For each one of the three exemplary ways, a first image data block is indicated by a letter A, an image data block made by compressing the first image data block using the Wavelet encoder 404 is indicated by a letter B, and another image data block made by compressing the first image data block using the density encoder 403 is indicated by a letter C. As shown in FIGS. 9(a)–9(c), each of the Wavelet data elements LL, HL, LH, and HH of the respective image data blocks is set to a random value when the Wavelet encoder 404 is used. Therefore, these image data blocks are not necessarily suitable for data compression.

In contrast, when the density encoder 403 is used, each of the image data blocks has a constant density value (LL=80), constant flag information F (HH=511), and two location information values different from each other. In this case, the difference in the location information only comes from two successive bits including the most significant bit of each of the elements HL and LH. Therefore, these image data blocks having constant values except for the values where only two bits are suitable for data compression. Accordingly, when an image data block from a letter image is encoded by the density encoder 403 and inputted to the entropy encoding unit 406, compression of the image data block can be made in a suitable and efficient manner, regardless of the letter density value.

Figure 10:
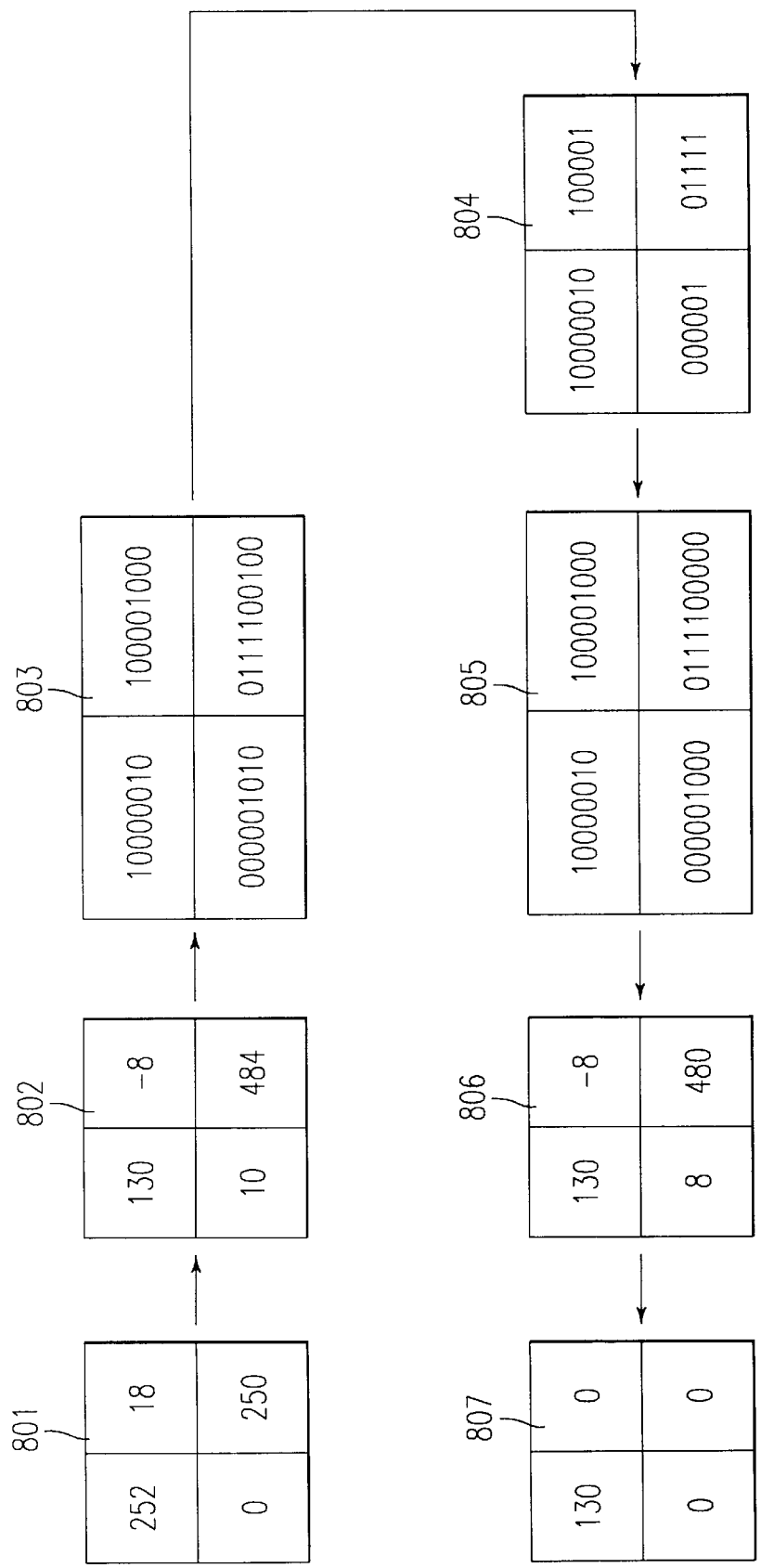
FIGS. 10 and 11 explain a first modified procedure of encoding/decoding a 2- by 2-pixel block by the apparatus of the first embodiment shown in FIG. 1.

FIG. 10 illustrates an example of how the encoding/decoding procedure fails when an image data block is other than a simple low-density image. A first image data block 801 outputted from the 2- by 2-pixel block buffer 401 is provided in FIG. 10. The pixels a, b, c, and d of the first image data block 801 have the following respective density values, for example.

a=252
b=18
c=0
d=250

The density values of the pixels a, b, c, and d of the image data block 801 are all different. Accordingly, the first image data block 801 is determined as an image other than a simple low-density image based on the definition of the simple low-density image. The first data selector 405 therefore selects the output image data block from the Wavelet encoder 404.

Through the Wavelet encoder 404, the first image data block 801 is converted into a second image data block 802 which includes the Wavelet data elements LL, HL, LH, and HH having the following respective values in decimal notation.

LL=130

HL=−8
LH=10
HH=484

By decimal-to-binary conversion, the second image data block 802 is converted into a third image data block 803 and the Wavelet data elements LL, HL, LH, and HH thereof are converted to the following respective binary values.

LL=10000010
HL=100001000
LH=000001010
HH=0111100100

Then, performed are the data compression operations in which three successive bits including the least significant bit are erased from the Wavelet data elements HL and LH and five successive bits including the least significant bit are erased from the Wavelet data element HH. The third image data block 803 is thus compressed and converted into a fourth image data block 804. As a result, the Wavelet data elements LL, HL, LH, and HH of the fourth image data block 804 have the following respective binary values.

LL=10000010
HL=100001
LH=000001
HH=01111

The thus-compressed image data block 804 is subsequently stored in the page memory 3. Upon request, the image data block 804 is transferred to the data decoder 4 from the page memory 3.

In the data decoder 4, the image data block 804 undergoes the decompression operation by the entropy decoder 501. During the decompression operation, a set of three successive bits, each having a value 0, is attached to each of the least significant bits of the Wavelet data elements HL and LH, and a set of five successive bits, each having a value 0, is attached to the least significant bit of the Wavelet data elements HL. Thus, the bit lengths which have been shrunk through the data compression operations are recovered and the bit-recovered image data block is referred to as a fifth image data block 805. The resultant elements of the fifth image data block 805 have the following binary values, respectively.

LL=10000010
HL=100001000
LH=000001000
HH=0111100000

By binary-to-decimal conversion, the fifth image data block 805 is converted to a sixth image data block 806 which includes the Wavelet data elements having the following respective values in decimal notation:

LL=130
HL=−8
LH=8
HH=480

As the value of the data element HH is equal to the flag information which is 480, the second image type determining unit 503 determines that the sixth image data block 806 is a simple low-density image. However, this determination result is wrong because the first image data block 801 has been determined as an image other than a simple low-density image by the first image type determining unit 402. At the same time of the determination, the sixth image data block 806 is converted into an output image data block 807 by the density decoder 502.

If the operation is further proceeded despite the fact that the determination result is wrong, the second data selector 505 selects the output image data block 807 from the density decoder 502 in accordance with the determination result. The Wavelet data elements LL, HL, LH, and HH of the output image data block 807 have the following respective decimal values which have great differences from those of the first image data block 801:

a=130
b=0
c=0
d=0.

Figure 11:
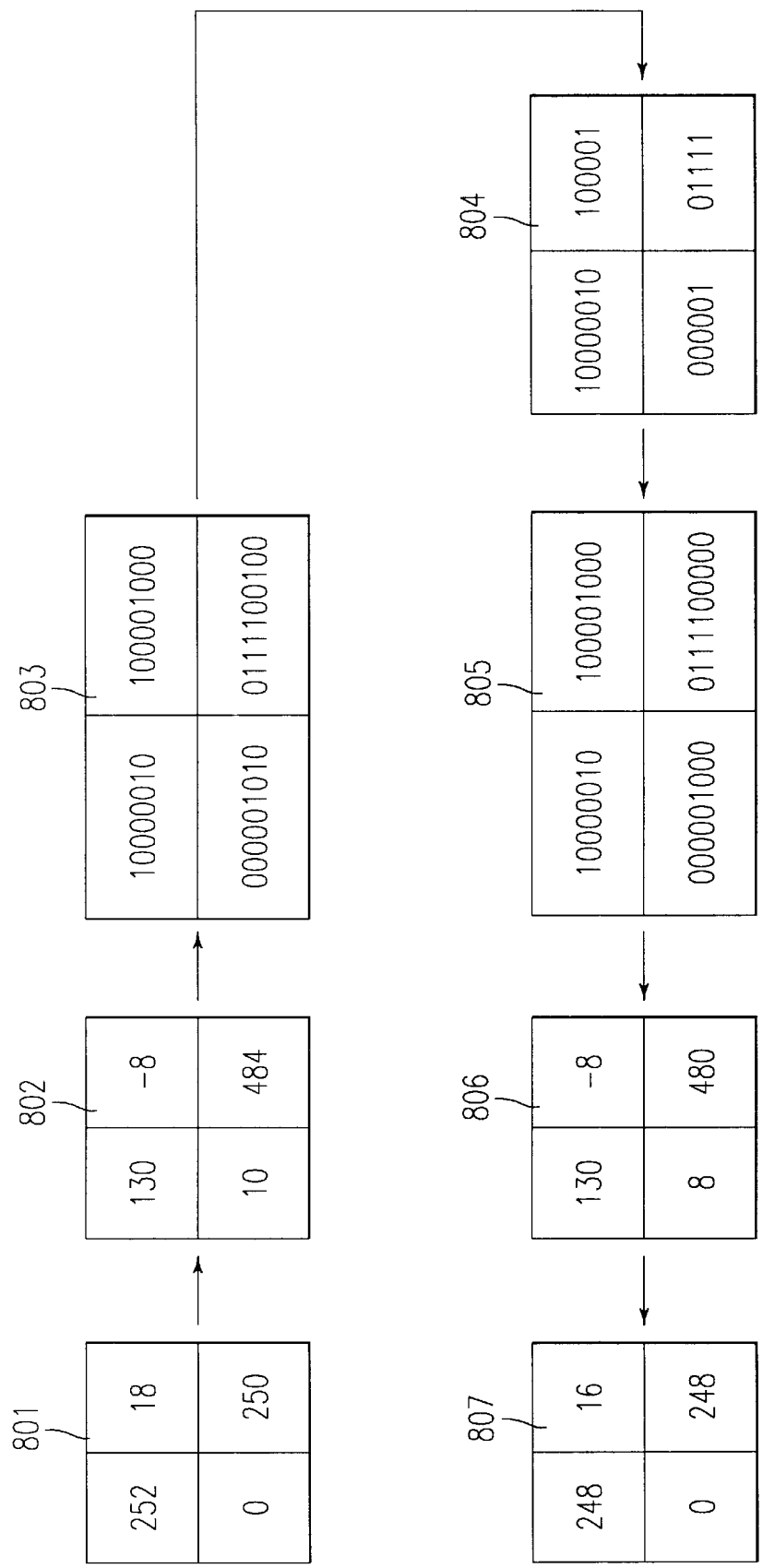

In this example, the image data encoding/decoding apparatus 100 does not perform the proper encoding/decoding operation. In order to avoid the above-described failure, a first modified encoding/decoding procedure for the image data encoding/decoding apparatus 100 is provided as shown in FIG. 11. The procedure of FIG. 11 is similar to that of FIG. 10, except for a provision of how the second image type determining unit 503 determines whether the sixth image data block 806 is a simple low-density area.

In FIG. 11, the second data type determining unit 503 determines whether the image data block 806 has the proper location information at the elements HL and LH, as well as the flag information F. As described above, when an image data block is a simple low-density image, the density encoder 403 is used for the encoding operation by which the 9-bit location information are generated. In this case, the 9-bit location information at the elements HL and LH are different from each other and each have one of the fixed values, 000000000, 010000000, 100000000, or 110000000. Using this characteristic, when the Wavelet data element HH is determined as the flag information 480 and the image data block 806 is therefore determined as a simple low-density image, the second data type determining unit 503 further determines as to whether the sixth image data block 806 has the proper location information. When the sixth image data block 806 is determined to have an improper location information, the second data type determining unit 503 determines that the sixth image data block 806 is an image other than a simple low-density area. At the same time, the Wavelet decoder 502 converts the sixth image data block 806 into an output image data block 808. Then, in accordance with the determination result by the second data type determining unit 503, the second data selector 505 selects the output image data block 808 from the Wavelet decoder 504 which includes the pixels a, b, c, and d having the following respective decimal values, which in this case, have almost no difference from those of the first image data block 801.

a=250
b=18
c=2
d=250

In this way, the image data encoding/decoding apparatus 100 performs the first modified encoding/decoding procedure in which the second data type determining unit 503 determines whether the image data block 806 has the proper location information at the elements HL and LH as well as the flag information F in order to avoid the determination of a failure.

Next, two different information assignment with respect to the outputs from the density encoding unit 403 will be explained with reference to FIGS. 8 and 12. When an image data block is a simple low-density image and the outputs from the density encoder 403 are selected, the density information of the image data block, the two location information of the pixels, and the flag information are assigned to the Wavelet data elements LL, HL, LH, and HH, respectively, in two different ways by the first data selector 405.

A first information assignment is referred to the one used in the encoding/decoding procedure which is described with respect to FIG. 8. In this case, the density information is assigned to the Wavelet data element LL, the location information to the Wavelet data elements HL and LH, and the flag information to the Wavelet data element HH.

A second information assignment is one in which the density information is assigned to the Wavelet data element HH, the location information to the Wavelet data elements HL and LH, and the flag information to the Wavelet data element LL.

In both cases, the density information is used as it is without a change, the two location information are assigned to two successive bits including the most significant bit of the Wavelet data elements HL and LH, as described above, and the Wavelet data element is set to a maximum value in order to assign the flag information.

The reference value for the second data type determining unit 503 to recognize the flag information is 480 in the first information assignment because the lower five bits will be erased from the element HH and 255 in the second information assignment because the data element LL will not undergo the data compression operation.

In the encoding/decoding procedure shown in FIG. 8, the above-described first information assignment is used, and the density information of the first image data block 611 is correctly transmitted to the output image data block 617. This is due to the arrangement such that the density information is assigned to the Wavelet data element LL which does not undergo the bit-erasing data compression operation.

Figure 12:
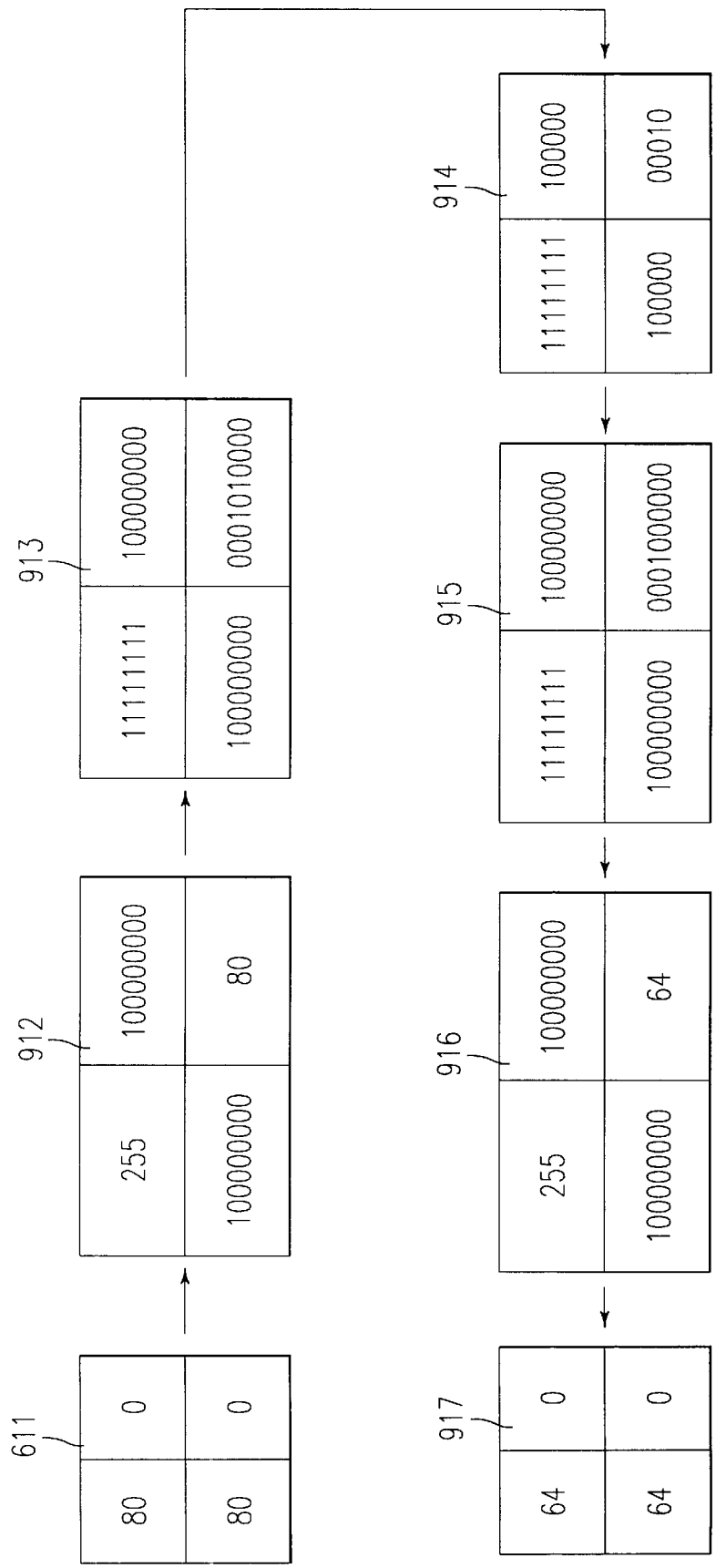
FIG. 12 illustrates a second modified procedure of encoding/decoding a 2- by 2-pixel block by the apparatus of the first embodiment shown in FIG. 1.

FIG. 12 illustrates a second modified encoding/decoding procedure in which the above-described second information assignment is implemented. In the second modified encoding/decoding procedure of FIG. 12, the first image data block 611 is a simple low-density image and includes the pixels a, b, c, and d having the following values.

a=80 b=0 c=80 d=0

The first image data block 611 is a simple low-density image, since it has only two values, 0 which is the background density and 80 which is another density different from the background density. Accordingly, the first image type determining unit 402 determines that the first image data block 611 is a simple low-density image and the first data selector 405 selects the outputs from the density encoder 403.

The first image data block 611 is converted by the density encoder 403 into a second image data block 912 which includes the elements having the following values.

LL=255 (in decimal notation)

HL 100000000 (in binary notation)

LH=100000000 (in binary notation)

HH 80 (in decimal notation)

Then, the second image data block 912 is converted into a third image data block 913 which have the following binary values, using the second information assignment.

LL=11111111

HL=100000000

LH=100000000

HH=0001010000

The entropy encoder 406 converts the third image data block 913 into a fourth image data block 914 by erasing three successive bits including the least significant bit of the HL and LH elements and five successive bits including the least significant bit of the HH element. As a result, the fourth image data block 914 is compressed and has the following values:

LL=11111111

HL=100000

LH=100000

HH=00010

The thus-compressed image data block, i.e. the fourth image data block 914, is stored in the page memory 3. Upon request, the compressed image data block is transferred to the data decoder 4 from the page memory 3.

In the data decoder 4, the data bits that have been erased during the data compression operation in the data encoder 2 are regenerated, set to 0, and reattached to each of the least significant bits of the respective data elements. As a result, each compressed value of the data elements is decompressed. The fourth image data block 914 is thus converted into a fifth image data block 915. The elements LL, HL, LH, and HH of the fifth image data block 915 have the following respective binary values.

LL=100000000

LH=100000000

HH=0001000000

Then, the fifth image data block 915 is converted into a sixth image data block 916 including the data elements LL, HL, LH, and HH which respectively represent the following decimal values.

LL=255 (in decimal notation)

HL=100000000 (in binary notation)

LH=100000000 (in binary notation)

HH=64 (in decimal notation)

Since the value of the data element LL is equal to 255 which is the flag information, the second image type determining unit 503 determines that the image data block, i.e. the sixth image data block 916, is a simple low-density image. At the same time, the sixth image data block 916 is then converted into an output image data block 917 by the density decoder 502. Then, in accordance with the determination result of the second image type determining unit 503, the second data selector 505 selects the output image data block 917 from the density decoder 502. The data elements LL, HL, LH, and HH of the output image data block 917 have the following respective decimal values.

a=64 b=0 c=64 d=0

In this way, the image data encoding/decoding apparatus 100 successfully performs the second modified encoding/decoding procedure, which implements the second information assignment. However, the density value of the first image data block 611 is slightly different from that of the output image data block 917. This is because the density information which is of high importance relative to other information is assigned to the data element HH which undergoes the data compression operation. Therefore, the density information may be changed from the original value during the decoding process. In contrast, in the first information assigning approach, the density information which requires a relatively great number of bits to represent a value is assigned to the data element LL which is of relatively high importance and the flag information which requires a relatively small number of bits is assigned to the data element HH which is of relatively low importance. Therefore, by the first information assignment, the values of the first image data block 611 can be precisely realized by the output image data block 917, although the same numbers of bits are erased during the data compression operation in comparison with the second information assignment.

Figure 13:
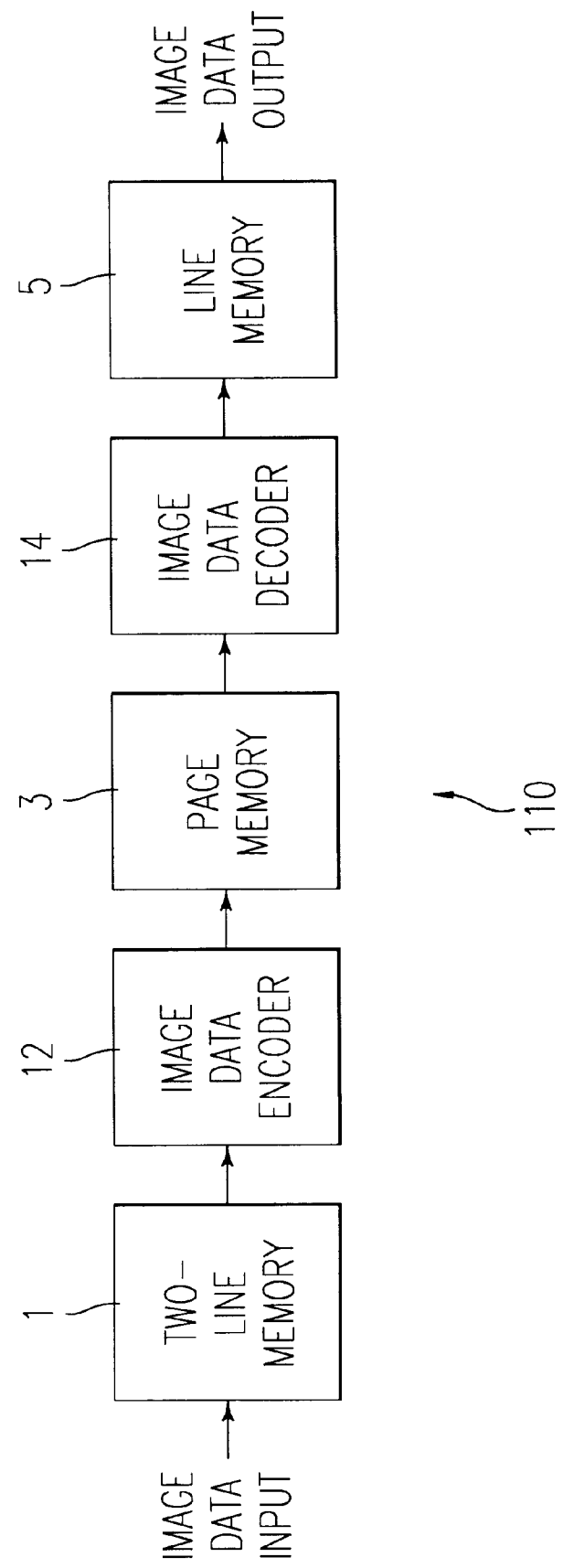
FIGS. 13–15 illustrate a second embodiment of the image data encoding/decoding apparatus shown in FIG. 1 and its data encoder and decoder, respectively.

Next, an image data encoding/decoding apparatus 110 as a second embodiment according to the present invention is explained with reference to FIGS. 13–15. The image data encoding/decoding apparatus 110 of FIG. 13 is similar to that of FIG. 1, except for a data encoder 12 and a data decoder 14 of FIG. 13 which are in place of the data encoder 2 and the data decoder 4 of FIG. 1, respectively.

Figure 14:
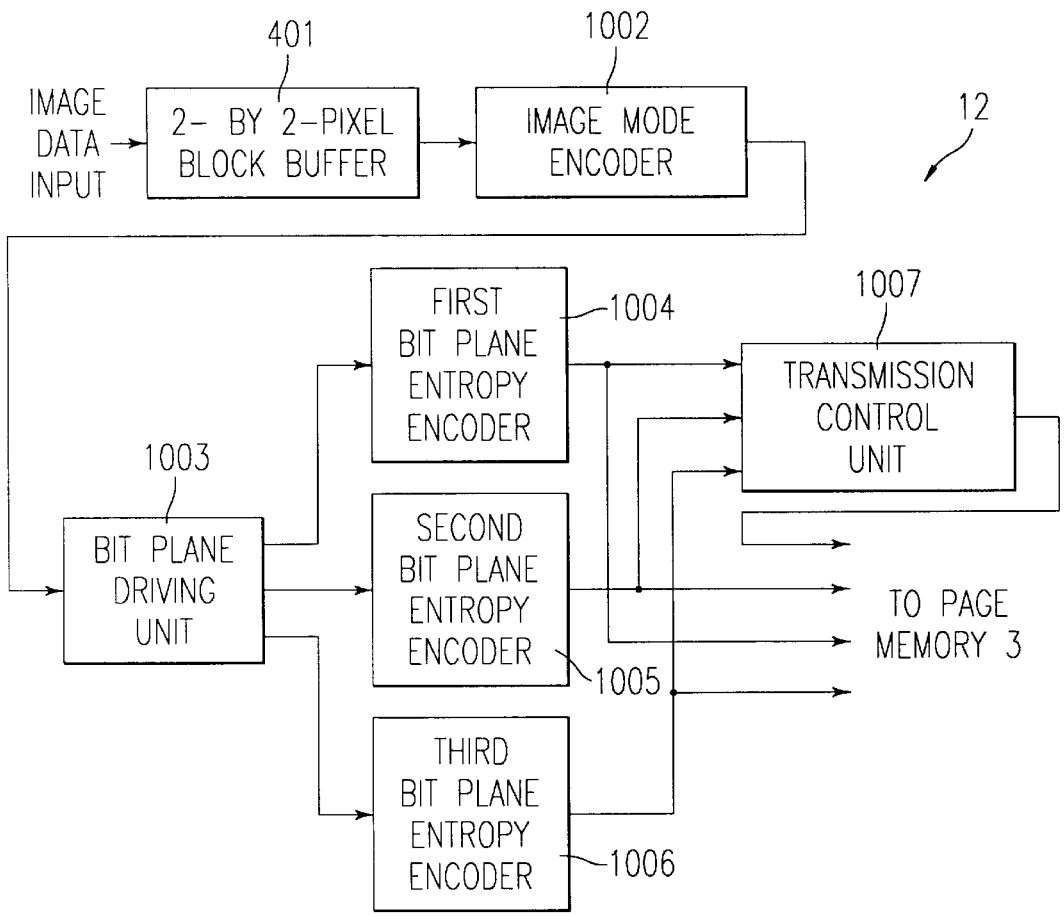

FIG. 14 illustrates the data encoder 12 which includes the two-line memory 1, the 2- by 2-pixel block buffer 401, a image model encoder 1002, a bit plane dividing unit 1003, a first bit plane entropy encoder 1004, a second bit plane entropy encoder 1005, a third bit plane entropy encoder 1006, and a transmission control unit 1007. FIG. 15 illustrates the data decoder 14 which includes a bit plane entropy decoder 1009 and a image model decoder 1010. An encoding/decoding procedure for the image data encoding/decoding apparatus 110 is explained below.

In the data encoder 12 of FIG. 14, image data from an external apparatus such as a host computer are converted into a 2- by 2-pixel block which includes pixels a, b, c, and d and temporarily stored into the 2- by 2-pixel block buffer 401. The 2- by 2-pixel block is then entered into the image model encoder 1002 in a manner similar to that of the image data encoding/decoding apparatus 100. In the image model encoder 1002, the data compression operation is not performed and the data elements have the following bit lengths.

LL: 8 bits

HL: 9 bits

LH: 9 bits

HH: 10 bits

The image data block, or 2- by 2-pixel block, is then transmitted to the bit plane dividing unit 1003 and is divided into three data sets; a most important data set composed of three successive bits including the most significant bit of data element, an important data set composed of three successive bits immediately next to the most important data set, and a non-important data set composed of three successive bits immediately next to the important data set. The data of the most important, important, and non-important data sets are transferred to the first, second, and third bit plane entropy encoders 1004, 1005, and 1006, respectively, and encoded. The three data sets from the image data block, which are encoded by the first, second, and third bit plane entropy encoders 1004, 1005, and 1006, respectively, are transferred to the transmission control unit 1007 and stored in the page memory 3.

The transmission control unit 1007 examines an entire amount of the image data, which are outputted from the first, second, and third bit plane entropy encoders 1004, 1005, and 1006, and accordingly determines whether the entire amount of the image data can be stored in the page memory 3. The transmission control unit 1007 arranges to abandon the data which are of less importance and to store the data which are of more importance, when the entire amount of data can not be stored in the page memory 3. In this way, the image data encoding/decoding apparatus 110 performs a data compression operation, which is referred to as a bit plane based data compression operation.

Figure 15:
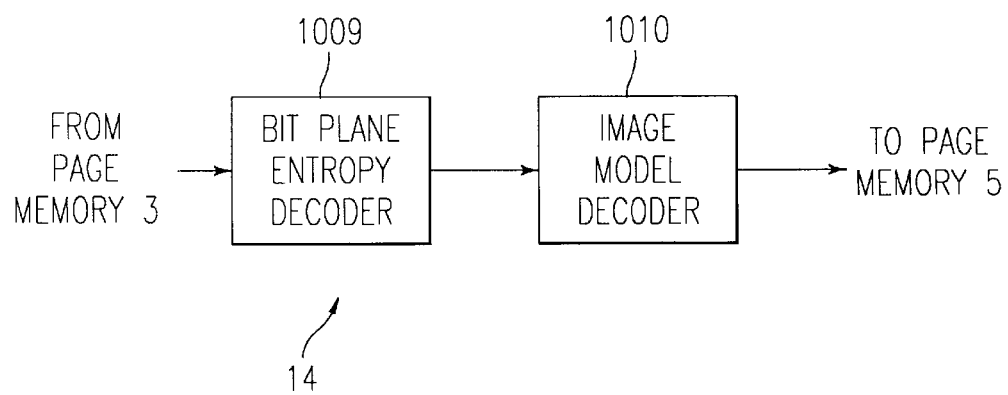

Upon request, the image data block stored in the page memory 3 is transferred to the data decoder 14 of FIG. 15. The three data sets of the image data block, which have been encoded by the first, second, and third bit plane entropy encoders 1004, 1005, and 1006, are decoded by the bit plane entropy decoder 1009 and further decoded by the image model decoder 1010. The image data are thus decoded in the data decoder 14, and the decoded image data block is stored in the line memory 5 and proceeded to a next data processing operation such as a data printing operation.

With the thus-arranged structure, the image data encoding/decoding apparatus 110 can perform the data compression operation in accordance with the capacity of the page memory 3. Moreover, the image data encoding/decoding apparatus 110 is capable of decompressing the compressed binary image data representing letters, in particular, even after abandoning the less important data during the data compression operation.

Next, an alternative way of the sign bit assignment with respect to the elements HL, LH, and HH of an image data block is explained with reference to FIG. 16. In the image data encoding/decoding apparatus 100, the most significant bits of the elements HL, LH, and HH, are assigned as the sign bits each for indicating that the value of the element is plus or minus, as shown in FIG. 5. The following alternative way are applicable to both the image data encoding/decoding apparatuses 100 and 110.

A sign bit is added to data to indicate that the data is positive when a value of the sign bit is 0 and that the data is negative when the value of the sign bit is 1. As indicated by an encoded data A in FIG. 16, the sign bit is placed at a position immediately next to, in a side closer to the least significant, a bit closest to the most significant bit among bits set to 1. Positions of the sign bits thus-assigned in the elements HL, LH, and HH may differ from each other. For the data having a value 0, the sign bit which is set to 0 is added and, therefore, all 9 bits are set to 0.

In this way, each of the elements HL, LH, and HH may present bit weights tending to have values 0 in the higher bit side and values 1 in the lower bit side. This results in an increased efficiency of the data compression operation. In particular, when the bit plane based data compression operation is performed to a bit plane closer to the least significant bit, the remaining bit planes may mostly have values 0 and the efficiency of the data compression operation can greatly be increased.

In the data encoding/decoding apparatuses 100/110, a so-called gray encoding operation is performed after the sign bit assigning operation and, then, the encoded data undergo the bit plane based data compression operation. In the gray encoding operation, every two adjacent bits in the element are compared one after another and when the two bits have the same value, a value 0 is given or when the two bits have different values, a value 1 is given. More specifically, the least significant bit and the second bit are compared and a value is given in accordance with the comparison result. Then, the second bit and the third bit are compared and a value is given in accordance with the comparison result. Eventually, after the operation on the last two adjacent bits including the most significant bit, the most significant bit is compared with a value 0 and a value is given in accordance with the comparison result. The resultant data are shown in FIG. 16, as indicated by encoded data B.

By the gray encoding operation, image data can be encoded into data, i.e. the encoded data B, in a form suitable for the data compression operation. For example, when 9-bit data represents its minimum value −255, the data is encoded into data having a value 1 at the most significant bit and values 0 at all the remaining bits. In addition, when data represent a relatively small value, a value after the gray encoding operation has a number of bits having values 0 in the higher bit side.

When a value of the element for the flag information is preset to its minimum value and the gray encoding operation is performed to the preset value, compression of the flag information can be performed in an efficient manner. More specifically, when the element is 9-bit data, for example, and encoded through the gray encoding, operation, the encoded data has a value 1 only at the most significant bit and values 0 at all the remaining bits. Thereby, when the input image data block which is a simple low-density image is processed, the least significant data element HH in which the flag information is embedded can be subjected to the bit plane based data compression operation and, as a result, only the most significant bit is set to 1. Also, when the input image data block is an image other than a simple low-density image, the relatively low-valued Wavelet data elements HL, LH, and HH can be eliminated, so that an efficient data compression operation is performed.

Next, a third modified encoding/decoding procedure for the image data encoding/decoding apparatus 100 is explained with reference to FIGS. 17–19(c). In the third modified encoding/decoding procedure, the above-described alternative sign bit assigning operation and gray encoding operation, which are shown in FIG. 16, are implemented.

FIG. 19(a) illustrates an information assignment to the elements LL, HL, LH, and HH, applied to the third modified encoding/decoding procedure for the image data encoding/ decoding apparatus 100. The information assignment of FIG. 19(a) is similar to that shown in FIG. 6(a), except for the value of the flag information which is −511 in FIG. 19(a). FIG. 19(b) illustrates examples of value conversion using the alternative sign bit assigning operation and gray encoding operation indicated by the encoded values A and B shown in FIG. 16. FIG. 19(c) show relationships between the Wavelet data elements HL and LH and the location information a, b, c, and d, which are similar to those shown in FIG. 6(b). In this procedure, the data compression operation erases two bits from each of the data elements LL, HL, LH, and HH, after the gray encoding operation. Also, the reference value for the flag information at the element HH is set to −511 during decoding operation as well as encoding operation. FIG. 19(c) illustrate a table in which the location information are converted in a way such that values 0, −255, −127, and 128 are assigned to the elements HL and LIT, so that two successive bits, including the most significant bit of the respective gray-encoded data representing values 0, −255, −127, and 128, become 00, 01, 10, and 11, respectively.

Figure 17:
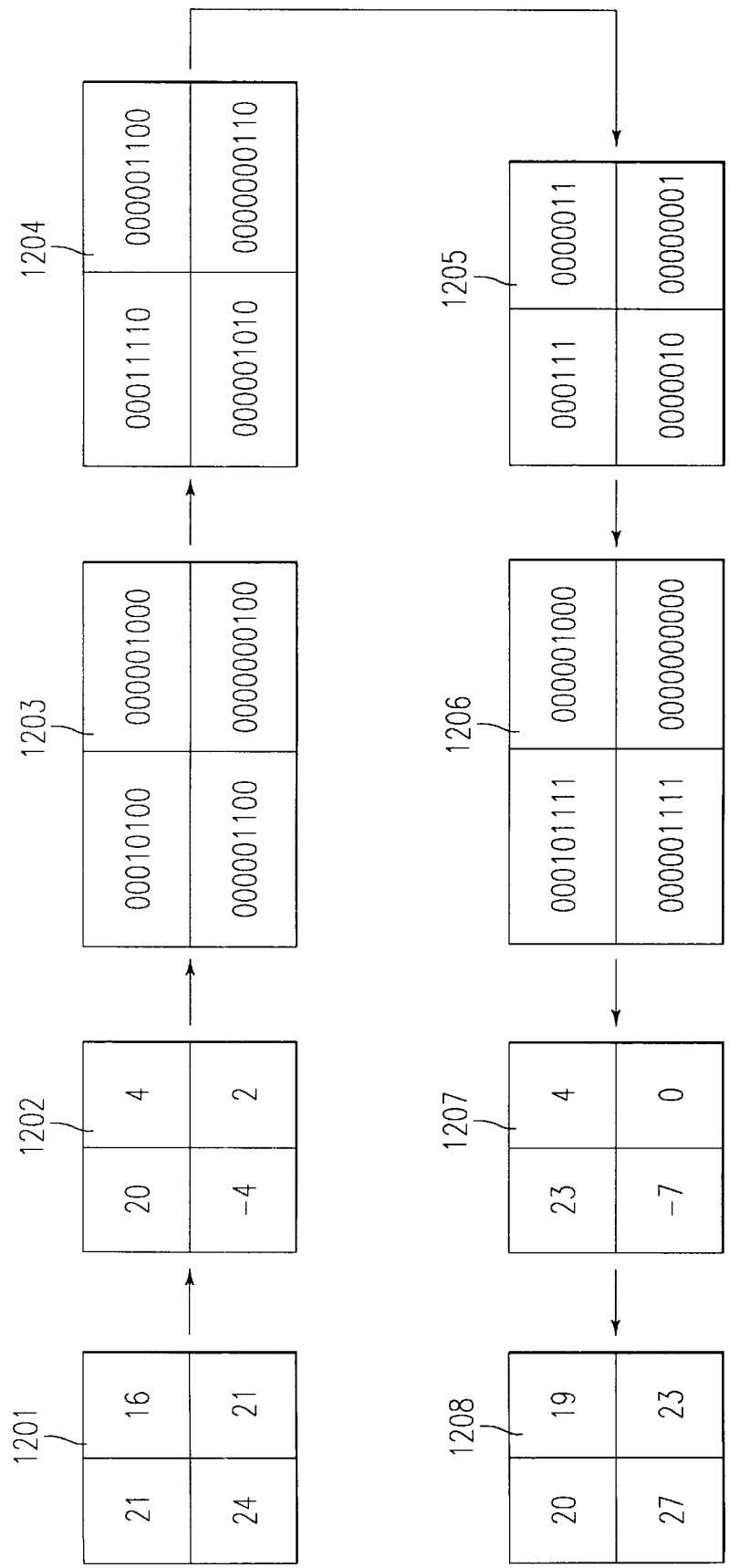
FIGS. 17 and 18 illustrate the third modified procedure of encoding/decoding blocks of an image other than a simple low-density image and a simple low-density image by the apparatus of the first embodiment shown in FIG. 1.

FIG. 17 illustrates the third modified encoding/decoding procedure for the image data encoding/decoding apparatus 100 under the thus-arranged conditions. In FIG. 17, a first image data block 1201, which is an image other than a simple low-density image and includes the following pixels a, b, c, and d, is inputted.

a=21
b=16
c=24
d=21

In this case, three different values of image density exist in the first image data block 1201. Since a simple low-density image is defined as a 2- by 2-pixel block that has only two different density values as defined above, the first image data block 1201 is not a simple low-density image.

Accordingly, the first image type determining unit 402 determines that the first image data block 1201 is an image other than a simple low-density image. At the same time, the Wavelet encoder 404 converts the first image data block 1201 into a second image data block 1202. Then, in accordance with the determination result by the first image type determining unit 402, the first data selector 405 selects the second image data block 1202 outputted from the Wavelet encoder 404.

The second image data block 1202 includes the Wavelet data elements LL, HL, LH, and HH of which values in decimal notation are as follows.

LL=20
HL=4
LH=−4
HH=2

The second image data block 1202 is then converted into a third image data block 1203 which includes the Wavelet data elements LL, HL, LH, and HH, respectively representing the following binary values.

LL=00010100
HL=000001000
LH=000001100
HH=0000000100

In each of the Wavelet data elements included in the third image data block 1203, 1-weighted bits are collected at the lower bit side, regardless of whether these elements have positive or negative values. That is, the third image data block 1203 is encoded into data suitable for an efficient data compression operation. Then, the third image data block 1203 is converted, using the gray encoding method, into a fourth image data block 1204 which includes the Wavelet data elements LL, HL, LH, and HH of which binary values are as follows.

LL=00011110
HL=000001100
LH=000001010
HH=0000000110

Then, two successive bits including the most significant bit are erased from each of the Wavelet data elements included in the fourth image data block 1204. The thus-converted data block is a fifth image data block 1205 which includes the Wavelet data elements of which binary values are as follows.

LL=000111
HL=0000011
LH=0000010
HH=00000001

In this way, the image data are compressed. The thus-compressed image data, of the fifth image data block 1205, are stored in the page memory 3. Upon request, the fifth image data block 1205 is transferred to the data decoder 4 from the page memory 3.

In the data decoder 4, the compressed image data are decoded and released from the gray encoding form by the entropy decoder 501. Then, the data bits which have been erased during the data compression procedure in the data encoder 2 are regenerated, set to 0, and reattached to each of the least significant bits of the respective Wavelet data elements. Thereby, the compressed image data block can be decompressed. The fifth image data block 1205 is thus converted into a sixth image data block 1206 that includes Wavelet data elements LL, HL, LH, and HH, representing the following respective binary values.

LL=00010111
HL=000001000
LH=000001111
HH=0000000000

The sixth image data block 1206 is then converted into a seventh image data block 1207 including the elements LL, HL, LH, and HH which respectively represent the following decimal values.

LL=23
HL=4
LH=−7
HH=0

The second image type determining unit 503 determines that the image data block, i.e. the seventh image data block 1207, is an image other than a simple low-density image, because the value of the Wavelet data element HH is not equal to −511. At the same time, the Wavelet decoder 504 converts the seventh image data block 1207 into an output image data block 1208. Then, the second data selector 505 selects the image data outputted from the Wavelet decoder 504 in accordance with the determination result by the second image type determining unit 503. The Wavelet data elements LL, HL, LH, and HH of the output image data block 1208 have the following respective decimal values.

a=20
b=19
c=27
d=23

The output image data block 1208 shows deterioration in data decompression efficiency, relative to the first image data block 1201. However, the magnitude of the deterioration is for a value of 2 bits which may be acceptable. In this way, the first image data block 1201 is compressed and then decompressed into the output image data 1208 that includes the Wavelet data elements similar to those of the first image data block 1201.

Figure 18:
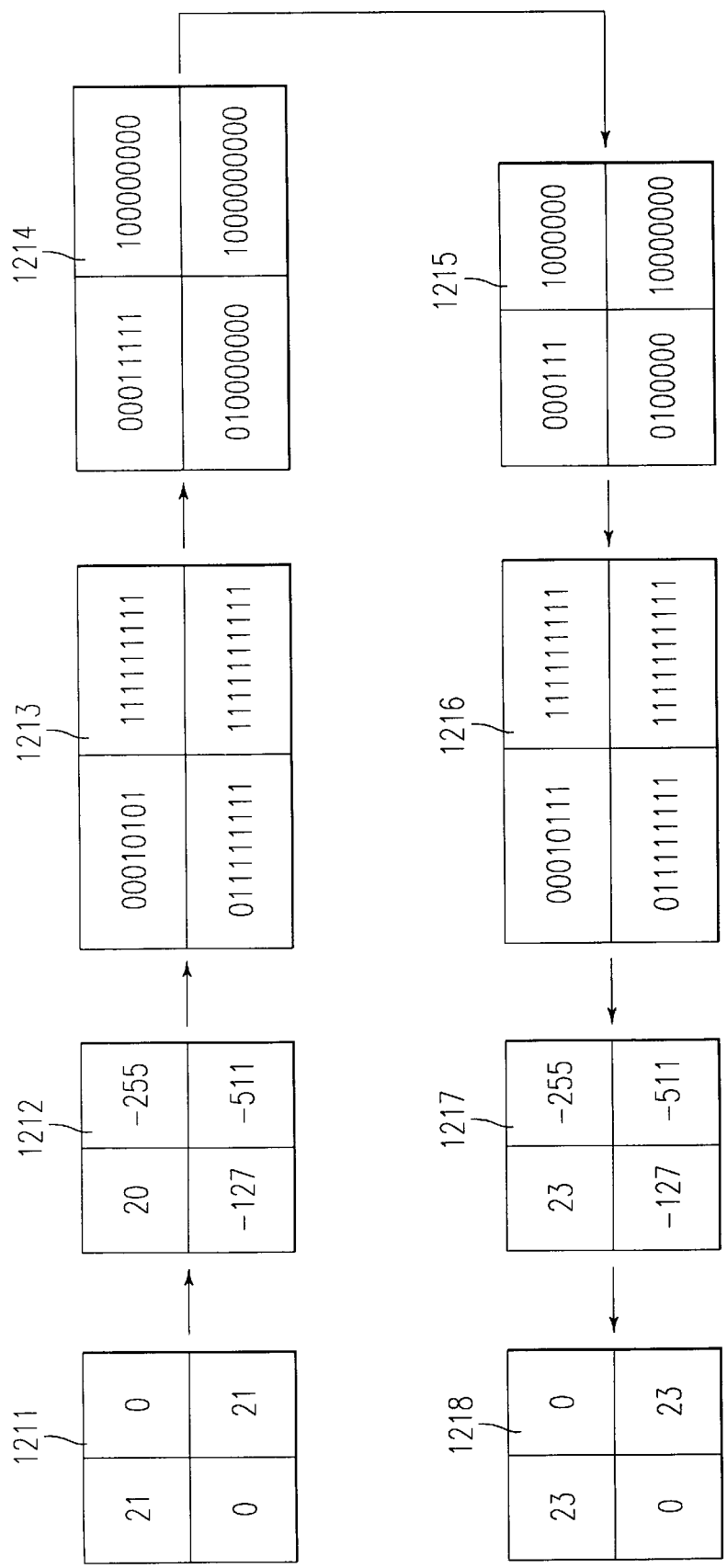

FIG. 18 illustrates a case in which a first image data block 1211, which is a simple low-density image and includes the following pixels a, b, c, and d, is inputted.

a=21
b=0
c=0
d=21

In this case, only the background density having a value 0 and another density having a value 21 which differs from the background density exist in the first image data block 1211. Since a simple low-density image is defined as a 2- by 2-pixel block that has only two different density values as defined above, the first image data block 1211 is a simple low-density image. Accordingly, the first image type determining unit 402 determines that the first image data block 1211 is a simple low-density image. At the same time, the density encoder 403 converts the first image data block 1211 into a second image data block 1212 that has the following values. Then, the first data selector 405 selects the second image data block 1212 outputted from the density encoder 403.

LL=21
HL=−255
LH=−127
HH=−511

The second image data block 1212 is then converted into a third image data block 1213 that has the following values.

LL=00010101
HL=111111111
LH=011111111
HH=1111111111

The third image data block 1213 is then converted, using the gray encoding operation, into a fourth image data block 1214 having the following values.

LL=00011111
HL=100000000
LH=010000000
HH=1000000000

The fourth image data block 1214 is then converted into a fifth image data block 1215 by erasing two successive bits including the least significant bit of each of the data elements LL, HL, LH, and HH. As a result, the fifth image data block 1215 is compressed and has the following values.

LL=000111
HL=1000000
LH=0100000
HH=10000000

In this way, the image data, i.e. the fifth image data block 1215, is compressed. The thus-compressed image data block, the fifth image data block 1215, is stored in the page memory 3. Upon request, the fifth image data block 1215 is transferred to the data decoder 4 from the page memory 3.

In the data decoder 4, the compressed image data are decoded and released from the gray encoding form by the entropy decoder 501. Then, the data bits that have been erased during the data compression operation in the data encoder 2 are regenerated, set to 0, and reattached to each of the least significant bits of the respective data elements. As a result, each compressed value of the data elements is decompressed. The fifth image data block 1215 is thus converted into a sixth image data block 1216. The data elements LL, HL, LH, and HH of the sixth image data block 1216 have the following respective binary values.

LL=00010111
HL=111111111
LH=011111111
HH=1111111111

The sixth image data block 1216 is then converted into a seventh image data block 1217 including the data elements LL, HL, LH, and HH which respectively represent the following decimal values.

LL=23
HL=−255
LH=−127
HH=−511

In this case, the second image type determining unit 503 determines that the image data block, i.e. the sixth converted image data block 1217, is a simple low-density image, because the value of the data element HH is equal to −511. Accordingly, the second data selector 505 selects the image data which is outputted from the density decoder 502. The data element HH shows an efficient recovery to a value −511, even though it has undergone the data compression operation. As described above, the flag information can be saved as −511 by preserving only the most significant bit that is set to 1. Before the output data selection by the second data selector 505, the seventh image data block 1217 is converted into an output image data block 1218 by the density decoder 502. The data elements LL, HL, LH, and HH of the output image data block 1218 have the following respective decimal values.

a=23 b=0
c=0
d=23

The output image data block 1218 shows deterioration in data decompression efficiency, relative to the first image data block 1211. However, magnitude of the deterioration is for a value of 2 bits which may be acceptable. In this way, the first image data block 1211 is compressed and then decompressed into the output image data block 1218 that includes the data elements similar to those of the first image data block 1211.

Next, a fourth modified encoding/decoding procedure for the data encoding/decoding apparatus 100 is explained with reference to FIGS. 20(*a*) to 23(*c*). In the fourth modified procedure, the first image type determining unit 402 determines image types in a different manner from the other procedures described above. More specifically, in the fourth modified procedure, an image data block is determined as a simple low-density image when a 2- by 2-pixel block, including pixels a, b, c, and d, includes only two arbitrary and different image density values x and y, or only one image density. In addition, the flag information is set to 511 at the element HH in a similar manner as it is performed in the other procedures described above. Further, the two density values x and y are allocated to the data elements LL and HL, as shown in FIG. 20(*a*). Specifically, one of the values x and y, which is smaller than the other, is allocated to the data element LL. Further, the location information is set to a value in the 0-to-15 range and allocated to the data element LH, as shown in FIGS. 20(*a*) and 20(*b*). When the 2- by 2-pixel block includes only one density, the arbitrary density value y is set to 0 and the location information is set to s15.

Figure 21:
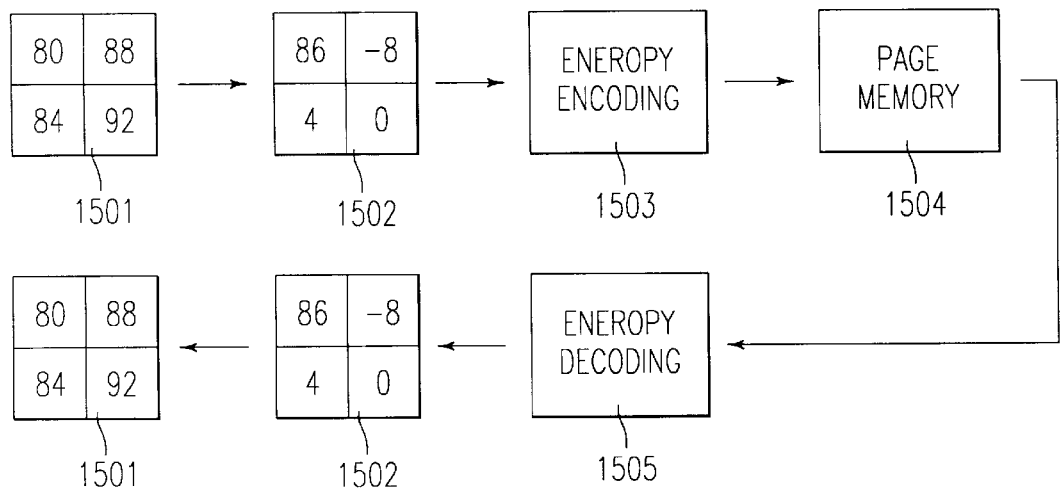
FIG. 21 and 22 illustrate the fourth modified procedure of encoding/decoding blocks of an image other than a simple low-density image and a simple low-density image by the apparatus of the first embodiment shown in FIG. 1.

FIG. 21 shows an exemplary case in which an input image other than a simple low-density image is encoded and decoded using the fourth modified procedure. For example, a first image data block 1501 includes the following pixels a, b, c, and d.

a=80
b=88
c=84
d=92

The first image data block 1201 includes four different values of image density exist. Since a simple low-density image is defined as a 2- by 2-pixel block that has only two arbitrary and different image density values x and y, or that has only one arbitrary image density, the first image type determining unit 402 determines that the first image data block 1501 is an image other than a simple low-density image. Accordingly, the first data selector 405 selects the image data outputted from the Wavelet encoder 404.

At the same time of the above determination by the first image type determining unit 402, the Wavelet encoder 404 converts the first image data block 1501 into a second image data block 1502. The second image data block 1502 includes the Wavelet data elements LL, HL, LH, and HH of which values in decimal notation are as follows.

LL=86
HL=−8
LH=4
HH=0

In this way, the image data are encoded. The thus-encoded image data, i.e. the second image data block 1502, are then transferred to the entropy encoding unit 406 and stored in the page memory 3 (both indicated as the processes with reference numeral 1503 and 1504, respectively, in FIG. 21). In this operation, the input image data are not subjected to the data compression operation. Upon request, the second image data block 1502 is transferred to the data decoder 4.

In the data decoder 4, the encoded image data block is decoded and released from the entropy encoding form by the entropy decoder 501 (indicated as a process with reference numeral 1505 in FIG. 20). Since the image data block has not undergone the data compression operation, the second image data block 1502 can be obtained after passing through the entropy decoder 501. Then, the second image type determining unit 503 examines the value of the Wavelet data element HH and determines that the image data block, i.e. the second image data block 1502, is an image other than a simple low-density image, because the value of the Wavelet data element HH is not equal to 511. The Wavelet decoder 504 then converts the second image data block 1502 into an output image data block which is exactly same as the first image data block 1501. Accordingly, the second data selector 505 selects the image data, i.e. the image data same as the original converted image data block 1501, outputted from the Wavelet decoder 504.

In this way, the first image data block 1501 is encoded and then decoded correctly into the same first image data block 1501.

Figure 22:
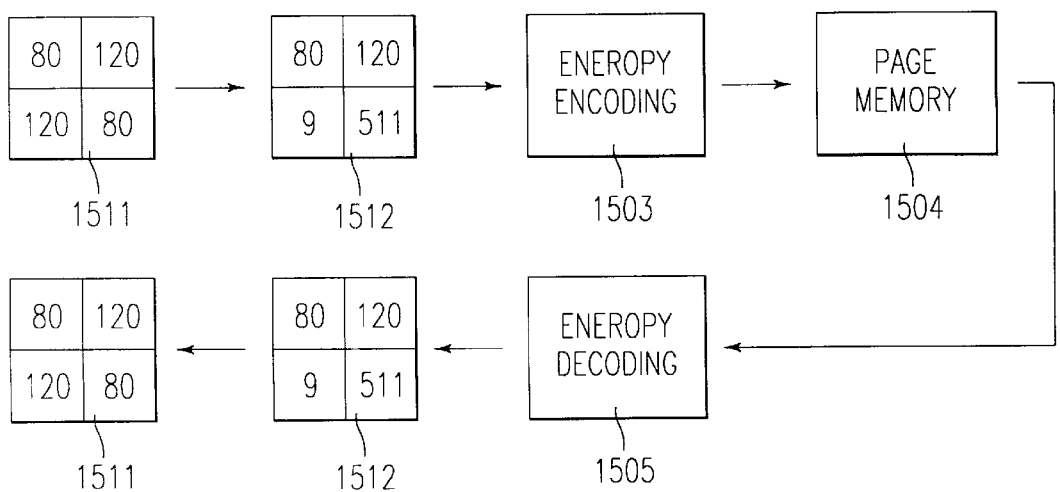

FIG. 22 illustrates a case in which a first image data block 1511, which is a simple low-density image and includes the following pixels a, b, c, and d, is inputted.

a=80
b=120
c=120
d=80

In this case, the first image data block 1511 includes only the two density values. Since a simple low-density image is defined as a 2- by 2-pixel block that has only two arbitrary and different image density values x and y, or that has only one arbitrary image density, the first image type determining unit 402 determines that the first image data block 1511 is a simple low-density image. Accordingly, the first data selector 405 selects the outputs from the density encoder 403.

At the same time of the determination by the first image type determining unit 402, the density encoder 403 converts the first image data block 1511 into a second image data block 1512 that has the following values.

LL=80
HL=120
LH=9
HH=511

In this way, the image data, i.e. the second image data block 1512, is encoded. The thus-encoded image data block, i.e. the second image data block 1512, is transferred to the entropy encoder 406 and stored in the page memory 3 (both indicated as the processes with reference numeral 1501 and 1504, respectively, in FIG. 22). In the fourth modified procedure, the input image data block 1512 is not subjected to the data compression operation. Upon request, the second image data block 1512 is transferred to the data decoder 4 from the page memory 3.

In the data decoder 4, the encoded image data block is decoded and released from the entropy encoding form by the entropy decoder 501 (indicated as a process with reference numeral 1505 in FIG. 21). Since the image data block has not undergone the data compression operation, the second image data block 1512 can be obtained after passing through the entropy decoder 501. Then, the second image type determining unit 503 examines the value of the element HH and determines that the image data block, i.e. the second image data block 1512, is a simple low-density image, because the value of the element HH is equal to 511. The density decoder 502 converts the second image data block 1512 into an output image data block which is exactly same as the first image data block 1511. Accordingly, the second data selector 505 selects the image data, i.e. the image data that is the same as the original converted image data block 1511, outputted from the density decoder 502.

In this way, the first image data block 1511 is encoded and then decoded correctly into the same first image data block 1511.

In many cases, image data blocks of computer graphics or letters, in particular, present only two image density values. Efficiency of encoding such an image data block by the Wavelet encoder and the density encoder is now examined with reference to FIGS. 23(*a*)–23(*c*).

An example is made using an image having a letter, of which the background and letter density values are 120 and 80, respectively, for example.

Figure 23A:
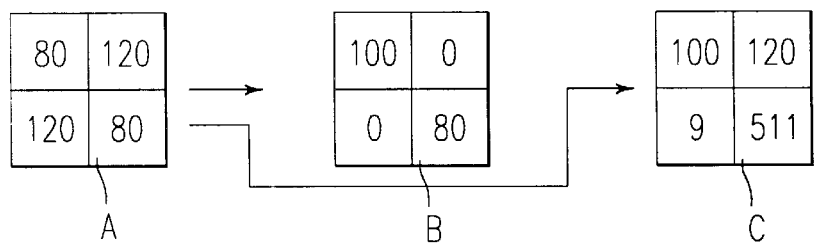
FIGS. 23(a)–23(c) explain a difference between data encoding/decoding results using density-based-data and Wavelet data conversion methods in the fourth modified procedure by the apparatus of the first embodiment shown in FIG. 1.
Figure 23B:
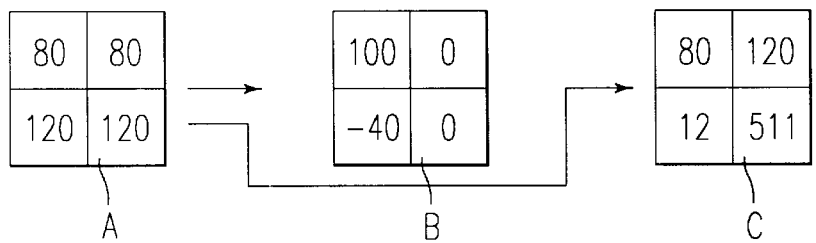
Figure 23C:
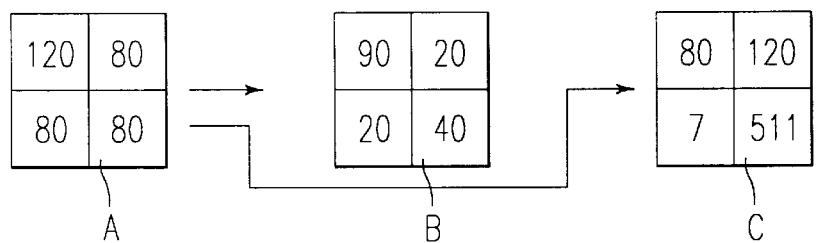

Three possible exemplary appearances of the two density values 120 and 80 are indicated in FIGS. 23(*a*)–23(*c*). In each case of the three appearances, a letter A indicates a first image data block, a letter B indicates a Wavelet converted image data block via the Wavelet encoder 404, and a letter C indicates a density converted image data block via the density encoder 403. The Wavelet encoder 404 encodes an image data block, indicated by the letter A, in such a way that the Wavelet data elements LL, HL, LH, and HH have various values which are inconsistently different by the three appearances, as shown in FIGS. 23(*a*)–23(*c*). Therefore, the resultant image data blocks indicated by the letter B have inconsistent data forms which are not necessarily suitable for data compression.

In contrast, the density encoder 403 encodes an image data block, indicated by the letter A, in a way such that the data elements LL and HL for representing the density information are valued as 80 and 120, respectively, and the data element HH for representing the flag information F is valued as 511, all which are consistent in the three appearances as shown in FIGS. 23(*a*)–23(*c*). In this case, a difference is only at four successive bits, including the most significant bit, of the data element LH representing the location information F. Therefore, an image data block of computer graphics or letters can be suitably and efficiently compressed by the density encoder 403 than by the Wavelet encoder 404.

Next, a fifth modified encoding/decoding procedure for the image data encoding/decoding apparatus 100 is explained with reference to FIG. 24. The fifth modified procedure of FIG. 23 is similar to the procedure which is described with reference to FIG. 8, except for the data compression operation. In the fifth modified procedure, the data compression operation is not performed.

Figure 24:
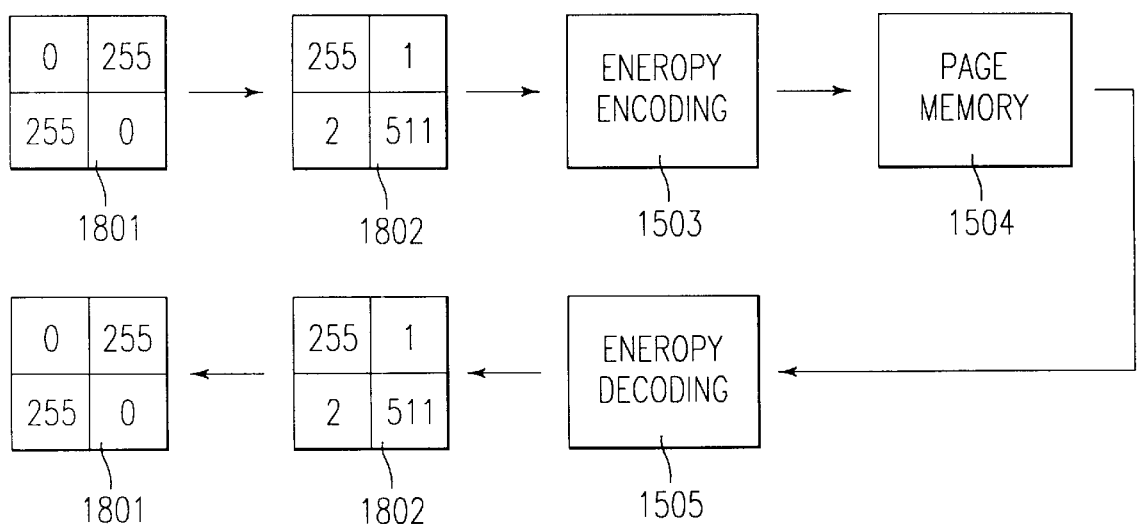
FIG. 24 illustrates a fifth modified procedure of encoding/decoding blocks of a simple low-density image by the apparatus of the first embodiment shown in FIG. 1.

In FIG. 24, a first image data block 1801, which is a simple low-density image and includes the following pixels a, b, c, and d, is inputted a=0
b=255
c=255
d=0

In this case, the first image data block 1511 includes only the two density values. Since a simple low-density image is defined as a 2- by 2-pixel block that has only two different image density values, as defined above, the first image type determining unit 402 determines that the first image data block 1801 is a simple low-density image. Accordingly, the first data selector 405 selects the outputs from the density encoder 403.

At the same time of the above determination by the first image type determining unit 402, the density encoder 403 converts the first image data block 1801 into a second image data block 1802 that has the following values.

LL=255
HL=1
LH=2
HH=511

In this way, the image data, i.e. the second image data block 1802, is encoded. The thus-encoded image data block, i.e. the second image data block 1802, is transferred to the entropy encoder 406 and stored in the page memory 3 (both indicated as the processes with reference numeral 1803 and 1804, respectively, in FIG. 23). In the fifth modified procedure, the input image data block is not subjected to the data compression operation. Upon request, the second image data block 1802 is transferred to the data decoder 4.

In the data decoder 4, the encoded image data block is decoded and released from the entropy encoding form by the entropy decoder 501 (indicated as a process with reference numeral 1805 in FIG. 23). Since the image data block has not undergone the data compression operation, the second image data block 1802 can be obtained after passing through the entropy decoder 501. Then, the second image type determining unit 503 examines the value of the data element HH and determines that the image data block, i.e. the second image data block 1802, is a simple low-density image, because the value of the element HH is equal to 511. The second image data block 1802 is converted into an output image data block which is exactly same as the first image data block 1801, via the density decoder 502. Accordingly, the second data selector 505 selects the image data, i.e. the image data same as the original converted image data block 1801, outputted from the density decoder 502.

In this way, the first image data block 1801 is encoded and then decoded correctly into the same first image data block 1801.

It is generally understood that a letter image represents a letter with one image density in contrast to the other image density on the background. As such, the example shown in FIG. 24 is a letter image made of black (255) and white (0) image density. For such a letter image, an image density value representing the white background may be predetermined and automatically added either in the data encoder 2 or the data decoder 4. Thereby, processes of encoding and decoding the background density value are eliminated and, therefore, coding efficiency can be increased.

Figure 25:
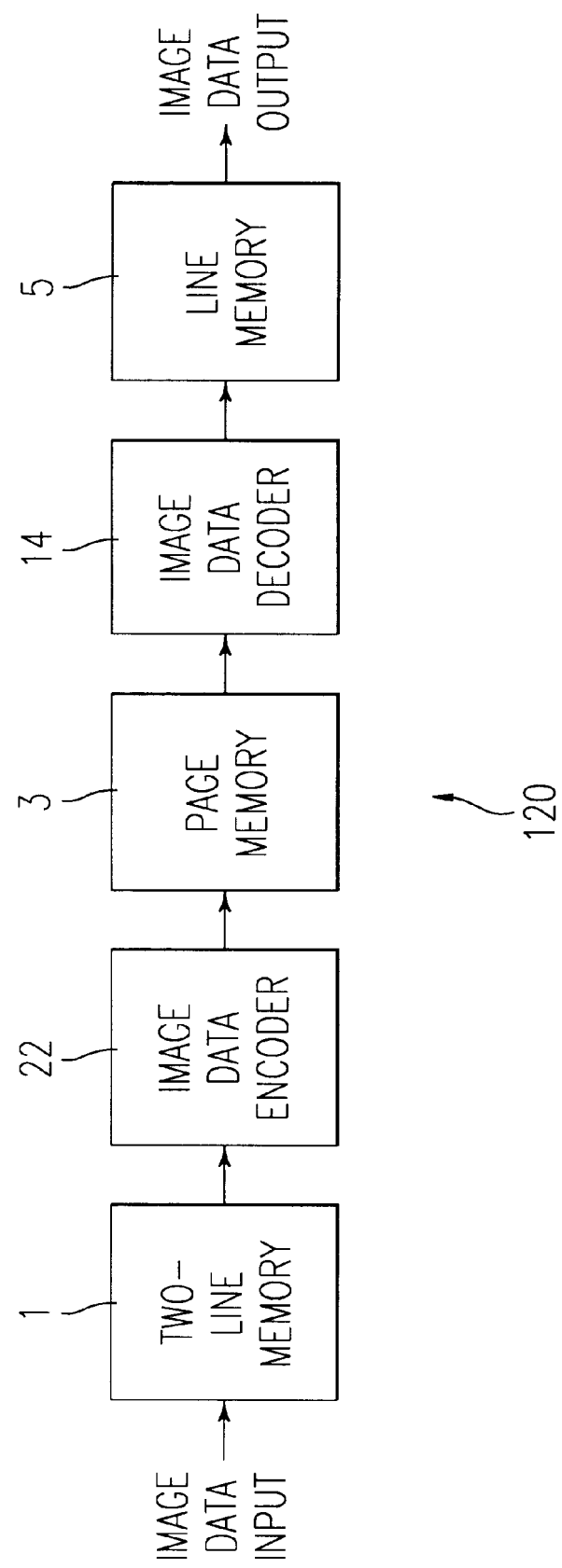
FIGS. 25 and 26 illustrate a third embodiment of the image data encoding/decoding apparatus shown in FIG. 1 and its data encoder.
Figure 26:
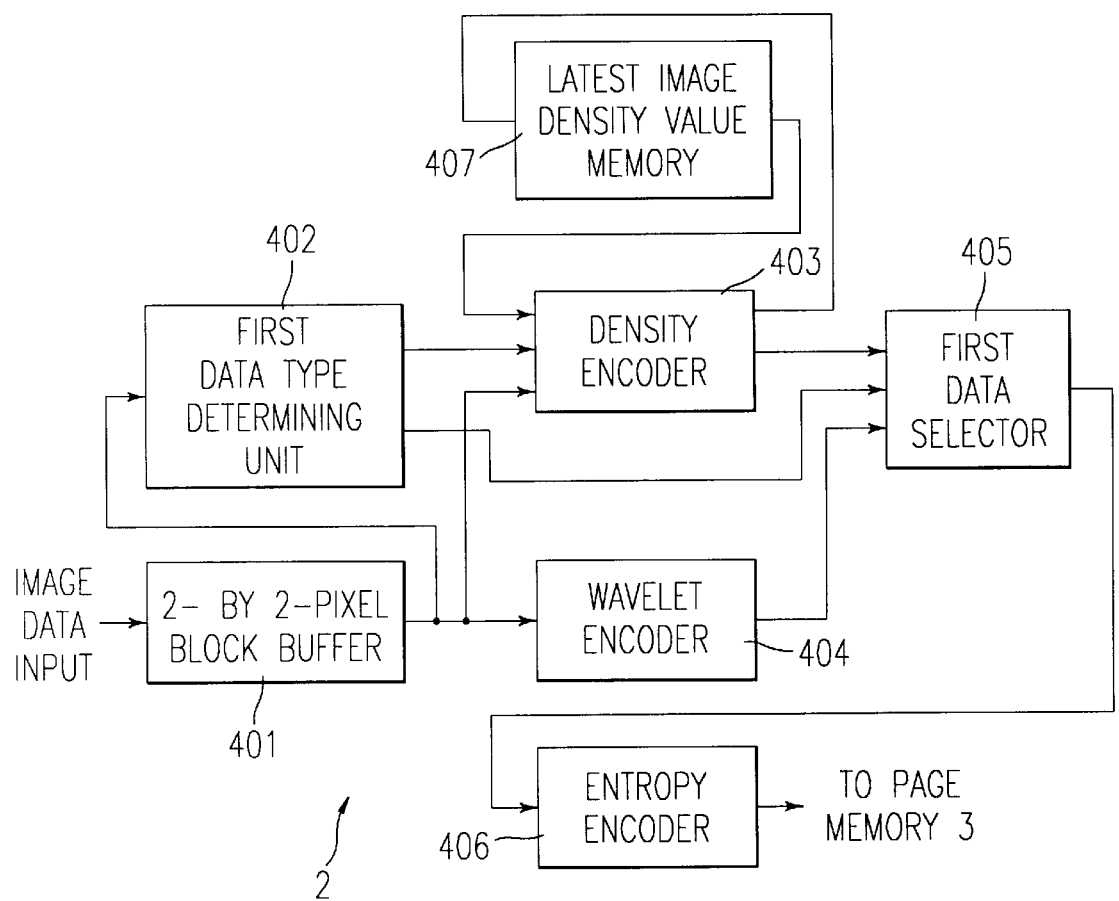
Figures 27A, 27B, 27C, 28:
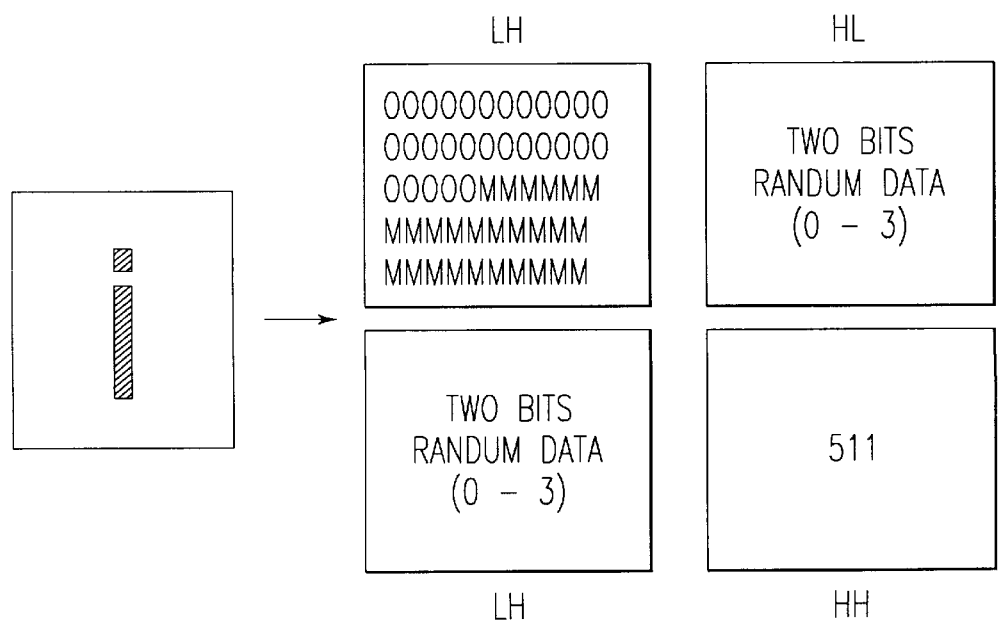
FIGS. 27(a), 27(b), 27(c) and 28 illustrate an operation and advantageous features of the third embodiment shown in FIG. 25.

Next, an image data encoding/decoding apparatus 120 as a third embodiment according to the present invention is explained with reference to FIGS. 25–28. The image data encoding/decoding apparatus 120 of FIG. 25 is similar to that of the image data encoding/decoding apparatus 100 shown in FIG. 1, except for an image encoder 22. The image encoder 22 is shown in FIG. 26 and similar to the image encoder 2 of FIG. 2, except for a latest image density value memory 407. The image data encoding/decoding apparatus 120 is suitable for compression of image data which includes only two image density values. FIG. 27(*a*) illustrates various examples of input image data blocks that are all simple low-density data areas, including a case in which all the pixels a, b, c, and d are 0-valued. These input image data blocks arc encoded as shown in FIG. 27(*b*) or in FIG. 27(*c*).

In a data encoding/decoding procedure for the image data encoding/decoding apparatus 120 of FIG. 25, the density encoder 403 first encodes the image data block, which is determined as a simple low-density image, into the density information, the location information, and the flag information in the above-described procedure shown in FIG. 8 and using the information assignment shown in FIGS. 6(a) and 6(b). Then, when the pixels a, b, c, and d are all 0-weighted, the density encoder 403 sets a value stored in the latest image density value memory 407 in which 0 is stored in this case. As a result, the data element LL is set to 0, as shown in FIG. 27(b). At the same time, the newly set value at the data element is stored as the latest image density value in the latest image density value memory 407. After such an event in which 0 is stored in the latest image density value memory 407, only a next appearance of an image density other than the background image density (=0) can change the value which is stored in the latest image density value memory 407. Then, the background image density will not be stored in the latest image density value memory 407 until the image data block having all-0-weighted pixels is inputted again.

Alternatively, the following procedure may be possible for the image data encoding/decoding apparatus 120. In this alternative procedure, the elements HL and LH represent not only location information but also information as to if the pixels a and b have the image density M and if the pixels c and d have the image density M. In addition, when an image data block includes an image density M other than the background image density, the image density M is stored in the latest image density value memory 407. Further, when all the pixels included in an image data block are the background image density, a latest image density value which is then appeared in a simple low-density image and which is other than the background image density is set to the data element LL. Five examples which are encoded from the corresponding five image data block examples shown in FIG. 27(a) in such a procedure are shown in FIG. 27(c).

In FIG. 27(c), the element LL is set to a value 255, which is stored in the latest image density value memory 407, when all the pixels of the image data block are the background image density. By this procedure, an image composed of only two image densities, including the background image density can be compressed in an efficient manner. An example of such an image is shown in FIG. 28.

The image of FIG. 28 a letter image and includes a letter i that has an image density value M on the background that has an image density value 0. In this kind of letter images, all the image data blocks are normally simple low-density images. Accordingly, all the data elements HH are set to 511 and can be efficiently compressed by the entropy encoder. The elements LL are set to 0 until a letter i appears and, after an appearance of a letter i, the remaining elements LL are set to the image density M. Thus, the element LL can also be compressed in an efficient manner.

Figure 29:
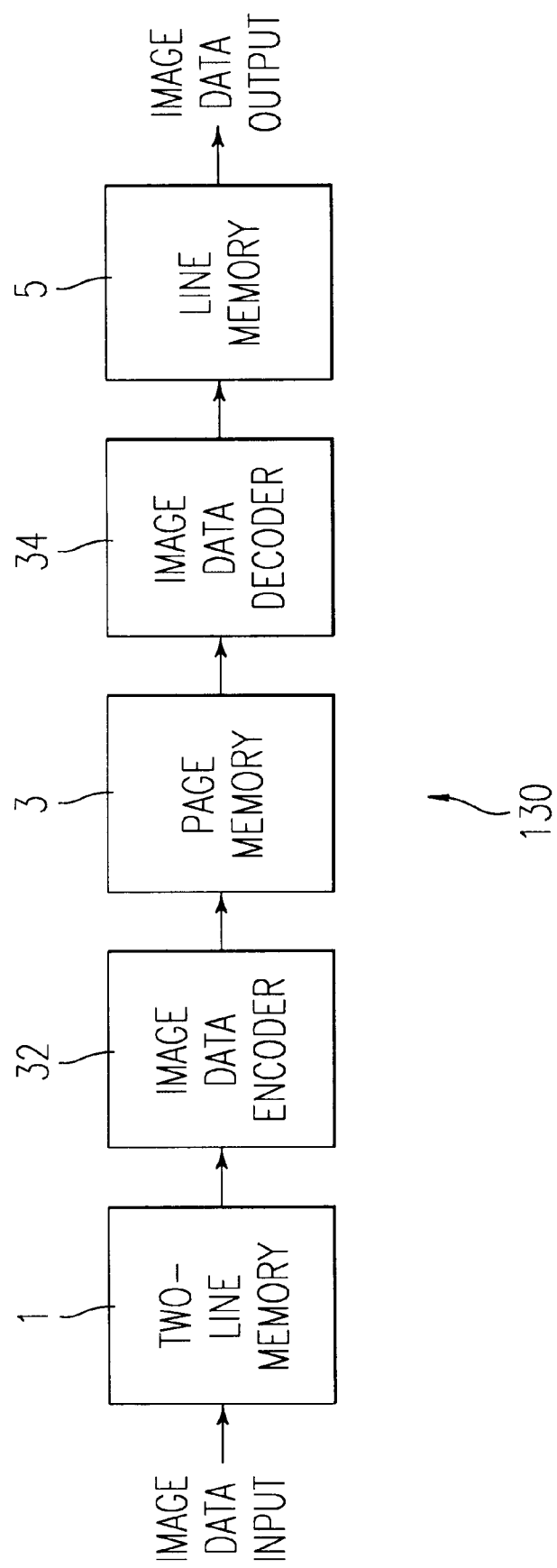
FIGS. 29–31 illustrate a fourth embodiment of the image data encoding/decoding apparatus shown in FIG. 1 and its data encoder and decoder, respectively.
Figure 30:
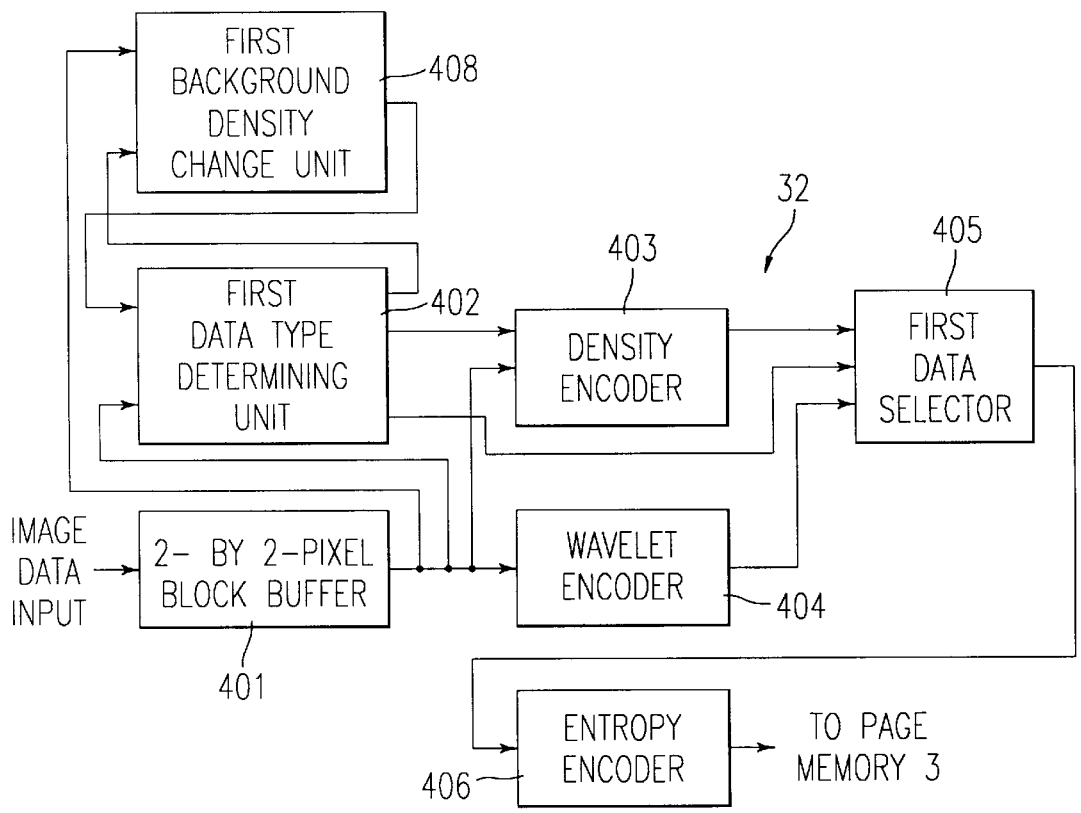
Figure 31:
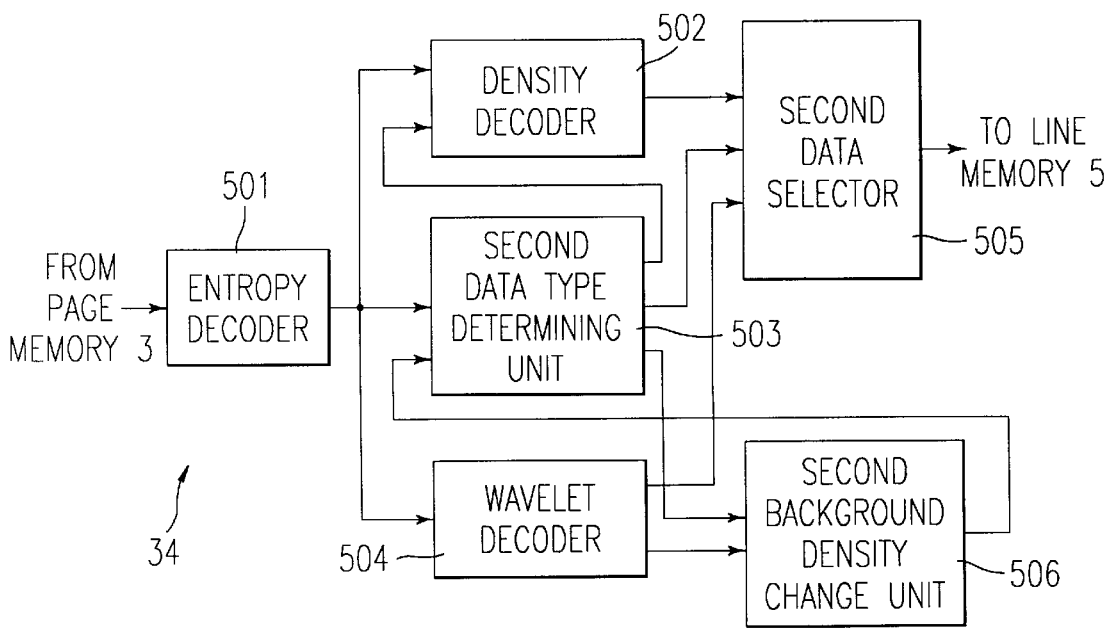
Figure 34:
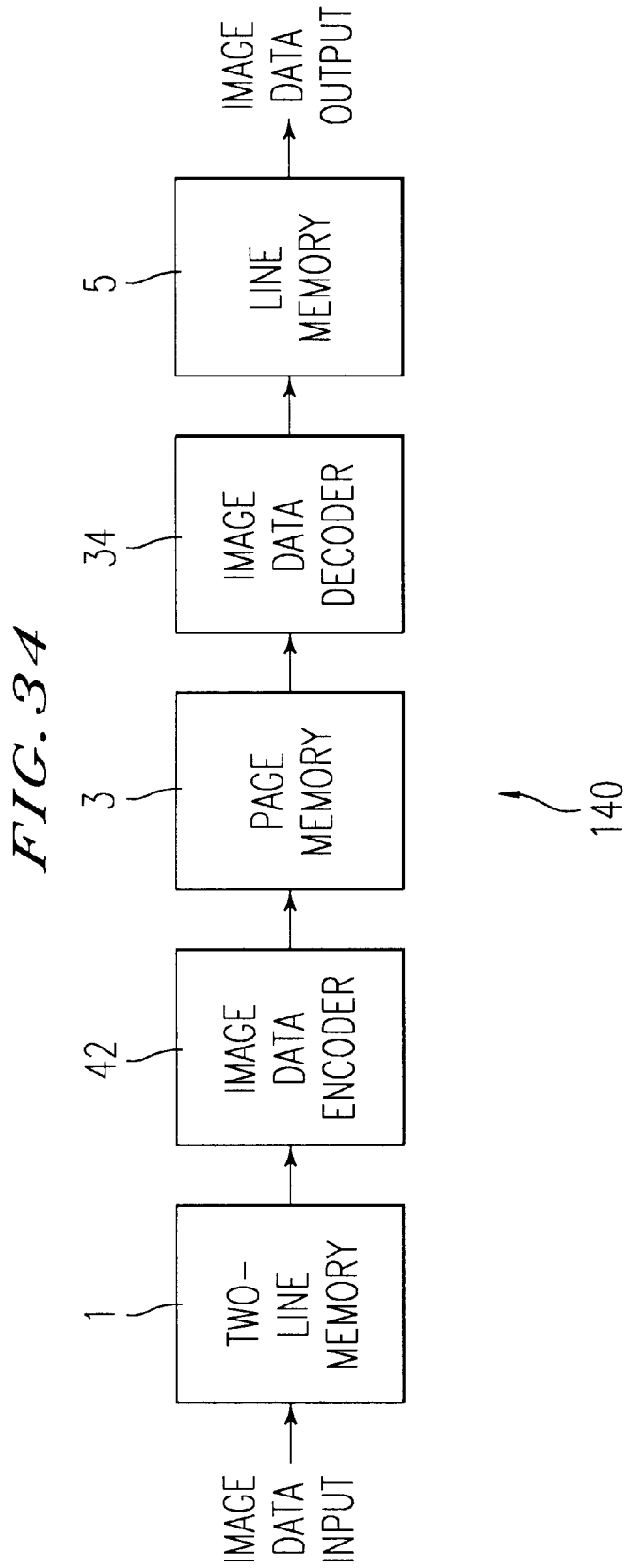
FIGS. 34 and 35 illustrate a fifth embodiment of the image data encoding/decoding apparatus shown in FIG. 1 and its data encoder.

Next, an image data encoding/decoding apparatus 130 as a fourth embodiment according to the present invention is explained with reference to FIGS. 29–32(c). The image data encoding/decoding apparatus 130 of FIG. 29 is similar to that of the image data encoding/decoding apparatus 100 shown in FIG. 1, except for an image encoder 32 and an image decoder 34. The image encoder 32 is shown in FIG. 30 and similar to the image encoder 2 of FIG. 2, except for a first background density change unit 408. The image decoder 34 is shown in FIG. 31 and similar to the image decoder 4 of FIG. 3, except for a second background density change unit 506.

In a data encoding/decoding procedure of the image data encoding/decoding apparatus 130, the background density is set to 0 and 255. Further, an image data block is determined as a simple low-density image only when it includes four pixels of which image density are composed of the present background density and other arbitrary image density M. Values to be encoded by the density encoder 403 are the flag information that is set to 511 and the data elements HL and LH for representing the location information. As for the density information, the other arbitrary density value M is set to data element LL when an image data block includes four pixels of which image density are composed of the present background image density and other arbitrary image density M, or the background image density is set to the data element LL when an image data block includes four pixels of which image density are composed of the background image density.

In the data encoder 32 of FIG. 30, the first image type determining unit 402 transfer its determining result to the density encoder 403, the first data selector 405, and also the first background density change unit 408, upon completing the determination by the first image type determining unit 402. The first background density change unit 408 changes the background density from one to the other, when the following two conditions are satisfied. A first condition is that the image data block is determined as an image other than a simple low-density image as long as the present background density is used, according to the determination result by the first image type determining unit 402. A second condition is that the pixels a, b, c, and d of the image data block have only two image densities which are an image density M and another image density other than the present background density. From the next input image data block, the first image type determining unit 402 determines image type using the changed background density. The rest of the data encoding procedure by the data encoder 32 are similar to the procedure by the data encoder 2 of the image data encoding/decoding apparatus 100.

In the data decoder 34, when the image data block is determined as a simple low-density image by the second determining unit 503, the determination result is transferred to the density decoder 502, the second background density change unit 506, and the second data selector 505. At this time, the outputs from the Wavelet decoder 504 is inputted to the second background density change unit 506.

Then, the second background density change unit 506 changes the background density from one to the other, only when the above described first and second conditions are satisfied. From the next input image data block, the second image type determining unit 503 determines image type using the changed background density. The rest of the data decoding procedures performed by the data decoder 34 are similar to the procedures performed by the data encoder 34 of the image data encoding/decoding apparatus 100.

FIG. 32(a) illustrates five successive first image data blocks from first to fifth first image data blocks. In these five successive first image data blocks, the background density changes. FIGS. 32(b) and 32(c) illustrates the exemplary results of encoding these five blocks in the cases using the image data encoding/decoding apparatuses 120 and 130, respectively. When values 0 and 255 are registered as the background density and the present background density is set to 0, the first and second image data blocks encoded by the image data encoding/decoding apparatuses 120 and 130 have the same encoded result, as illustrated in FIGS. 32(b) and 32(c). The third first image data block has two image densities 128 and 255 other than the background density and, therefore, an output from the Wavelet encoder 404 is selected in both the image data encoding/decoding apparatuses 120 and 130.

In this way, the background density of the encoded image data block in the case of using the image data encoding/ decoding apparatuses 120 remains as 0. However, the background density of the encoded image data block in the case of the image data encoding/decoding apparatuses 130 is changed to 255 since the third first image data block includes the other background density 255 and another different image density 128.

Since the background density has been changed to 255 and the fourth and fifth original image blocks include only the image density values 128 and 255, an output from the Wavelet encoder 404 is selected in the image data encoding/decoding apparatuses 120. However, in the image data encoding/decoding apparatuses 130, the image data block is determined as a simple low-density image and the first data selector 405 accordingly selects an output from the density encoder 403.

In the data decoder 34 of the image data encoding/decoding apparatuses 130, the background density values will be, in turn, changed in a similar manner as they are changed in the data encoding unit 32.

By the thus-arranged image data encoding/decoding apparatuses 130, data compression can be efficiently performed on such an image that the background image density of the image data block will be changed from one to the other during the operation of encoding the image data blocks. Moreover, the image data encoding/decoding apparatuses 120 can perform efficient data compression on an image that has letters in a black color on a white background and an image that has letters in a white color on a letter in a black color.

Next, a sixth modified data encoding/decoding procedure for the image data encoding/decoding apparatus 100 shown in FIG. 1 is explained with reference to FIGS. 33(a) 33(d). In sixth modified procedure, two values 0 and 255 are registered as the background density. An image data block is determined as a simple low-density image when including only two image density values that are the background density 0 or 255 and other arbitrary image density M. For the flag information, a value 511 is used when the background image density is set to 0 and a value −511 is used when the background density is set to 255. The location information for the pixels a and b are embedded in 2 bits of the element HL, and the location information for the pixels c and d are embedded in 2 bits of the element LH. Also, for the density information, the image density M other than the background densities are embedded in the element LL. That is, information for the image density conversion in the sixth modified procedure is, as described above, similar to those used in the image data encoding/decoding apparatuses 120 and 130, except for the flag information.

In the data encoder 2, the first image type determining unit 402 performs the image type determination in the above described manner. The first data selector 405 selects the output from the density encoder 403 when the image data block is a simple low-density image. The output includes the density information, the location information, and the flag information, 511 or −511, in accordance with the background density, 0 or 255. In contrast, the first data selector 405 selects the output from the Wavelet encoder 404 when the image data block is an image other than a simple low-density image.

In the data decoder 4, the second image type determining unit 503 determines the image data block as a simple low-density image when the data element HH includes the flag information, 511 or −511. On the basis of the determination result, the density decoder 502 decodes the image data block using 0 as the background density when the flag information is 511 or using 255 as the background density when the flag information is −511.

FIG. 33(a) illustrates the same five successive first image data blocks which are illustrated in FIG. 32(a). FIG. 33(b) illustrates the same image data blocks, which are encoded by the image data encoding/decoding apparatus 120 and illustrates in FIG. 32(b). FIG. 33(c) illustrates the same image data blocks, which are encoded by the image data encoding/decoding apparatus 130 and illustrated in FIG. 32(c). FIG. 33(d) illustrates the five successive first image data blocks, which are illustrated in FIG. 32(a) and encoded through the sixth modified procedure. Since the sixth modified procedure has two background densities, each of the five image data blocks is determined as a simple low-density image. Therefore, even the third through fifth first image data blocks, which are encoded by the Wavelet encoder 404 in the image data encoding/decoding apparatus 120, can be encoded by the density encoder 403 of which compression efficiency is better than that of the Wavelet encoder 404. Also, since the sixth modified procedure has two flag information, 511 and −511, even the third first image data block, which is encoded by the Wavelet encoder 404 in the image data encoding/decoding apparatus 130, can be encoded by the density encoder 403. In this case, the data compression efficiency will be increased as a whole, despite the fact that the data element HH will not be efficiently compressed.

Figure 35:
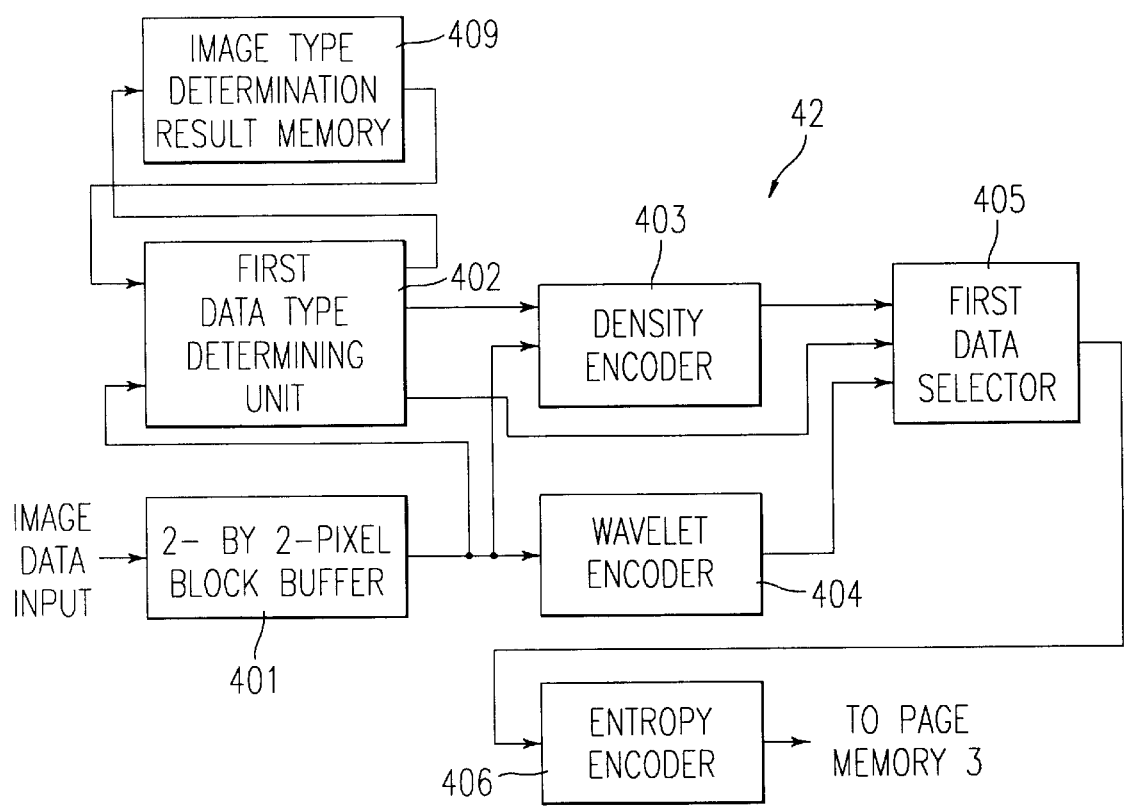
Figure 37:
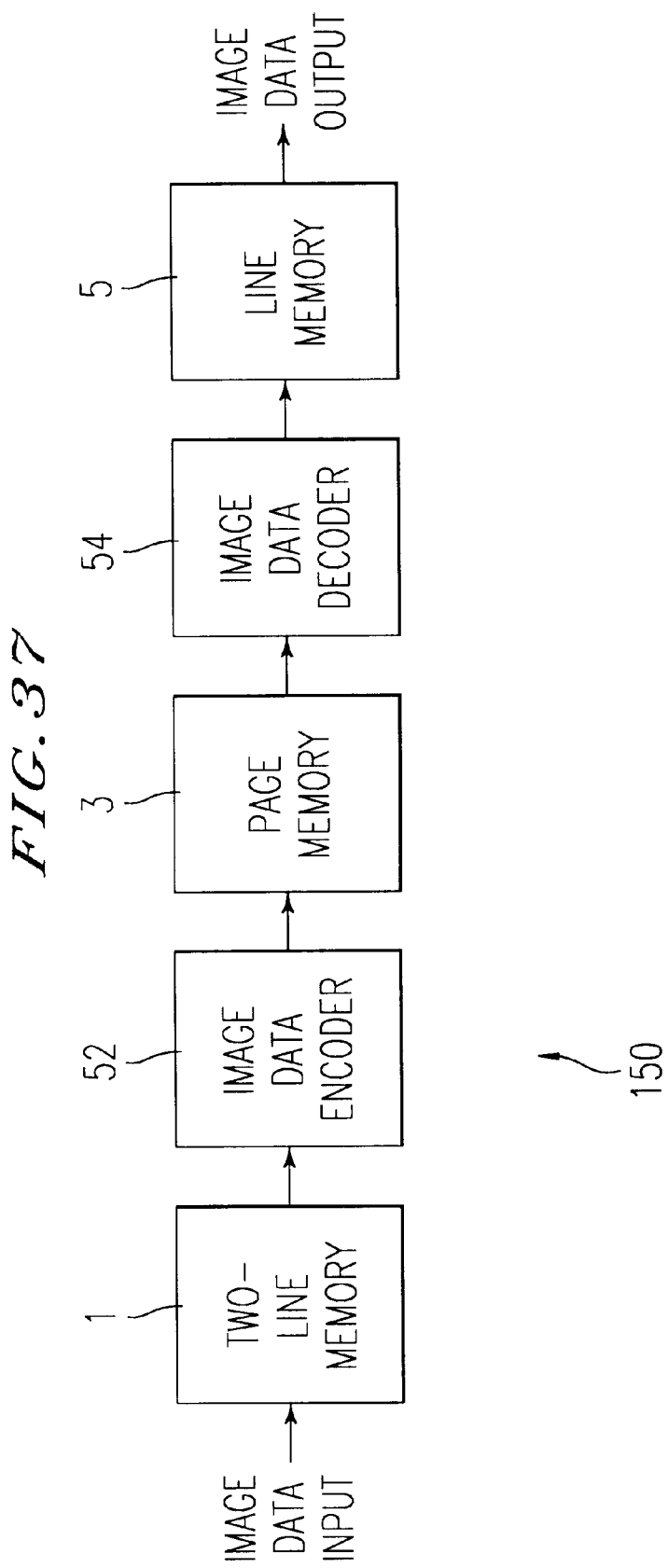
FIGS. 37 to 39 illustrate a sixth embodiment of the image data encoding/decoding apparatus shown in FIG. 1 and its data encoder and decoder, respectively.

Next, an image data encoding/decoding apparatus 140 as a fifth embodiment according to the present invention is explained with reference to FIGS. 34–36(c). The image data encoding/decoding apparatus 140 is similar to the image data encoding/decoding apparatus 100 illustrated in FIG. 1, except for a data encoder 42. FIG. 35 illustrates the data encoder 42, which is similar to the data encoder 2 illustrated in FIG. 2, except for an image type determination result memory 409.

In the data encoder 42 of FIG. 35, the image type determination results of two successive image data blocks outputted from the first image type determining unit 402 are stored in the image type determination result memory 409. To determine an image data block, the first image type determining unit 402 refers the image type determination result memory 409 in which the image type determination results of the two immediately previous and successive image data blocks are stored. The image data block is not determined as a simple low-density data when at least one of the two immediately previous and successive image data blocks has been determined not to be a simple low-density image. Accordingly, the image data block is encoded by the Wavelet encoder 404.

FIG. 36(a) illustrates four successive first image data blocks. FIGS. 36(b) illustrate the four successive image data blocks after the encoding process of the fourth modified procedure for the image data encoding/decoding apparatus 100 described with reference to FIGS. 20(a)–23(c). FIG. 36(c) illustrates the four successive image data blocks after the encoding process of the procedure for the image data encoding/decoding apparatus 140. By the fourth modified procedure for the image data encoding/decoding apparatus 100, the third image data block that has only two image density values, 30 and 32, is determined as a simple low-density image. Therefore, the first data selector 405 selects the output from the density encoder 403. However, by the procedure for the image data encoding/decoding apparatus 140, the third image data block is not determined as a simple low-density image since the immediately previous image data block, or the second image data block that has values 18, 24, 20, and 22, is not a simple low-density image. Therefore, the first data selector 405 selects the output from the Wavelet encoder 404.

The above-described four successive image data blocks have relatively complex image densities and are not similar to an image of computer graphics or letters that have only two image densities. Despite this fact, an image data block such as the third image data block may be determined as a simple low-density image through the fourth modified procedure for the image data encoding/decoding apparatus 100. As a result, the third image data block is encoded by the density encoder 403 and is placed among the image data blocks encoded by the Wavelet encoder 404. In this case, inferior data correlation occurs and data compression efficiency is decreased. However, the image data encoding/decoding apparatus 140 can eliminate this drawback.

Figure 38:
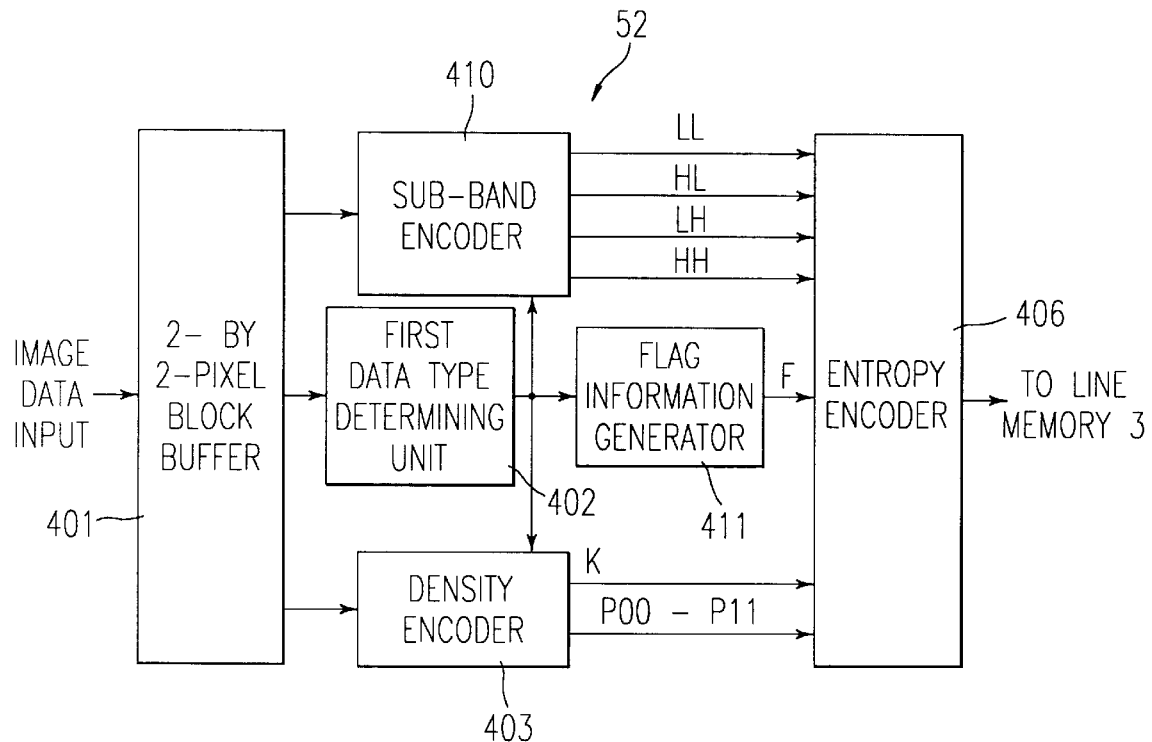
Figure 39:
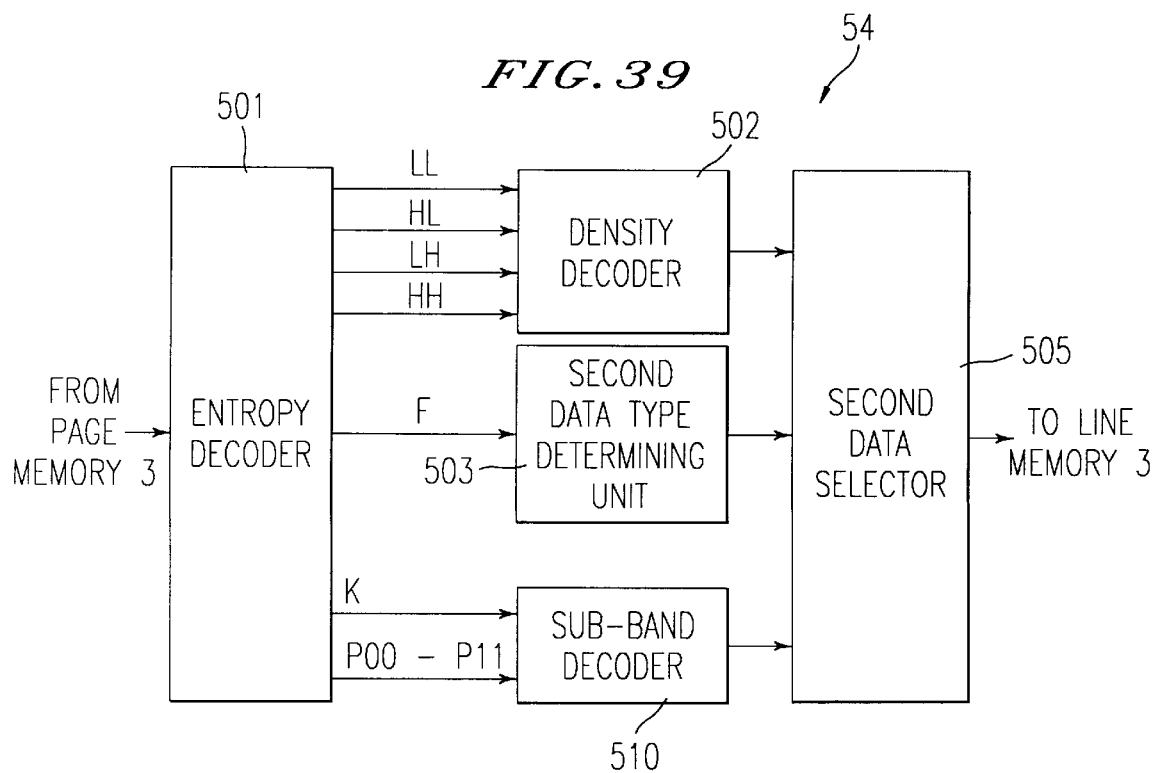

Next, an image data encoding/decoding apparatus 150 as a sixth embodiment according to the present invention is explained with reference to FIGS. 37–42(b). The image data encoding/decoding apparatus 150 is similar to the image data encoding/decoding apparatus 100 illustrated in FIG. 1, except for a data encoder 52 and a data decoder 54. FIG. 38 illustrates the data encoder 52, which is similar to the data encoder 2 illustrated in FIG. 2, except for a sub-band encoder 410 in place of the Wavelet data encoder 404 and a flag information generator 411. FIG. 39 illustrates the data decoder 54, which is similar to the data decoder 4 illustrated in FIG. 3, except for a sub-band decoder 510 in place of the Wavelet data decoder 504.

In FIG. 38, a 2- by 2-pixel block outputted from the 2- by 2-pixel block buffer 401 is transferred to the first image type determining unit 402, the density encoder 403, and the sub-band encoder 410. The first image type determining unit 402 determines that the image data block is a simple low-density image when the pixels a, b, c, and d are made of only two image densities, of which values are 0 and M, where M is not equal to 0.

The sub-band encoder 410 performs the Wavelet encoding operation using the equations (1)–(4) previously described. When the first image type determining unit 402 determines that the image data block is an image other than a simple low-density image, the sub-band encoder 410 sends the 4-bit data (referred to as four sub-band data elements LL, HL, LH, and HH, respectively) representing the Wavelet data elements LL, HL, LH, and HH to the entropy encoder 406. When the first image type determining unit 402 determines that the image data block is a simple low-density image, the sub-band encoder 410 sends all 0-valued sub-band data elements LL, HL, LH, and HH to the entropy encoder 406.

The flag information generator 411 generates a 1-bit flag information F, which is set to 0, when the image data block is determined as an image other than a simple low-density image, or a 1-valued flag information F, which is set to 1, when the image data block is determined as a simple low-density image, and sends it to the entropy encoder 406. When the image data block is determined to be a simple low-density image and includes a density value M, which is not equal to 0, the density encoder 403 sets the image density (referred to as an 8-bit image density element K) to the value M and send it to the entropy encoder 406. When the image data block is determined as a simple low-density image and includes only a density value 0, the density encoder 403 sets the 8-bit image density element K to 0 and sends it to the entropy encoder 406. Further, the density encoder 403 transfers the location information of the image density value M in a 4-bit data (referred to as P00, P01, P10, and P11, respectively) to the entropy encoder 406. When the image density block is determined as an image other than a simple low-density image, the density encoder 403 sets the 8-bit image density element K and P00, P01, P10, and P11 to a value 0 and sends them to the entropy encoder 406. For example, a value 0 will be set to all the location information P00, P01, P10, and P11 when all the pixels a, b, c, and d have the image density value M, as shown in FIG. 40(b).

Figures 40A, 40B:
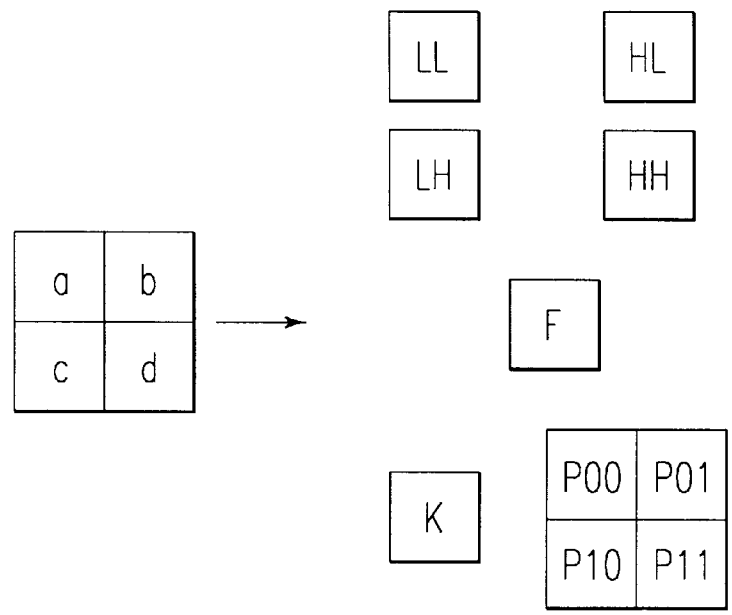
FIGS. 40(a) and 40(b) illustrate a bit assignment using sub-band data elements and explains location information.

Thus, the entropy encoder 406 of FIG. 38 receives seven differently-structured files which are the sub-band data elements LL, HL, LH, and HH from the sub-band encoder 410, the flag information F from the flag information generator 411, and the 8-bit image density element K and the location information P00, P01, P10, and P11 from the density encoder 403, as shown in FIG. 40(a). The data included in these seven files are encoded into one file by the entropy encoder 406 and stored in the page memory 3. Upon request, the data of the seven files are transferred to the data decoder 54 of FIG. 39.

In the data decoder 54, the encoded data are first decoded into the data of the seven files by the entropy decoder 501. Subsequently, the entropy decoder 501 transfers the decoded sub-band data elements LL, HL, LH, and HH to the sub-band decoder 510, the flag information F to the second image type determining unit 503, and the 8-bit image density element K and the location information P00, P01, P10, and P11 to the density decoder 502. The second data selector 505 selects the output from the sub-band decoder 510 or from the density decoder 502, in accordance with the image type determination by the second image type determining unit 503 with reference to the flag information F.

Figure 41A:
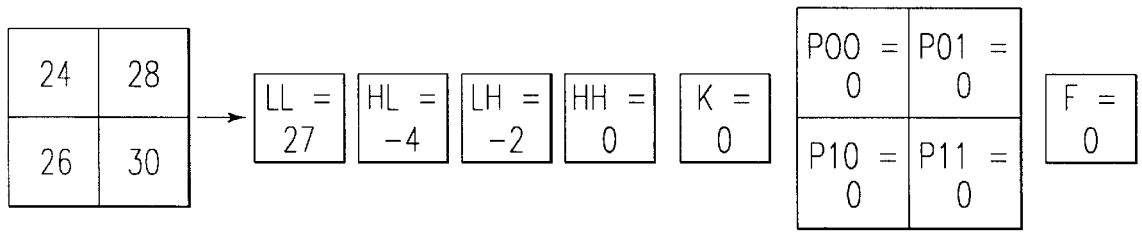
FIGS. 41(a)–42(b) illustrate the data encoding/decoding procedures of the sixth embodiment shown in FIG. 37.
Figure 41B:
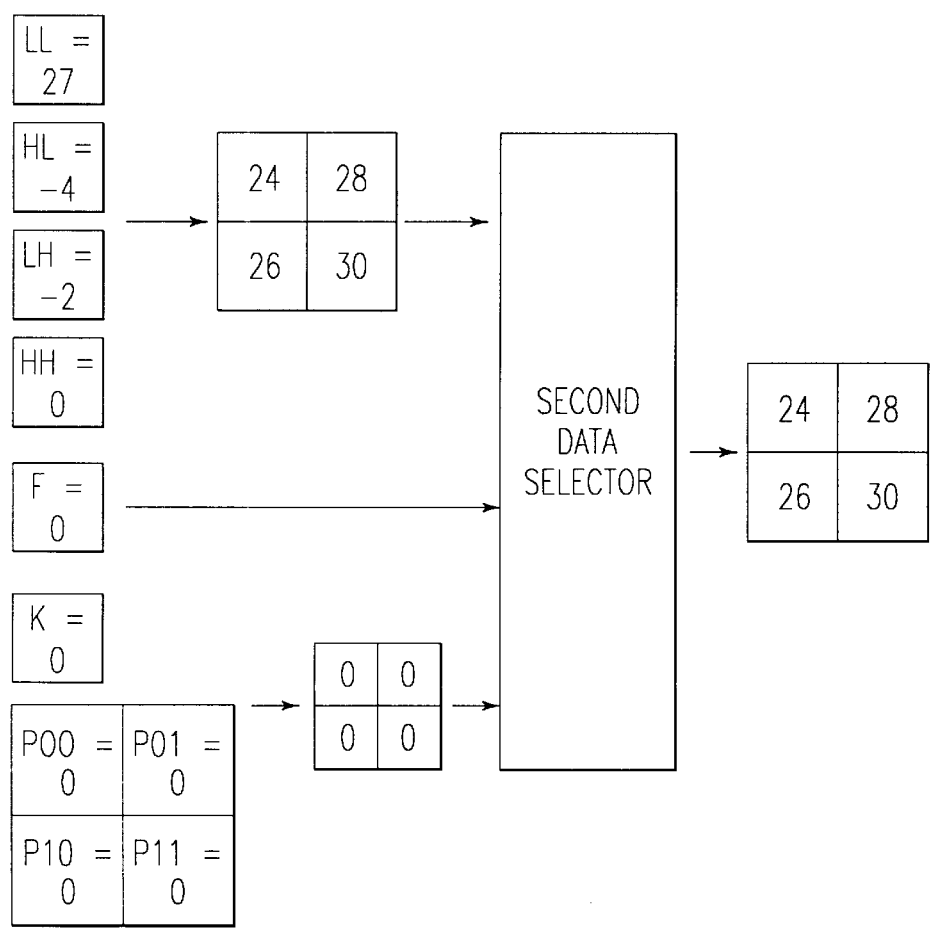

FIGS. 41(a) and 41(b) illustrates examples of encoding and decoding procedures, respectively, by the image data encoding/decoding apparatus 150. In FIG. 41(a), a first image data block, which is an image other than a simple low-density image, is inputted in the data encoder 52, having the following four pixel values, for example.

a=24
b=28
c=26
d=30

These four different values do not meet the requirement that the pixels a, b, c, and d included in an image data block are composed of only two image density values 0 and M, which is not equal to 0. Therefore, the first image data block is determined as an image other than a simple low-density image. In this case, the sub-band encoder 410 calculates values of the sub-band data elements LL, HL, LH, and HH, using the equations (1)–(4), and outputs the following results.

LL=27
HL=−4
LH=−2
HH=0

At the same time, the density encoder 403 outputs the 8-bit image density element K, which is set to 0, and the location information P00, P01, P10, and P11, which are all set to 0. The flag information generator 411 outputs the flag information F which is set to 0. Data settings of these seven files are shown in FIG. 41(a).

As illustrated in FIG. 41 (b), the data of these seven files are transferred to the data decoder 54, and, since the flag information F is set to 0, the second data selector 505 selects the output from the sub-band decoder 510.

Figure 42A:
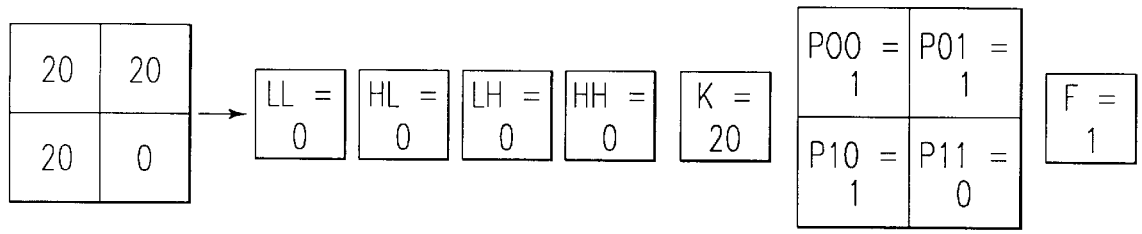
Figure 42B:
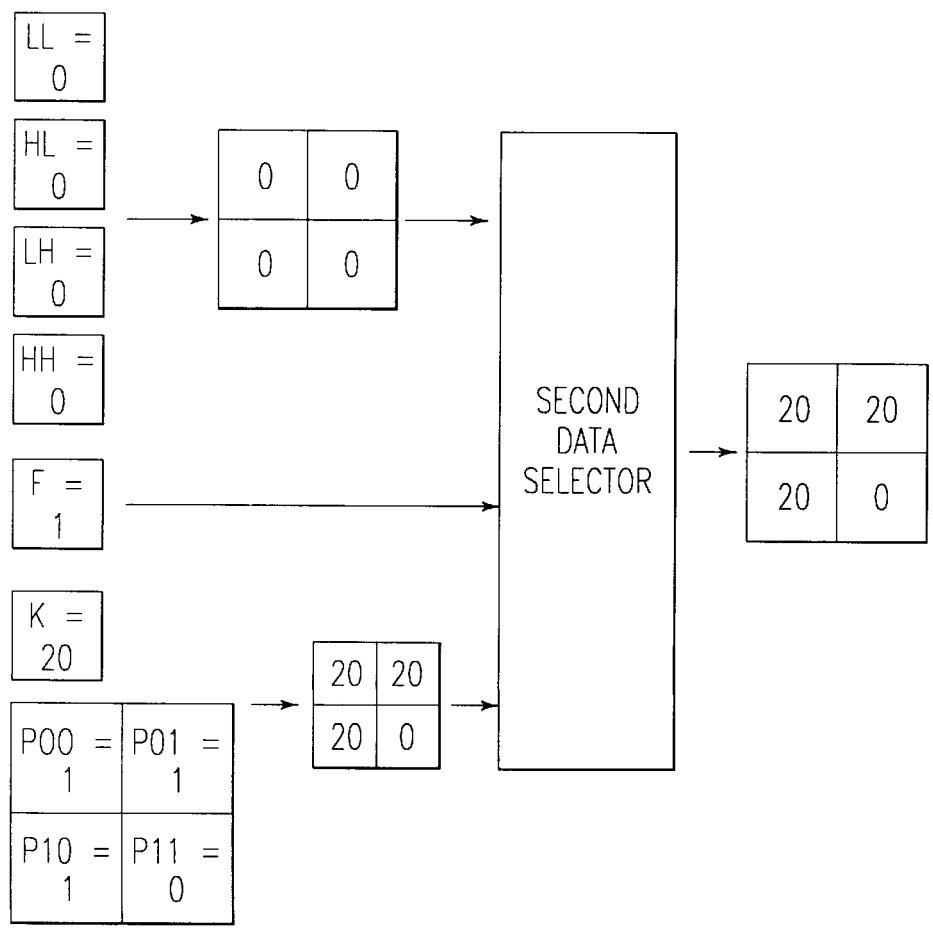

FIGS. 42(a) and 42(b) illustrate other examples of encoding and decoding procedures by the image data encoding/decoding apparatus 150. In FIG. 42(a), a first image data block, which is a simple low-density image, is inputted in the data encoder 52, having the following four pixel values, for example.

a=20
b=20
c=20
d=0

This image data block has only two different pixel values 0 and 20, and meets the requirement that the pixels a, b, c, and d included in an image data block are composed of only two image density values 0 and M, which is not equal to 0. Therefore, the first image data block is determined to be a simple low-density image. In this case, the sub-band encoder 410 set all the sub-band data elements LL, HL, LH, and HH to a value 0, according to the equations (1)–(4). The density encoder 403 outputs the 8-bit image density element K which is set to 20, the location information P00, P01, and P10, which are set to 1, and the location information P11 which is set to 0. The flag information generator 411 outputs the flag information F which is set to 1. The data of these seven files are illustrated in FIG. 42(a).

As illustrated in FIG. 42(b), the data of these seven files are transferred to the data decoder 54, and, since the flag information F is set to 1, the second data selector 505 selects the output from the density decoder 502.

Figure 44:
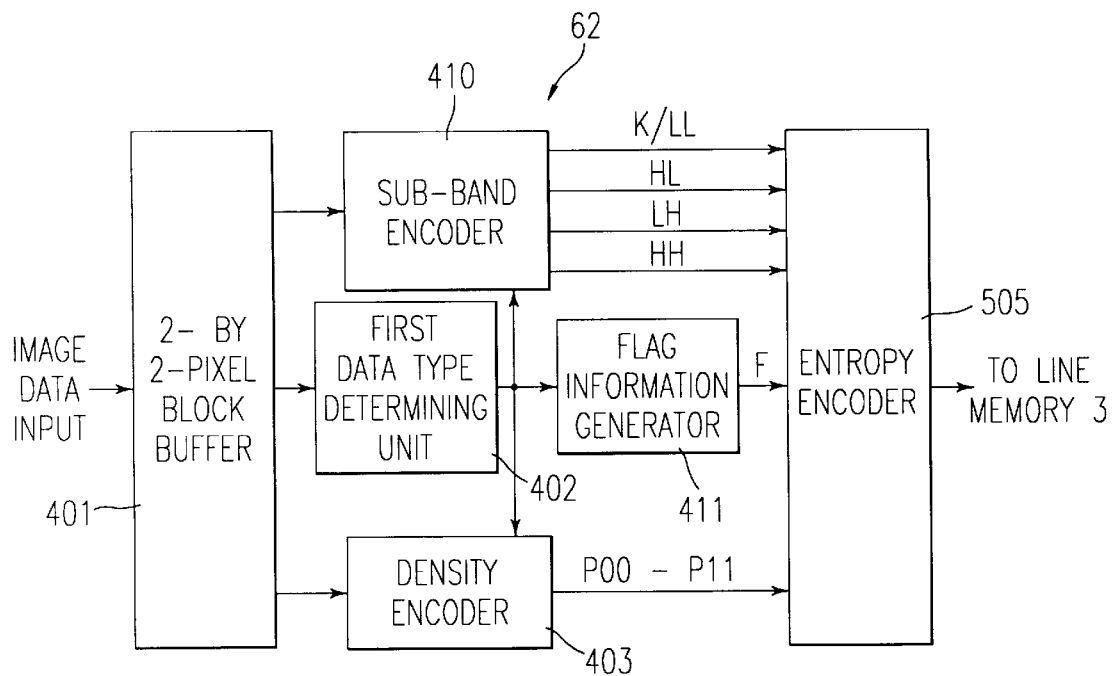
Figure 45:
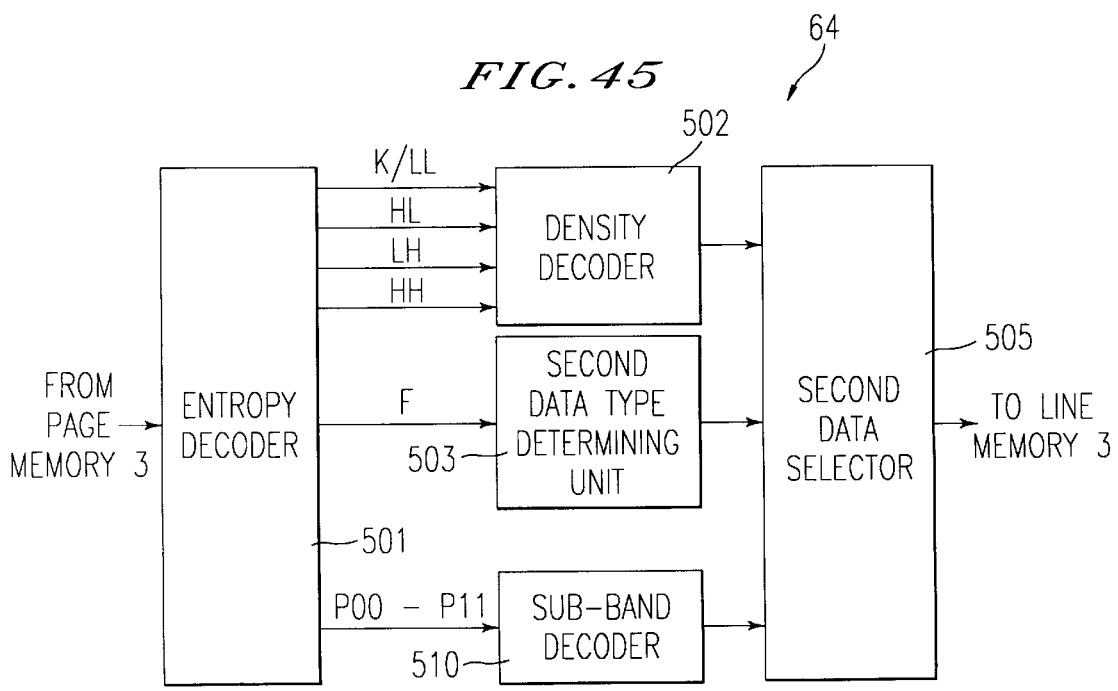

Next, an image data encoding/decoding apparatus 160, as a seventh embodiment according to the present invention, is explained with reference to FIGS. 43–46(b). The image data encoding/decoding apparatus 160 shown in FIG. 43 is similar to the image data encoding/decoding apparatus 150 of FIG. 37, except for a portion for handling the 8-bit image density element K. For this, the image data encoding/decoding apparatus 160 includes data encoder and data decoder 62 and 64, in place of the data encoder and data decoder 52 and 54 for the image data encoding/decoding apparatus 150. The data encoder and data decoder 62 and 64 are illustrated in FIGS. 44 and 45, respectively.

In the data encoder 62, which is modified from the original data encoder 62, the density encoder 403 has a connecting line for transmitting the 8-bit image density element K to the sub-band encoder 410, but not to the entropy encoder 406. The sub-band encoder 410 for generating the sub-band data elements LL, HL, LH, and HH is arranged to receive the 8-bit image density element K and embeds it to the sub-band data elements LL. Then, the sub-band encoder 410 sends one of the element LL and the 8-bit image density element K to the entropy encoder 406, depending upon the determination result if the first image data block is determined as a simple low-density image. The sub-band encoder 410 generates only the data element LL but not the 8-bit image density element K and sends it to the entropy encoder 406, when the image data block is determined as an image other than a simple low-density image.

In contrast, the sub-band encoder 410 generates only the 8-bit image density element K instead of the data element LL and sends it to the entropy encoder 406 using the line for transmitting the data element LL, when the image data block is determined as a simple low-density image. This is because the 8-bit image density element K is known to always be set to a value 0 when the first image data block is determined as an image other than a simple low-density image and to a non-constant value when the first image data block is determined to be a simple low-density image.

The data decoder 64 is modified from the data decoder 54, with respect to the 8-bit image density element K, in a way similar to modification in the data encoder 62. Combination of the element LL and the 8-bit image density element K in the above-described way contributes to savings of hardware for handling the 8-bit image density element K and consequently to a cost reduction.

Figures 46A, 46B:
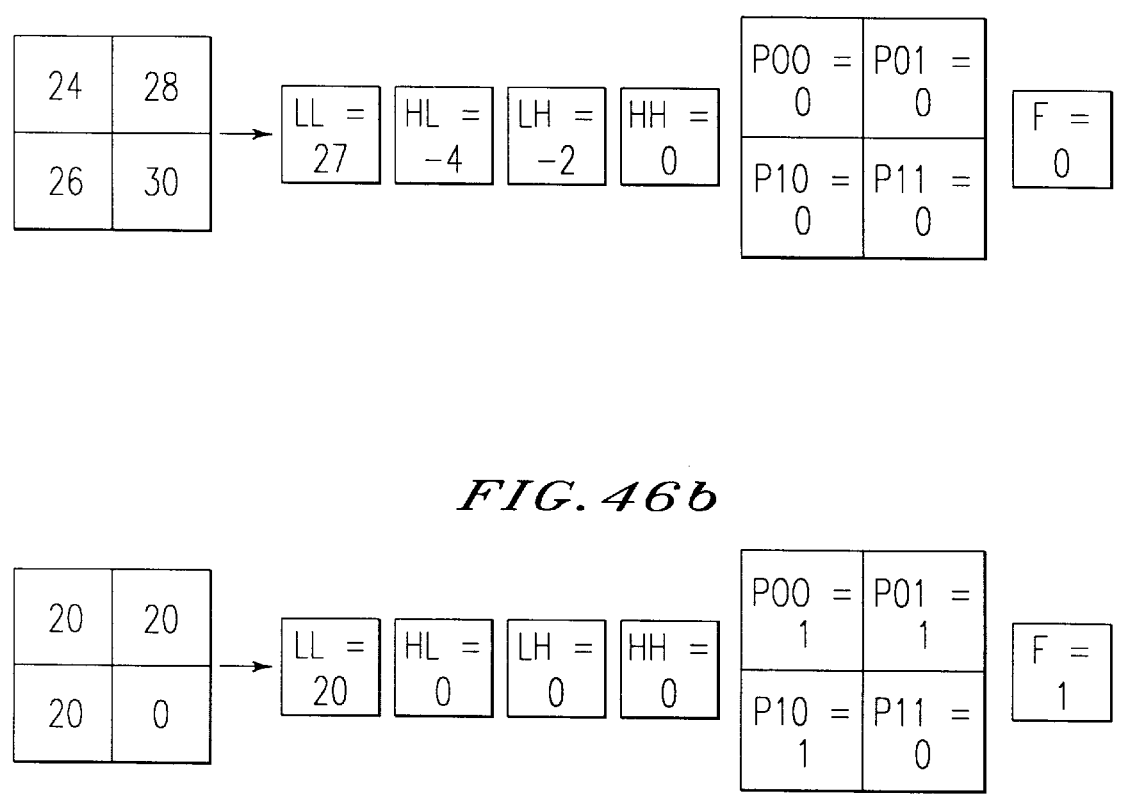

FIG. 46(a) shows a procedure of the image data encoding/decoding apparatus 160 of FIG. 43, in which the first image data block illustrated in FIGS. 41(a) and 41(b) is inputted in the data encoder 62. In this case, the 8-bit image density element K is not generated and the remaining six files are set to the respective values in the following way, which are also illustrated in FIG. 46(a).

LL=27
HL=−4
LH=−2
HH=0
P00=P01=P10=P11=0
F=0

FIG. 46(b) illustrates a case in which the first image data block illustrated in FIGS. 42(a) and 42(b) is inputted in the data encoder 62. In this case, the 8-bit image density element K, but no element LL is generated and the remaining files are set as shown below and in FIG. 46(b).

K=20
HL=LH=HH=0
P00=P01=P10=P11=0
F=1

By the thus-arranged first modified embodiment, hardware for handling the 8-bit image density element K and the element LL can be combined into one, resulting in cost savings without causing a reduction of compression efficiency, since both indicate image density and have a good correlation with each other.

Next, a procedure of compressing data of the location information is explained with reference to FIGS. 47(a)–49(b). When first, second, third, and fourth image data blocks, each including only image density values 0 and 255, for example, are inputted as illustrated in FIG. 47(a), each of the location information P00–P11 will be set to the respective values in a block form as illustrated in FIG. 47(b).

If the location information P00–P11 are arranged in a block form as illustrated in FIG. 48(a) and encoded by the entropy encoder 406, positional correlation of the data (1 or 0) included in each of the location information P00–P11 may become inferior as illustrated in FIG. 48(b).

In order to avoid this problem, the image data blocks illustrated in FIG. 47(a) is changed in the following way. The location information P00 and P01 of each of the first, second, third, and fourth image data blocks are picked up and placed as a first line as illustrated in FIG. 49(a). Then, the location information P10 and P11 of each of the first, second, third, and fourth image data blocks are picked up and placed as a second line, also illustrated in FIG. 49(a). When the thus-formed block of the location information P00–P11 are encoded by the entropy encoder 406, positional correlation of the data (1 or 0) included in each of the location information P00–P11 may become superior as illustrated in FIG. 49(b).

In this way, the location information P00–P11 of the image data blocks which are simple low-density image can be efficiently compressed just as the general binary image data.

Next, another procedure of compressing data of the location information is explained with reference to FIGS. 50–51(c). In this procedure, the four pixels a, b, c, and d that are successively aligned are converted into a 2- by 2-pixel block as illustrated in FIG. 50. Then, the 2- by 2-pixel block is processed. Then, the sub-band data elements LL, HL, LH, and HH, the flag information F, the 8-bit image density element K, and the location information P00–P11 are generated by the operations of the sub-band encoder 410, the first image type determining unit 402, and the density encoder 403, as illustrated in FIG. 50.

As an example, compression of the above-mentioned four simple low-density image data blocks illustrated in FIG. 51(a) is discussed. In this case, the location information P00–P11 are arranged as illustrated in FIG. 51(b) and encoded by the entropy encoder 406. As, a result, positional correlation of the data (1 or 0) included in each of the location information P00–P11 may become superior as illustrated in FIG. 51(c). Therefore, the location information P00–P11 of the image data blocks which are simple low-density image can be efficiently compressed just as the general binary image data, in the way described above.

Next, a data compression procedure using a so-called overlapping function is explained with reference to FIGS. 52–55. The overlapping function generally is a way in which the sub-band data encoding operation is performed on a focused image data block on the basis of correlation of pixel values of the focused image data block and an immediately adjacent image data block. Therefore, the overlapping function is considered as a data compression method that can compress data at a relatively high compression ratio and that is superior in reducing noise caused by interference between data blocks, which is referred to as a block-noise.

However, if the overlapping function is simply applied, wherein the sub-band encoding operation is applied not to a simple low-density image but to an image other than a simple low-density image by the overlapping function, the pixel values of the image data block immediately adjacent to the focused image data block may affect the compression operation and, as a result, the block-noise may occur at a region between the simple low-density image and an image other than the simple low-density image included in the focused image data block.

FIGS. 52 and 53 show procedures of the sub-band encoding operation by the sub-band encoder 410 and the sub-band decoding operation by the sub-band decoder 510, respectively, both using the overlapping function. In the procedure of FIG. 52, the sub-band encoder 410 stores values of pixels included in a focused image data block and an immediately adjacent image data block into a sub-band encoding data buffer included in the sub-band encoder 410, in Step S1. In Step S2, the sub-band encoder 410 encodes the data of focused image data block on the basis of the values stored in the sub-band encoding data buffer. Then, the process ends.

In the procedure of FIG. 53, the sub-band decoder 510 stores the sub-band-encoded data elements (or density-encoded elements) of pixels included in a focused image data block and an immediately adjacent image data block into a sub-band decoding data buffer included in the sub-band decoder 510, in Step S11. In Step S12, the immediately adjacent image data block is determined whether it is an image other than a simple low-density image. When the immediately adjacent image data block is not a simple low-density image and the determination result in Step S12 is NO, the procedure proceeds to Step S15. In Step S15, the focused image data block is decoded by the sub-band decoder 510 on the basis of the sub-band-encoded data elements stored in the sub-band decoding data buffer. Then, the process ends.

However, when the immediately adjacent image data block is determined as a simple low-density image and the determination result in Step S12 is YES, the procedure proceeds to Step S13. In Step S13, the sub-band decoder 510 sets values of the pixels included in the immediately adjacent image data block based on amounts of properties that represent the immediately adjacent image data block. Then, in Step S14, the sub-decoder 510 generates sub-band decoded data elements using the values set in Step S113, and the process proceeds to Step S15. In Step S15, the focused image data block is decoded by the sub-band decoder 510 on the basis of the sub-band-encoded data elements of the focused image data block and the immediately adjacent image data block stored in the sub-band decoding data buffer. Then, the process ends.

Thus, in the above-described procedures, when the immediately adjacent image data block is a simple low-density image, the immediately adjacent image data block can not be decoded back without using the amounts of properties representing the immediately adjacent image data.

FIGS. 54 and 55 show other procedures of the sub-band encoding operation by the sub-band encoder 410 and the sub-band decoding operation by the sub-band decoder 510, respectively, both using the overlapping function. In the procedures of FIGS. 54 and 55, when the immediately adjacent image data block is needed to be encoded by the density encoder 403, the pixel values of the immediately adjacent image data block is not used and, instead, a provisional pixel value that can be generated only from the sub-band-encoded data elements of the focused image data block is used, during the sub-band encoding operation.

The above-mentioned provisional pixel value may be generated using the straight pixel values of the focused image data block, or may be generated using a linear forecast line on the basis of the pixel values. In the procedures under discussion in this section, the provisional pixel value is simply set to 0.

In the procedure of FIG. 54, the sub-band encoder 410 stores values of pixels included in a focused image data block and an immediately adjacent image data block into a sub-band encoding data buffer included in the sub-band encoder 410, in Step S21. Then, in Step S22, the focused image data block and the immediately adjacent image data block are determined whether they are simple low-density images. When the immediately adjacent image data block are determined as a simple low-density image and the determination result of Step S22 is NO, the process proceeds to Step S24. In Step S24, the sub-band encoder 410 encodes the data of focused image data block on the basis of the values stored in the sub-band data encoding buffer. Then, the process ends.

When the immediately adjacent image data block is determined as a simple low-density image and the determination result in Step S22 is YES, the procedure proceeds to Step S23. In Step S23, the sub-band decoder 510 sets values of all the pixels included in the immediately adjacent image data block to 0, and the process proceeds to Step S24. In Step S24, the focused image data block is encoded by the sub-band encoder 510 on the basis of the pixel values included in the focused image data block and the immediately adjacent image data block stored in the sub-band encoding data buffer. Then, the process ends.

In the procedure of FIG. 55, the sub-band decoder 510 stores the sub-band-encoded data elements of pixels included in a focused image data block and an immediately adjacent image data block into a sub-band decoding data buffer included in the sub-band decoder 510, in Step S31. In Step S32, it is determined whether the immediately adjacent image data block is a data area other than a simple low-density image. When the immediately adjacent image data block is not a simple low-density image and the determination result in Step S32 is NO, the procedure proceeds to Step 34. In Step 34, the focused image data block is decoded by the sub-band decoder 510 on the basis of the sub-band-encoded data elements stored in the sub-band decoding data buffer. Then, the process ends.

However, when the immediately adjacent image data block is determined as a simple low-density image and the determination result in Step S32 is YES, the procedure proceeds to Step S33. In Step S33, the sub-band decoder 510 sets values of the pixels included in the immediately adjacent image data block to 0. Then, the process proceeds to Step S34. In Step S34, the focused image data block is decoded by the sub-band decoder 510 on the basis of the sub-band-encoded data elements of the focused image data block and the immediately adjacent image data block stored in the sub-band decoding data buffer. Then, the process ends.

In this way, a process of decoding the density encoded data elements by the sub-band decoding unit 510 is eliminated. As a result, the process becomes simple.

In addition, a data adding process for adding a provisional value is needed at the edges of an image since there is no immediately adjacent image data block at the edges of an image, during an actual operation using the overlapping function. For this purpose, the processes of Steps 22 and 23 can be also used.

Figure 57:
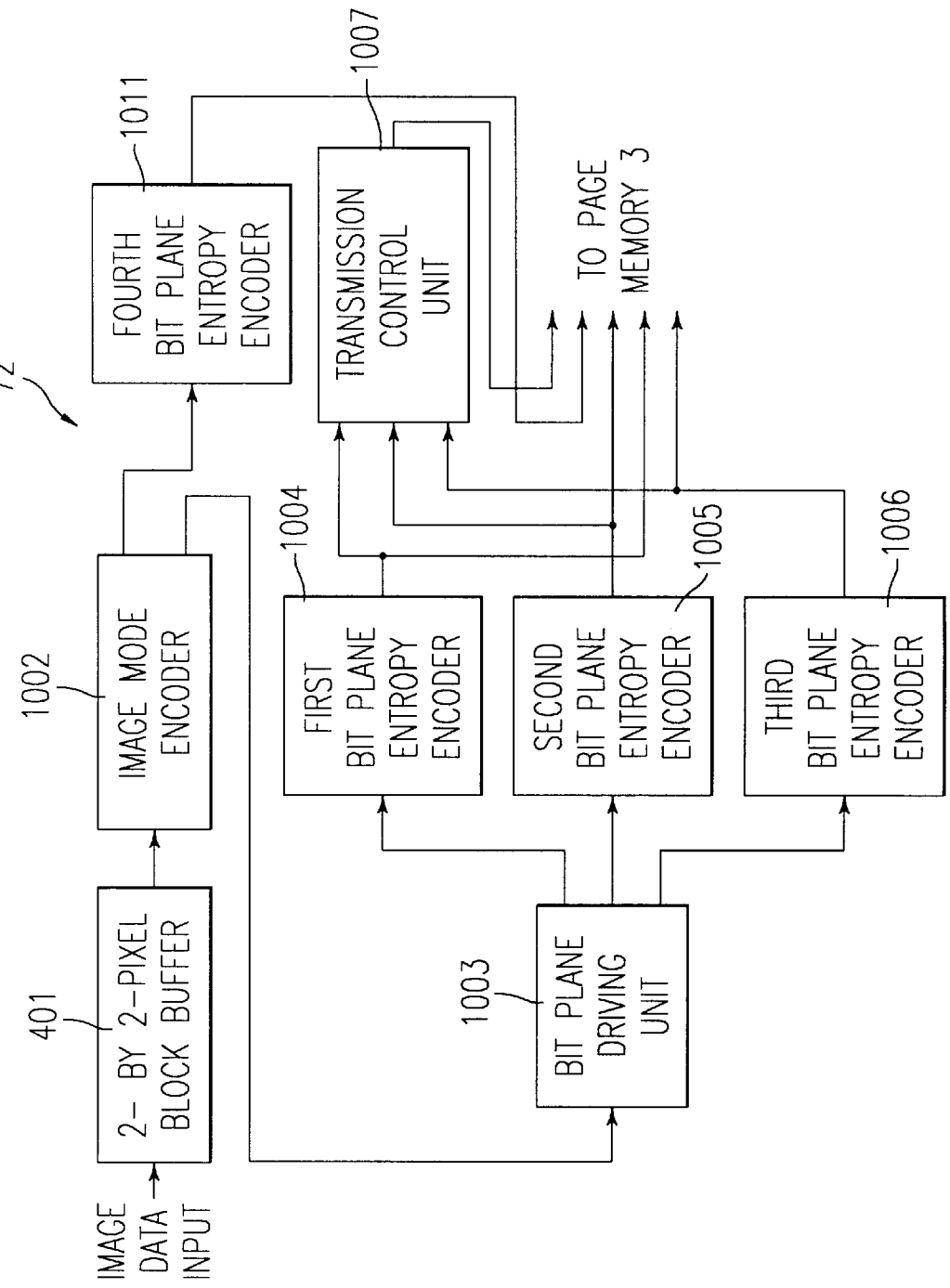

Next, an image data encoding/decoding apparatus 170 as an eighth embodiment according to the present invention is explained with reference to FIGS. 56 and 57. The image data encoding/decoding apparatus 170 which is illustrated in FIG. 56 is similar to the image data encoding/decoding apparatus 110 of FIG. 13, except for a data encoder 72 is used in place of the data encoder 12 of FIG. 13. FIG. 57 illustrates the data encoder 72 which is similar to the data encoder 12, except for a fourth bit plane entropy encoder 1011.

In the image data encoding/decoding apparatus 170, image data are inputted into the 2- by 2-pixel block buffer 401. Then, the pixels a, b, c, and d are encoded into the sub-band data elements LL, HL, LH, and HH, the flag information F, the 8-bit image density data element K, and the location information P by the image model encoder 1002, in a similar way as described in the discussion for the data encoder 52 of the image data encoding/decoding apparatus 150 of FIG. 37. The flag information F, the 8-bit image density data element K, and the location information P are transferred to the fourth bit plane entropy encoder 1011, encoded therein and stored in the page memory 3.

At the same time, the sub-band encoded data elements LL, HL, LH, and HH are transmitted to the bit plane dividing unit 1003 and divided into the most important bit set, the important bit set, and the non-important bit set, for example, in the same way as described in the discussion for the data encoder 12 of the image data encoding/decoding apparatus 110 of FIG. 13. Then, the data of the most important, important, and non-important bit sets are transferred to the first, second, and third data entropy encoders 1004, 1005, and 1006, respectively, and encoded. The block-formed image data, encoded by the first, second, and third data entropy encoders 1004, 1005, and 1006, respectively, are transferred to the transmission control unit 1007 and the page memory 3.

Then, the less important data are abandoned and the more important data are stored into the page memory 3 by the transmission control unit 1007, when the entire amount of data can not be stored into the page memory 3.

By the thus-configured image data encoding/decoding apparatus 170, the sub-band encoded data elements are extracted and less important bit plane can be abandoned on a needed basis, so that the compressed data can be transmitted into the page memory in a relatively high speed.

This invention may be conveniently implemented using a conventional general purpose digital computer programmed according to the teaching of the present specification, as will be apparent to those skilled in the computer art. Appropriate software coding can readily be prepared by skilled programmers based on the teaching of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teaching. It is therefore to be understood that within the scope of the appended claims, the present invention may be practiced otherwise than as specifically described herein.

This application is based on Japanese patent application JPAP No. 09-030609 filed in the Japanese Patent Office on Feb. 14, 1997, the entire contents of which are hereby incorporated by reference.

What is claimed as new and desired to be secured by Letters Patent of the United States is:

1. An image data encoding/decoding apparatus, comprising:

first data dividing means for dividing input image data into m- by n-pixel blocks each with a predetermined number of bits, m and n each being an integral multiple of 2;

first data encoding means for encoding, according to frequency information included in said input image data, each of said m- by n-pixel blocks into a first data block including a plurality of frequency data elements;

second data encoding means for encoding said each of said m- by n-pixel blocks into a second data block that represents said image data in fewer bits than said predetermined number of bits for each m- by n-pixel block, elements of said second data block including an image density characterizing a pixel image density value common to at least two pixels in a m- by n-pixel block being encoded by said second data encoding means, locations of pixels having said image density, and a flag for specifying an image type;

first image type determining means for determining whether a number of different image density values, which pertain to pixels included in each of said m- by n-pixel blocks, is equal to a first predetermined value; and first data selecting means for selecting said first data block from said first data encoding means when said first image type determining means determines that the number of said different image density values of said m- by n-pixel block is different from said first predetermined value and said second data block from said second data encoding means when said first image type determining means determines that the number of said different image density values of said m- by n-pixel block is equal to said first predetermined value.

2. The image data encoding/decoding apparatus according to claim 1, wherein said image density, said locations of pixels having said image density, and said flag for specifying an image type encoded by said second data encoding means are respectively embedded into said plurality of frequency data elements which are arranged in a predetermined order.

3. The image data encoding/decoding apparatus according to claim 1, further comprising:

second data dividing means for dividing one of said first and second data blocks, selected by said first data selecting means, into a plurality of bit planes according to a predetermined priority; and bit plane control means for determining whether a size of said input image data is greater than a capacity of a memory for storing said input image data and for abandoning bit planes according to said predetermined priority when said bit plane control means determines that said size of said input image data is greater than said capacity of said memory.

4. The image data encoding/decoding apparatus according to claim 1, wherein after selecting one of said first and second data blocks said first selecting means converts said one of said first and second data blocks into a binary code excluding a sign representation, adds a sign bit indicative of a plus sign or a minus sign to said binary code at a place immediately next to, in a side closer to a least significant bit thereof, a bit closest to a most significant bit among bits set to 1 which is set to 1, further converts said binary code with said sign bit into a gray binary code using a gray encoding operation, and erases at least one bit from said gray binary code from a least significant bit of said gray binary code.

5. The image data encoding/decoding apparatus according to claim 1, wherein said second data encoding means encodes only image density other than a first predetermined background density into said image density data element, during a process of encoding said image density when encoding said each of said m- by n-pixel blocks into said second data block including a plurality of elements representing an image density characterizing respective of said m- by n-pixel blocks, locations of pixels having said image density, and a flag for specifying an image type.

6. The image data encoding/decoding according to claim 1, further comprising:

first storing means for storing a value of a latest image density other than a first background density, and wherein said second data encoding means encodes said latest image density stored in said first storing means into an image density data element when all the pixels included in said second data block have said first predetermined background density, during a process of encoding said image density when encoding said each of said m- by n-pixel blocks into said second data block including a plurality of elements representing an image density characterizing respective of each of said m- by n-pixel blocks, locations of pixels having said image density, and a flag for specifying an image type.

7. The image data encoding/decoding apparatus according to claim 1, further comprising:

background density change means for changing a background density of said second data block from one to another when a number of different densities of said second data block is equal to a predetermined number by changing said background density of said second data block from one to another using two different predetermined background densities, during a process of encoding said image density when said second data encoding means encodes said each of said m- by n-pixel blocks into said second data block including a plurality of elements representing an image density characterizing respective of said m- by n-pixel blocks, locations of pixels having said image density, and a flag for specifying an image type.

8. The image data encoding/decoding apparatus according to claim 7, wherein said second data encoding means encodes said flag data element into a different flag data element when said background density change means changes said background density of said second data block from one to the other during a process of encoding said flag data element when said second data encoding means encodes said each of said m- by n-pixel blocks into said second data block including a plurality of elements representing an image density characterizing respective of said m- by n-pixel blocks, locations of pixels having said image density, and a flag for specifying an image type.

9. The image data encoding/decoding apparatus according to claim 1, wherein said first data selecting means selects, in accordance with image densities adjacent to said m- by n-pixel block, said first data block from said first data encoding means when said first image type determining means determines that the number of said different image density values of said m- by n-pixel block is different from said first predetermined value and said second data block from said second data encoding means when said first image type determining means determines that the number of said different image density values of said m- by n-pixel block is equal to said first predetermined value.

10. The image data encoding/decoding apparatus according to claim 1, further comprising a second data dividing means for dividing said first data blocks selected by said first data selecting means into a plurality of bit planes according to a predetermined priority and a bit plane control means for determining whether a size of said input image data is greater than a capacity of a memory for storing said input image data and for abandoning bit planes according to said predetermined priority when said bit plane control means determines that said size of said input image data is greater than said capacity of said memory.

11. An image data encoding/decoding apparatus, comprising:

first data dividing means for dividing input image data into m- by n-pixel blocks each with a predetermined number of bits, m and n each being an integer;

first data encoding means for encoding, according to frequency information included in said input image data, each of said m- by n-pixel blocks into a first data block including a plurality of frequency data elements;

second data encoding means for encoding said each of said m- by n-pixel blocks into a second data block that represents said image data in fewer bits than said predetermined number of bits for each m- by n-pixel block elements of said second data block including an image density characterizing a pixel image density value common to at least two pixels in an m- by n-pixel block being encoded by said second data encoding means, locations of pixels having said image density, and a flag for specifying an image type;

first image type determining means for determining as to whether a number of different image density values, which pertain to pixels included in each of said m- by n-pixel blocks, is equal to a first predetermined value;

first data selecting means for selecting said first data block from said first data encoding means when said first image type determining means determines that the number of said different image density values of said m- by n-pixel block is different from said first predetermined value and said second data block from said second data encoding means when said first image type determining means determines that the number of said different image density values of said m- by n-pixel block is equal to said first predetermined value;

first data decoding means for decoding said first data block into an m- by n-pixel block which is substantially similar to said m- by n-pixel block previously divided by said first data dividing means;

second data decoding means for decoding said second data block into an m- by n-pixel block which is substantially similar to said m- by n-pixel block previously divided by said first data dividing means;

second image type determining means for determining whether said flag data element is equal to a second predetermined value; and second data selecting means for selecting said m- by n-pixel block from said first data decoding means when said second image type determining means determines that said flag data element is different from said second predetermined value and said m- by n-pixel block from said second data decoding means when said second image type determining means determines that said flag data element is equal to said second predetermined value.

12. The image data encoding/decoding apparatus according to claim 11, wherein said image density, said locations of pixels having said image density, and said flag for specifying an image type encoded by said second data encoding means are respectively embedded into said plurality of frequency data elements which are arranged in a predetermined order.

13. The image data encoding/decoding apparatus according to claim 11, wherein after selecting one of said first and second data blocks said first selecting means converts said one of said first and second data blocks into a binary code excluding a sign representation, adds a sign bit indicative of a plus sign or a minus sign to said binary code at a place immediately next to, in a side closer to a least significant bit thereof, a bit closest to a most significant bit among bits set to 1 which is set to 1, encodes said binary code with said sign bit into a gray binary code using a gray encoding operation, erases at least one bit from said gray binary code from the least significant bit of said gray binary code, adds at least one bit set to 0 to the least significant bit so as to regenerate data substantially similar to said gray binary code, which number of bit is equivalent to said at least one bit erased from said gray binary code, and decodes said data substantially similar to said gray binary code into said data substantially similar to said binary code with said sign bit.

14. The image data encoding/decoding apparatus according to claim 11, wherein said second data encoding means encodes only image density other than a first predetermined background density into an image density data element, during a process of encoding said image density when encoding said each of said m- by n-pixel blocks into said second data block including a plurality of elements representing an image density characterizing respective of said m- by n-pixel blocks, locations of pixels having said image density, and a flag for specifying an image type, and said second data decoding means decodes said image density data element on a basis of said third predetermined value and said image density other than said background density.

15. The image data encoding/decoding apparatus according to claim 11, further comprising background density change means for changing a background density of said second data block from one to another when a number of different densities of said second data block is equal to a predetermined number by changing said background density of said second data block from one to another using two different predetermined background densities, during a process of encoding said image density when said second data encoding means encodes said each of said m- by n-pixel blocks into said second data block including a plurality of elements representing an image density characterizing respective of said m- by n-pixel blocks, locations of pixels having said image density, and a flag for specifying an image type, and wherein said second data decoding means uses one of said two different predetermined background densities in accordance with said flag data element when said background density change means changes a background density of said second data block from one to the other and said second data encoding means accordingly encodes said flag data element into a different flag data element.

16. The image data encoding/decoding apparatus according to claim 11, wherein said second data selecting means selects said m- by n-pixel block from said second data decoding means when said second image type determining means determines that said flag data element is equal to a value of said flag data element which is made when said first data selecting means erases at least one bit from said flag data element.

17. An image data encoding/decoding apparatus, comprising:

first data dividing means for dividing input image data into m- by n-pixel blocks each with a predetermined number of bits, m and n each being an integer;

first data encoding means for encoding, according to frequency information included in said input image data, each of said m- by n-pixel blocks into a first data block including a plurality of sub-band data elements;

second data encoding means for encoding said each of said m- by n-pixel blocks into a second data block that represents said image data in fewer bits than said predetermined number of bits for each m- by n-pixel block elements of said second data block including an image density characterizing a pixel image density value common to at least two pixels in a m- by n-pixel block being encoded by said second data encoding means, and locations of pixels having said image density;

first image type determining means for determining whether a number of different image density values, which pertain to pixels included in each of said m- by n-pixel blocks, is equal to a first predetermined value;

flag generating means for generating a flag data element for specifying one of image types which are an m- by n-pixel block determined to have the number of said different image density values of said m- by n-pixel block being different from said first predetermined value by said first image type determining means, and an m- by n-pixel block determined to have the number of said different image density values of said m- by n-pixel block being equal to said first predetermined value, said flag data element being used to select one of blocks based on said first data block encoded by said first data encoding means and said second data block encoded by said second data encoding means; and compressing means for compressing said first data block encoded by said first data encoding means, said second data block encoded by said second data encoding means, and said flag data element generated by said flag generating means.

18. The image data encoding/decoding apparatus according to claim 17, wherein said compressing means embeds said image density included in said second data block encoded by said second data encoding means to a predetermined element of said plurality of said sub-band data elements included in said first data block encoded by said first data encoding means and compresses said image density and said predetermined element together.

19. The image data encoding/decoding apparatus according to claim 17, wherein said second data encoding means changes an arrangement of data of said locations included in said second data block so as to have a correlation between said arrangement of said data of said location and an arrangement of said input image data.

20. The image data encoding/decoding apparatus according to claim 17, wherein said first data encoding means encodes an m- by n-pixel block, including successive m by n pixels in a line of said input image data, into said first data block including said plurality of said sub-band data elements.

21. The image data encoding/decoding apparatus according to claim 17, wherein said first data encoding means generates temporary pixel data when an m- by n-pixel block adjacent to said m- by n-pixel block being processed is encoded by said second data encoding means and performs an overlapping function to encode said m- by n-pixel block being processed using said temporary pixel data as an m- by n-pixel block adjacent to said m- by n-pixel block being processed.

22. An image data encoding/decoding apparatus, comprising:
first data dividing means for dividing input image data into m- by n-pixel blocks each with a predetermined number of bits, m and n each being an integer;
first data encoding means for encoding, according to frequency information included in said input image data, each of said m- by n-pixel blocks into a first data block including a plurality of sub-band data elements;
second data encoding means for encoding said each of said m- by n-pixel blocks into a second data block that represents said image data in fewer bits than said predetermined number of bits for each m- by n-pixel block, elements of said second data block including
an image density characterizing a pixel image density value common to at least two pixels in a m- by n-pixel block being encoded by said second data encoding means, and
locations of pixels having said image density;
first image type determining means for determining whether a number of different image density values, which pertain to pixels included in each of said m- by n-pixel blocks, is equal to a first predetermined value;
flag generating means for generating a flag data element for specifying one of image types which are
an m- by n-pixel block determined to have the number of said different image density values of said m- by n-pixel block being different from said first predetermined value by said first image type determining means, and
an m- by n-pixel block determined to have the number of said different image density values of said m- by n-pixel block being equal to said first predetermined value, said flag data element being used to select one of blocks based on said first data block encoded by said first data encoding means and
said second data block encoded by said second data encoding means;
first data decoding means for decoding said first data block into an m- by n-pixel block which is substantially similar to said m- by n-pixel block previously divided by said first data dividing means;
second data decoding means for decoding said second data block into an m- by n-pixel block which is substantially similar to said m- by n-pixel block previously divided by said first data dividing means;
second image type determining means for determining whether said flag data element is equal to a second predetermined value; and
data selecting means for selecting one of said m- by n-pixel block from said first data decoding means and said m- by n-pixel block from said second data decoding means in accordance with said flag data element.

23. The image data encoding/decoding apparatus according to claim 22, wherein said compressing means embeds said image density included in said second data block encoded by said second data encoding means to a predetermined element of said plurality of said sub-band data elements included in said first data block encoded by said first data encoding means and compresses said image density and said predetermined element together, and said second data decoding means decodes said compressed image density embedded in said predetermined element.

24. The image data encoding/decoding apparatus according to claim 22, wherein said second data encoding means changes an arrangement of data of said locations included in said second data block so as to have a correlation between said arrangement of said data of said location and an arrangement of said input image data, and said second data decoding means returns said arrangement of said data of said locations included in said second data block to a previous arrangement thereof.

25. The image data encoding/decoding apparatus according to claim 22, wherein:
said first data encoding means encodes an m- by n-pixel block, including successive m by n pixels in a line of said input image data, into said first data block including said plurality of sub-band data elements; and
said first data decoding means decodes said plurality of said sub-band data elements included in said first data block into said m- by n-pixel block, including said successive m by n pixels in a line of said input image data.

26. The image data encoding/decoding apparatus according to claim 22, wherein:
said first data encoding means generates temporary pixel data when an m- by n-pixel block adjacent to said m- by n-pixel block being processed is encoded by said second data encoding means and performs an overlapping function to encode said m- by n-pixel block being processed using said temporary pixel data as an m- by n-pixel block adjacent to said m- by n-pixel block being processed, and
said first data decoding means generates said temporary pixel data when an m- by n-pixel block adjacent to said m- by n-pixel block being processed is encoded by said second data encoding means and decodes said encoded m- by n-pixel block being processed using said temporary pixel data as an m- by n-pixel block adjacent to said m- by n-pixel block being processed.

27. An image data encoding/decoding apparatus, comprising:
- a first data divider configured to input image data into m- by n-pixel blocks each with a predetermined number of bits, m and n each being an integer;
- a first data encoder configured to encode, according to frequency information included in said input image data, each of said m- by n-pixel blocks into a first data block including a plurality of frequency data elements;
- a second data encoder configured to encode said each of said m- by n-pixel blocks into a second data block that represents said image data in fewer bits than said predetermined number of bits for each m- by n-pixel block, elements of said second data block including
  - an image density characterizing a pixel image density value common to at least two pixels in a m- by n-pixel block being encoded by said second data encoder,
  - locations of pixels having said image density, and
  - a flag data element for specifying an image type;
- a first image type determiner configured to determine whether a number of different image density values, which pertain to pixels included in each of said m- by n-pixel blocks, is equal to a first predetermined value; and
- a first data selector configured to select said first data block from said first data encoder when said first image type determiner determines that the number of said different image density values of said m- by n-pixel block is different from said first predetermined value and said second data block from said second data encoder when said first image type determiner determines that the number of said different image density values of said m- by n-pixel block is equal to said first predetermined value.

28. The image data encoding/decoding apparatus according to claim 27, wherein said image density, said locations of pixels having said image density, and said flag for specifying an image type encoded by said second data encoder are respectively embedded into said plurality of frequency data elements which are arranged in a predetermined order.

29. The image data encoding/decoding apparatus according to claim 27, further comprising:
- a second data divider configured to divide one of said first and second data blocks, selected by said first data selector, into a plurality of bit planes according to a predetermined priority; and
- a bit plane controller configured to determine whether a size of said input image data is greater than a capacity of a memory configured to store said input image data and abandon bit planes according to said predetermined priority when said bit plane controller determines that said size of said input image data is greater than said capacity of said memory.

30. The image data encoding/decoding apparatus according to claim 27, wherein after selecting one of said first and second data blocks said first data selector converts said one of said first and second data blocks into a binary code excluding a sign representation, adds a sign bit indicative of a plus sign or a minus sign to said binary code at a place immediately next to, in a side closer to a least significant bit thereof, a bit closest to a most significant bit among bits set to 1 which is set to 1, further converts said binary code with said sign bit into a gray binary code using a gray encoding operation, and erases at least one bit from said gray binary code from a least significant bit of said gray binary code.

31. The image data encoding/decoding apparatus according to claim 27, wherein said second data encoder encodes only image density other than a first predetermined background density into said image density data element, during a process of encoding said image density when encoding said each of said m- by n-pixel blocks into said second data block including a plurality of elements representing an image density characterizing respective of said m- by n-pixel blocks, locations of pixels having said image density, and a flag for specifying an image type.

32. The image data encoding/decoding according to claim 27, further comprising:
- a first memory configured to store a value of a latest image density other than a first background density, and wherein
- said second data encoder encodes said latest image density stored in said first memory into an image density data element when all the pixels included in said second data block have said first predetermined background density, during a process of encoding said image density when encoding said each of said m- by n-pixel blocks into said second data block including said plurality of elements representing an image density characterizing respective of said m- by n-pixel blocks, locations of pixels having said image density, and a flag data element for specifying an image type.

33. The image data encoding/decoding apparatus according to claim 27, further comprising:
- a background density changer configured to change a background density of said second data block from one to another when a number of different densities of said second data block is equal to a predetermined number by changing said background density of said second data block from one to another using two different predetermined background densities, during a process of encoding said image density when said second data encoder encodes said each of said m- by n-pixel blocks into said second data block including said plurality of elements representing an image density characterizing respective of said m- by n-pixel blocks, locations of pixels having said image density, and a flag data element for specifying an image type.

34. The image data encoding/decoding apparatus according to claim 33, wherein said second data encoder encodes said flag data element into a different flag data element when said background density changer changes said background density of said second data block from one to the other during a process of encoding said flag data element when said second data encoder encodes said each of said m- by n-pixel blocks into said second data block including said plurality of elements representing an image density characterizing respective of said m- by n-pixel blocks, locations of pixels having said image density, and a flag data element for specifying an image type.

35. The image data encoding/decoding apparatus according to claim 27, wherein said first data selector selects, in accordance with image densities adjacent to said m- by n-pixel block, said first data block from said first data encoder when said first image type determiner determines that the number of said different image density values of said m- by n-pixel block is different from said first predetermined value and said second data block from said second data encoder when said first image type determiner determines that the number of said different image density values of said m- by n-pixel block is equal to said first predetermined value.

36. The image data encoding/decoding apparatus according to claim 27, further comprising a second data divider configured to divide said first data blocks selected by said first data selector into a plurality of bit planes according to a predetermined priority and a bit plane controller for determining whether a size of said input image data is greater than a capacity of a memory for storing said input image data and for abandoning bit planes according to said predetermined priority when said bit plane controller determines that said size of said input image data is greater than said capacity of said memory.

37. An image data encoding/decoding apparatus, comprising:

a first data divider configured to divide input image data into m- by n-pixel blocks each with a predetermined number of bits, m and n each being an integer;

a first data encoder configured to encode, according to frequency information included in said input image data, each of said m- by n-pixel blocks into a first data block including a plurality of frequency data elements;

a second data encoder configured to encode said each of said m- by n-pixel blocks into a second data block that represents said image data in fewer bits than said predetermined number of bits for each m- by n-pixel block, elements of said second data block including an image density characterizing a pixel image density value common to at least two pixels in a m- by n-pixel block being encoded by said second data encoder, locations of pixels having said image density, and a flag data element for specifying an image type;

a first image type determiner configured to determine whether a number of different image density values, which pertain to pixels included in each of said m- by n-pixel blocks, is equal to a first predetermined value;

a first data selector configured to select said first data block from said first data encoder when said first image type determiner determines that the number of said different image density values of said m- by n-pixel block is different from said first predetermined value and said second data block from said second data encoder when said first image type determiner determines that the number of said different image density values of said m- by n-pixel block is equal to said first predetermined value;

a first data decoder configured to decode said first data block into an m- by n-pixel block which is substantially similar to said m- by n-pixel block previously divided by said first data divider;

a second data decoder configured to decode said second data block into an m- by n-pixel block which is substantially similar to said m- by n-pixel block previously divided by said first data divider;

a second image type determiner configured to determine whether said flag data element is equal to a second predetermined value; and a second data selector configured to select said m- by n-pixel block from said first data decoder when said second image type determiner determines that said flag data element is different from said second predetermined value and said m- by n-pixel block from said second data decoder when said second image type determiner determines that said flag data element is equal to said second predetermined value.

38. The image data encoding/decoding apparatus according to claim 37, wherein said image density, said locations of pixels having said image density, and said flag for specifying an image type encoded by said second data encoder are respectively embedded into said plurality of frequency data elements which are arranged in a predetermined order.

39. The image data encoding/decoding apparatus according to claim 37, wherein after selecting one of said first and second data blocks said first data selector converts said one of said first and second data blocks into a binary code excluding a sign representation, adds a sign bit indicative of a plus sign or a minus sign to said binary code at a place immediately next to, in a side closer to a least significant bit thereof, a bit closest to a most significant bit among bits set to 1 which is set to 1, encodes said binary code with said sign bit into a gray binary code using a gray encoding operation, erases at least one bit from said gray binary code from the least significant bit of said gray binary code, adds at least one bit set to 0 to the least significant bit so as to regenerate data substantially similar to said gray binary code, which number of bit is equivalent to said at least one bit erased from said gray binary code, and decodes said data substantially similar to said gray binary code into said data substantially similar to said binary code with said sign bit.

40. The image data encoding/decoding apparatus according to claim 37, wherein said second data encoder encodes only image density other than a first predetermined background density into an image density data element, during a process of encoding said image density when encoding said each of said m- by n-pixel blocks into said second data block including a plurality of elements representing an image density characterizing respective of said m- by n-pixel blocks, locations of pixels having said image density, and a flag for specifying an image type, and said second data decoder decodes said image density data element on a basis of said background density having said third predetermined value and said image density other than said background density.

41. The image data encoding/decoding apparatus according to claim 37, further comprising a background density changer configured to change a background density of said second data block from one to another when a number of different densities of said second data block is equal to a predetermined number by changing said background density of said second data block from one to another using two different predetermined background densities, during a process of encoding said image density when said second data encoder encodes said each of said m- by n-pixel blocks into said second data block including said plurality of elements representing an image density characterizing respective of said m- by n-pixel blocks, locations of pixels having said image density, and a flag data element for specifying an image type, and wherein said second data decoder uses one of said two different predetermined background densities in accordance with said flag data element when said background density changer changes a background density of said second data block from one to the other and said second data encoder accordingly encodes said flag data element into a different flag data element.

42. The image data encoding/decoding apparatus according to claim 37, wherein said second data selector selects said m- by n-pixel block from said second data decoder when said second image type determiner determines that said flag data element is equal to a value of said flag data element which is made when said first data selector erases at least one bit from said flag data element.

43. An image data encoding/decoding apparatus, comprising:

a first data divider configured to divide input image data into m- by n-pixel blocks each with a predetermined number of bits, m and n being an integer;

a first data encoder configured to encode, according to frequency information included in said input image data, each of said m- by n-pixel blocks into a first data block including a plurality of sub-band data elements;

a second data encoder configured to encode said each of said m- by n-pixel blocks into a second data block that represents said image data in fewer bits than said m- by n-pixel block, elements of said data block including an image density characterizing a pixel image density value common to at least two pixels in a m- by n-pixel block being encoded by said second data encoder and locations of pixels having said image density;

a first image type determiner configured to determine whether a number of different image density values, which pertain to pixels included in each of said m- by n-pixel blocks, is equal to a first predetermined value;

a flag generator configured to generate a flag data element for specifying one of image types which are an m- by n-pixel block determined to have the number of said different image density values of said m- by n-pixel block being different from said first predetermined value by said first image type determiner, and an m- by n-pixel block determined to have the number of said different image density values of said m- by n-pixel block being equal to said first predetermined value, said flag data element being used to select one of blocks based on said first data block encoded by said first data encoder and said second data block encoded by said second data encoder; and a compressor configured to compress said first data block encoded by said first data encoder, said second data block encoded by said second data encoder, and said flag data element generated by said flag generator.

44. The image data encoding/decoding apparatus according to claim 43, wherein said compressor embeds said image density included in said second data block encoded by said second data encoder to a predetermined element of said plurality of said sub-band data elements included in said first data block encoded by said first data encoder and compresses said image density and said predetermined element together.

45. The image data encoding/decoding apparatus according to claim 43, wherein said second data encoder changes an arrangement of data of said locations included in said second data block so as to have a correlation between said arrangement of said data of said location and an arrangement of said input image data.

46. The image data encoding/decoding apparatus according to claim 43, wherein said first data encoder encodes an m- by n-pixel block, including successive m by n pixels in a line of said input image data, into said first data block including said plurality of said sub-band data elements.

47. The image data encoding/decoding apparatus according to claim 43, wherein said first data encoder generates temporary pixel data when an m- by n-pixel block adjacent to said m- by n-pixel block being processed is encoded by said second data encoder and performs an overlapping function to encode said m- by n-pixel block being processed using said temporary pixel data as an m- by n-pixel block adjacent to said m- by n-pixel block being processed.

48. An image data encoding/decoding apparatus, comprising:

a first data divider configured to divide input image data into m- by n-pixel blocks each with a predetermined number of bits, m and n each being an integer;

a first data encoder configured to encode, according to frequency information included in said input image data, each of said m- by n-pixel blocks into a first data block including a plurality of sub-band data elements;

a second data encoder configured to encode said each of said m- by n-pixel blocks into a second data block that represents said image data in fewer bits than said predetermined number of bits for each m- by n-pixel block, elements of said data block including an image density characterizing a pixel image density value common to at least two pixels in a m- by n-pixel block being encoded by said second data encoder and locations of pixels having said image density;

a first image type determiner configured to determine whether a number of different image density values, which pertain to pixels included in each of said m- by n-pixel blocks, is equal to a first predetermined value;

a flag generator configured to generate a flag data element for specifying one of image types which are an m- by n-pixel block determined as that the number of said different image density values of said m- by n-pixel block being different from said first predetermined value by said first image type determiner, and an m- by n-pixel block determined to have the number of said different image density values of said m- by n-pixel block being equal to said first predetermined value, said flag data element being used to select one of blocks based on said first data block encoded by said first data encoder and said second data block encoded by said second data encoder;

a first data decoder configured to decode said first data block into an m- by n-pixel block which is substantially similar to said m- by n-pixel block previously divided by said first data divider;

a second data decoder configured to decode said second data block into an m- by n-pixel block which is substantially similar to said m- by n-pixel block previously divided by said first data divider;

a second image type determiner configured to determine whether said flag data element is equal to a second predetermined value; and a data selector configured to select one of said m- by n-pixel block from said first data decoder and said m- by n-pixel block from said second data decoder in accordance with said flag data element.

49. The image data encoding/decoding apparatus according to claim 48, wherein said compressor embeds said image density included in said second data block encoded by said second data encoder to a predetermined element of said plurality of said sub-band data elements included in said first data block encoded by said first data encoder and compresses said image density and said predetermined element together, and said second data decoder decodes said compressed image density embedded in said predetermined element.

50. The image data encoding/decoding apparatus according to claim 48, wherein said second data encoder changes an arrangement of data of said locations included in said second data block so as to have a correlation between said arrangement of said data of said location and an arrangement of said input image data, and said second data decoder returns said arrangement of said data of said locations included in said second data block to a previous arrangement thereof.

51. The image data encoding/decoding apparatus according to claim 48, wherein:

said first data encoder encodes an m- by n-pixel block, including successive m by n pixels in a line of said input image data, into said first data block including said plurality of said sub-band data elements, and said first data decoder decodes said plurality of said sub-band data elements included in said first data block into said m- by n-pixel block, including said successive m by n pixels in a line of said input image data.

52. The image data encoding/decoding apparatus according to claim 48, wherein:

said first data encoder generates temporary pixel data when an m- by n-pixel block adjacent to said m- by n-pixel block being processed is encoded by said second data encoder and performs an overlapping function to encode said m- by n-pixel block being processed using said temporary pixel data as an m- by n-pixel block adjacent to said m- by n-pixel block being processed, and said first data decoder generates said temporary pixel data when an m- by n-pixel block adjacent to said m- by n-pixel block being processed is encoded by said second data encoder and decodes said encoded m- by n-pixel block being processed using said temporary pixel data as an m- by n-pixel block adjacent to said m- by n-pixel block being processed.

53. A method for encoding and decoding image data comprising the steps of:

dividing input image data into m-by-n pixel blocks each with a predetermined number of bits, m and n each being an integer;

encoding, according to frequency information included in said input image data, each of said m-by n-pixel blocks into a first data block including a plurality of frequency data elements;

encoding said each of said m- by n-pixel blocks into a second data block that represents said image data in fewer than said predetermined number of bits elements of said second data block including an image density characterizing a pixel image density value common to at least two pixels of a m- by n-pixel block that is encoded into the second data block, locations of pixels having said image density, and a flag for specifying an image type;

determining whether a number of different image density values, which pertain to pixels included in each of said by n-pixel blocks, is equal to a first predetermined value; and selecting said first data block when it is determined in said determining step that the number of said different image density values of respective of the m- by n-pixel block is different from said predetermined value and said second data block when it is determined that the number of said different image density values of respective of said m- by n-pixel blocks is equal to said first predetermined value.

54. A method for encoding and decoding image data, comprising the steps of:

dividing input image data into m- by n-pixel blocks each with a predetermined number of bits, m and n each being an integer;

encoding, according to frequency information included in said input image data, each of said m- by n-pixel blocks into a first data block including a plurality of frequency data elements;

encoding said each of said m- by n-pixel blocks into a second data block that represents said image data in fewer bits than said predetermined number of bits, elements of said second data block including an image density characterizing a pixel image density value common to at least two pixels of a m- by n-pixel block that is encoded into the second data block, locations of pixels having said image density, and a flag for specifying an image type;

determining whether a number of different image density values, which pertain to pixels included in each of said m- by n-pixel blocks, is equal to a first predetermined value;

selecting said first data block when it is determined that the number of said different image density values of said first data block is different from said first predetermined value and said second data block when it is determined that the number of said different image density values of said second data block is equal to said first predetermined value;

decoding said first data block into a first decoded m- by n-pixel block which is substantially similar to said m- by n-pixel block previously divided;

decoding said second data block into a second decoded m- by n-pixel block which is substantially similar to the m- by n-pixel block previously divided;

determining whether said flag data element is equal to a second predetermined value; and selecting said first decoded m- by n-pixel data block after being decoded in said step of decoding said first data block, when it is determined that said flag element is different from said second predetermined value and selecting said second decoded m- by n-pixel data block after performing said step of decoding said second data block when it is determined that said flag data element is equal to said second predetermined value.

55. A method for encoding and decoding image data, comprising the steps of:

dividing input image data into m- by n-pixel blocks each with a predetermined number of bits, m and n each being an integer;

encoding, according to frequency information included in said input image data, each of said m- by n-pixel blocks into a first data block including a plurality of sub-band data elements;

encoding said each of said m- by n-pixel blocks into a second data block that represents said image data in fewer bits than said predetermined number of bits for each m- by n-pixel block, elements of said second data block including an image density characterizing a pixel image density value common to at least two pixels of a m- by n-pixel block that is encoded into the second data block, and locations of pixels having said image density;

determining whether a number of different image density values, which pertain to pixels included in each of said m- by n-pixel blocks, is equal to a first predetermined value;

generating a flag data element for specifying one of image types which are when an m- by n-pixel block is determined to have the number of said different image density values of said m- by n-pixel block being different from said first
predetermined value, and
when the m- by n-pixel block is determined to have the
number of said different image density values of said
m- by n-pixel block being equal to said first predetermined value, and using said flag data element to
select one of
blocks based on said first data block, and
blocks based on said second data block; and
compressing said first data block and said second data
block and generating said flag data element.

56. A method for encoding and decoding image data,
comprising the steps of:
dividing input image data into m- by n-pixel blocks each
with a predetermined number of bits, m and n each
being an integer;
encoding, according to frequency information included in
said image data, each of said m- by n-pixel blocks into
a first data block including a plurality of sub-band data
elements;
encoding said each of said m- by n-pixel blocks into a
second data block that represents said image data in
fewer bits than said predetermined number of bits,
elements of said second data block including
an image density characterizing a pixel image density
value common to at least two pixels of a m- by
n-pixel block that is encoded into the second data
block, and
locations of pixels having said image density;
determining whether a number of different image density
values, which pertain to pixels included in each of said
m- by n-pixel blocks, is equal to a first predetermined
value;
generating a flag data element for specifying one of image
types which are
when an m- by n-pixel block is determined to have the
number of said different image density values of said
m- by n-pixel block being different from said first
predetermined value, and
when the m- by n-pixel block is determined to have the
number of said different image density values of said
m- by n-pixel block being equal to said first predetermined value, using said flag data element to select
one of
blocks based on said first data block, and
blocks based on said second data block;
decoding said first data block into a first decoded m- by
n-pixel block which is substantially similar to said m-
by n-pixel block previously divided;
decoding said second data block into a second decoded m-
by n-pixel block which is substantially similar to said
mn- by n-pixel block previously divided;
determining whether said flag data element is equal to a
second predetermined value; and
selecting one of said first decoded m- by n-pixel block and
said second decoded m- by n-pixel block in accordance
with said flag data element.

57. A computer product having computer readable
instructions encoded therein for implementing an image data
encoding/decoding apparatus which has a processor for
executing said computer readable instructions, said computer program product, when said computer readable
instructions are executed by said processor, comprising:
first data dividing means for dividing input image data
into m- by n-pixel blocks each with a predetermined
number of bits, m and n each being an integral multiple
of 2;
first data encoding means for encoding, according to
frequency information included in said input image
data, each of said m- by n-pixel blocks into a first data
block including a plurality of frequency data elements;
second data encoding means for encoding said each of
said m- by n-pixel blocks into a second data block that
represents said image data in fewer bits than said
predetermined number of bits for each m- by n-pixel
block, elements of said second data block, including
an image density characterizing a pixel image density
value common to at least two pixels in a m- by
n-pixel block being encoded by said second data
encoding means,
locations of pixels having said image density, and
a flag for specifying an image type;
first image type determining means for determining
whether a number of different image density values,
which pertain to pixels included in each of said m- by
n-pixel blocks, is equal to a first predetermined value;
and
first data selecting means for selecting said first data block
from said first data encoding means when said first
image type determining means determines that the
number of said different image density values of said
m- by n-pixel block is different from said first predetermined value and said second data block from said
second data encoding means when said first image type
determining means determines that the number of said
different image density values of said m- by n-pixel
block is equal to said first predetermined value.

58. A computer product having computer readable
instructions encoded therein for implementing an image data
encoding/decoding apparatus which has a processor for
executing said computer readable instructions, said computer program product, when said computer readable
instructions are executed by said processor, comprising:
first data dividing means for dividing input image data
into m- by n-pixel blocks each with a predetermined
number of bits, m and n each being an integer;
first data encoding means for encoding, according to
frequency information included in said input image
data, each of said m- by n-pixel blocks into a first data
block including a plurality of frequency data elements;
second data encoding means for encoding said each of
said m- by n-pixel blocks into a second data block that
represents said image data in fewer bits than said
predetermined number of bits for each m- by n-pixel
block, elements of said second data block including
an image density characterizing a pixel image density
value common to at least two pixels in an m- by
n-pixel block being encoded by said second data
encoding means,
locations of pixels having said image density, and
a flag for specifying an image type;
first image type determining means for determining as to
whether a number of different image density values,
which pertain to pixels included in each of said m- by
n-pixel blocks, is equal to a first predetermined value;
first data selecting means for selecting said first data block
from said first data encoding means when said first
image type determining means determines that the
number of said different image density values of said
m- by n-pixel block is different from said first predetermined value and said second data block from said
second data encoding means when said first image type
determining means determines that the number of said different image density values of said m- by n-pixel block is equal to said first predetermined value;

first data decoding means for decoding said first data block into an m- by n-pixel block which is substantially similar to said m- by n-pixel block previously divided by said first data dividing means;

second data decoding means for decoding said second data block into an m- by n-pixel block which is substantially similar to said m- by n-pixel block previously divided by said first data dividing means;

second image type determining means for determining whether said flag data element is equal to a second predetermined value; and second data selecting means for selecting said m- by n-pixel block from said first data decoding means when said second image type determining means determines that said flag data element is different from said second predetermined value and said m- by n-pixel block from said second data decoding means when said second image type determining means determines that said flag data element is equal to said second predetermined value.

59. A computer product having computer readable instructions encoded therein for implementing an image data encoding/decoding apparatus which has a processor for executing said computer readable instructions, said computer program product, when said computer readable instructions are executed by said processor, comprising:

first data dividing means for dividing input image data into m- by n-pixel blocks each with a predetermined number of bits, m and n each being an integer;

first data encoding means for encoding, according to frequency information included in said input image data, each of said m- by n-pixel blocks into a first data block including a plurality of sub-band data elements;

second data encoding means for encoding said each of said m- by n-pixel blocks into a second data block that represents said image data in fewer bits than said predetermined number of bits for each m- by n-pixel block, elements of said second data block including an image density characterizing a pixel image density value common to at least two pixels in a m- by n-pixel block being encoded by said second data encoding means, and locations of pixels having said image density;

first image type determining means for determining whether a number of different image density values, which pertain to pixels included in each of said m- by n-pixel blocks, is equal to a first predetermined value;

flag generating means for generating a flag data element for specifying one of image types which are an m- by n-pixel block determined to have the number of said different image density values of said m- by n-pixel block being different from said first predetermined value by said first image type determining means, and an m- by n-pixel block determined to have the number of said different image density values of said m- by n-pixel block being equal to said first predetermined value, said flag data element being used to select one of blocks based on said first data block encoded by said first data encoding means and said second data block encoded by said second data encoding means; and compressing means for compressing said first data block encoded by said first data encoding means, said second data block encoded by said second data encoding means, and said flag data element generated by said flag generating means.

60. A computer product having computer readable instructions encoded therein for implementing an image data encoding/decoding apparatus which has a processor for executing said computer readable instructions, said computer program product, when said computer readable instructions are executed by said processor, comprising:

first data dividing means for dividing input image data into m- by n-pixel blocks each with a predetermined number of bits, m and n each being an integer;

first data encoding means for encoding, according to frequency information included in said input image data, each of said m- by n-pixel blocks into a first data block including a plurality of sub-band data elements;

second data encoding means for encoding said each of said m- by n-pixel blocks into a second data block that represents said image data in fewer bits than said predetermined number of bits for each m- by n-pixel block, elements of said second data block including an image density characterizing a pixel image density value common to at least two pixels in a m- by n-pixel block being encoded by said second data encoding means, and locations of pixels having said image density;

first image type determining means for determining whether a number of different image density values, which pertain to pixels included in each of said m- by n-pixel blocks, is equal to a first predetermined value;

flag generating means for generating a flag data element for specifying one of image types which are an m- by n-pixel block determined to have the number of said different image density values of said m- by n-pixel block being different from said first predetermined value by said first image type determining means, and an m- by n-pixel block determined to have the number of said different image density values of said m- by n-pixel block being equal to said first predetermined value, said flag data element being used to select one of blocks based on said first data block encoded by said first data encoding means and said second data block encoded by said second data encoding means;

first data decoding means for decoding said first data block into an m- by n-pixel block which is substantially similar to said m- by n-pixel block previously divided by said first data dividing means;

second data decoding means for decoding said second data block into an m- by n-pixel block which is substantially similar to said m- by n-pixel block previously divided by said first data dividing means;

second image type determining means for determining whether said flag data element is equal to a second predetermined value; and data selecting means for selecting one of said m- by n-pixel block from said first data decoding means and said m- by n-pixel block from said second data decoding means in accordance with said flag data element.

61. A computer product having computer readable instructions encoded therein for implementing an image data encoding/decoding apparatus which has a processor for executing said computer readable instructions, said computer program product, when said computer readable instructions are executed by said processor, comprising:

a first data divider configured to input image data into m- by n-pixel blocks each with a predetermined number of bits, m and n each being an integer;

a first data encoder configured to encode, according to frequency information included in said input image data, each of said m- by n-pixel blocks into a first data block including a plurality of frequency data elements;

a second data encoder configured to encode said each of said m- by n-pixel blocks into a second data block that represents said image data in fewer bits than said predetermined number of bits for each m- by n-pixel block, elements of said second data block including an image density characterizing a pixel image density value common to at least two pixels in a m- by n-pixel block being encoded by said second data encoder, locations of pixels having said image density, and a flag data element for specifying an image type;

a first image type determiner configured to determine whether a number of different image density values, which pertain to pixels included in each of said m- by n-pixel blocks, is equal to a first predetermined value; and a first data selector configured to select said first data block from said first data encoder when said first image type determiner determines that the number of said different image density values of said m- by n-pixel block is different from said first predetermined value and said second data block from said second data encoder when said first image type determiner determines that the number of said different image density values of said m- by n-pixel block is equal to said first predetermined value.

62. A computer product having computer readable instructions encoded therein for implementing an image data encoding/decoding apparatus which has a processor for executing said computer readable instructions, said computer program product, when said computer readable instructions are executed by said processor, comprising:

a first data divider configured to divide input image data into m- by n-pixel blocks each with a predetermined number of bits, m and n each being an integer;

a first data encoder configured to encode, according to frequency information included in said input image data, each of said m- by n-pixel blocks into a first data block including a plurality of frequency data elements;

a second data encoder configured to encode said each of said m- by n-pixel blocks into a second data block that represents said image data in fewer bits than said predetermined number of bits for each m- by n-pixel block, elements of said second data block including an image density characterizing a pixel image density value common to at least two pixels in a m- by n-pixel block being encoded by said second data encoder, locations of pixels having said image density, and a flag data element for specifying an image type;

a first image type determiner configured to determine whether a number of different image density values, which pertain to pixels included in each of said m- by n-pixel blocks, is equal to a first predetermined value;

a first data selector configured to select said first data block from said first data encoder when said first image type determiner determines that the number of said different image density values of said m- by n-pixel block is different from said first predetermined value and said second data block from said second data encoder when said first image type determiner determines that the number of said different image density values of said m- by n-pixel block is equal to said first predetermined value;

a first data decoder configured to decode said first data block into an m- by n-pixel block which is substantially similar to said m- by n-pixel block previously divided by said first data divider;

a second data decoder configured to decode said second data block into an m- by n-pixel block which is substantially similar to said m- by n-pixel block previously divided by said first data divider;

a second image type determiner configured to determine whether said flag data element is equal to a second predetermined value; and a second data selector configured to select said m- by n-pixel block from said first data decoder when said second image type determiner determines that said flag data element is different from said second predetermined value and said m- by n-pixel block from said second data decoder when said second image type determiner determines that said flag data element is equal to said second predetermined value.

63. A computer product having computer readable instructions encoded therein for implementing an image data encoding/decoding apparatus which has a processor for executing said computer readable instructions, said computer program product, when said computer readable instructions are executed by said processor, comprising:

a first data divider configured to divide input image data into m- by n-pixel blocks each with a predetermined number of bits, m and n being an integer;

a first data encoder configured to encode, according to frequency information included in said input image data, each of said m- by n-pixel blocks into a first data block including a plurality of sub-band data elements;

a second data encoder configured to encode said each of said m- by n-pixel blocks into a second data block that represents said image data in fewer bits than said m- by n-pixel block, elements of said data block including an image density characterizing a pixel image density value common to at least two pixels in a m- by n-pixel block being encoded by said second data encoder and locations of pixels having said image density;

a first image type determiner configured to determine whether a number of different image density values, which pertain to pixels included in each of said m- by n-pixel blocks, is equal to a first predetermined value;

a flag generator configured to generate a flag data element for specifying one of image types which are an m- by n-pixel block determined to have the number of said different image density values of said m- by n-pixel block being different from said first predetermined value by said first image type determiner, and an m- by n-pixel block determined to have the number of said different image density values of said m- by n-pixel block being equal to said first predetermined value, said flag data element being used to select one of blocks based on said first data block encoded by said first data encoder and said second data block encoded by said second data encoder; and a compressor configured to compress said first data block encoded by said first data encoder, said second data block encoded by said second data encoder, and said flag data element generated by said flag generator.

64. A computer product having computer readable instructions encoded therein for implementing an image data encoding/decoding apparatus which has a processor for executing said computer readable instructions, said computer program product, when said computer readable instructions are executed by said processor, comprising:

a first data divider configured to divide input image data into m- by n-pixel blocks each with a predetermined number of bits, m and n each being an integer;

a first data encoder configured to encode, according to frequency information included in said input image data, each of said m- by n-pixel blocks into a first data block including a plurality of sub-band data elements;

a second data encoder configured to encode said each of said m- by n-pixel blocks into a second data block that represents said image data in fewer bits than said predetermined number of bits for each m- by n-pixel block, elements of said data block including an image density characterizing a pixel image density value common to at least two pixels in a m- by n-pixel block being encoded by said second data encoder and locations of pixels having said image density;

a first image type determiner configured to determine whether a number of different image density values, which pertain to pixels included in each of said m- by n-pixel blocks, is equal to a first predetermined value;

a flag generator configured to generate a flag data element for specifying one of image types which are an m- by n-pixel block determined as that the number of said different image density values of said m- by n-pixel block being different from said first predetermined value by said first image type determiner, and an m- by n-pixel block determined to have the number of said different image density values of said m- by n-pixel block being equal to said first predetermined value, said flag data element being used to select one of blocks based on said first data block encoded by said first data encoder and said second data block encoded by said second data encoder;

a first data decoder configured to decode said first data block into an m- by n-pixel block which is substantially similar to said m- by n-pixel block previously divided by said first data divider;

a second data decoder configured to decode said second data block into an m- by n-pixel block which is substantially similar to said m- by n-pixel block previously divided by said first data divider;

a second image type determiner configured to determine whether said flag data element is equal to a second predetermined value; and a data selector configured to select one of said m- by n-pixel block from said first data decoder and said m- by n-pixel block from said second data decoder in accordance with said flag data element.

* * * * *